(12) United States Patent
Kaneko

(10) Patent No.: US 7,133,611 B2
(45) Date of Patent: Nov. 7, 2006

(54) MAIN SIGNAL CONTROLLING APPARATUS AND METHOD IN A WDM OPTICAL COMMUNICATIONS SYSTEM

(75) Inventor: Shinichi Kaneko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 602 days.

(21) Appl. No.: 10/269,982

(22) Filed: Oct. 15, 2002

(65) Prior Publication Data

US 2004/0208521 A1 Oct. 21, 2004

(30) Foreign Application Priority Data

Apr. 24, 2002 (JP) .............................. 2002-121716

(51) Int. Cl.
*H04B 10/08* (2006.01)

(52) U.S. Cl. .............................. 398/30; 398/33; 398/38; 398/10; 398/79; 398/11; 398/17; 398/18; 398/25; 398/26; 398/27; 398/37; 398/81; 398/97; 398/104; 398/105; 398/140; 398/141; 398/158; 398/159; 398/160; 398/173; 398/177; 398/181

(58) Field of Classification Search ................ 359/124; 398/30, 79, 33, 38, 10, 11, 17, 18, 26, 27, 398/25, 37, 81, 97, 104, 105, 140, 141, 158, 398/159, 160, 173, 177, 181

See application file for complete search history.

(56) References Cited

U.S. PATENT DOCUMENTS 6,373,614 B1 4/2002 Miller

2003/0081282 A1* 5/2003 Yamakawa ................... 359/124

FOREIGN PATENT DOCUMENTS

| EP | 0 964 237 | 12/1999 |
|---|---|---|
| EP | 1 033 834 | 9/2000 |
| JP | 4-56541 | 2/1992 |
| JP | 6-37717 | 2/1994 |
| JP | 8-321805 | 12/1996 |
| JP | 8-321824 | 12/1996 |
| JP | 11-8590 | 1/1999 |
| JP | 11-103287 | 4/1999 |
| JP | 2000-56992 | 2/2000 |
| JP | 2000-252923 | 9/2000 |
| JP | 2002-57624 | 2/2002 |

OTHER PUBLICATIONS

Communication including European Search Report from the European Patent Office dated Dec. 16, 2004 in the corresponding European patent application.
Office Action for Japanese Patent Application No. 2002-121716 mailed May 23, 2006.

* cited by examiner

*Primary Examiner*—Hanh Phan
(74) *Attorney, Agent, or Firm*—Staas & Halsey LLP

(57) ABSTRACT

If a repeater supervisory control (SV), a pre-emphasis automatic adjustment (PE), a receiving side threshold value automatic adjustment (Vth), a transmitting side dispersion compensation value setting (VDC(T)), and a receiving side dispersion compensation value setting (VDC(R)) are executed for an optical main signal, these controls are executed in the above described priority order. Accordingly, if the controls are independently executed, or if two or more controls simultaneously occur, a control with a higher priority is executed. In this way, a transmission quality of an optical signal is prevented from being badly influenced as a result that the controls are simultaneously executed.

12 Claims, 49 Drawing Sheets

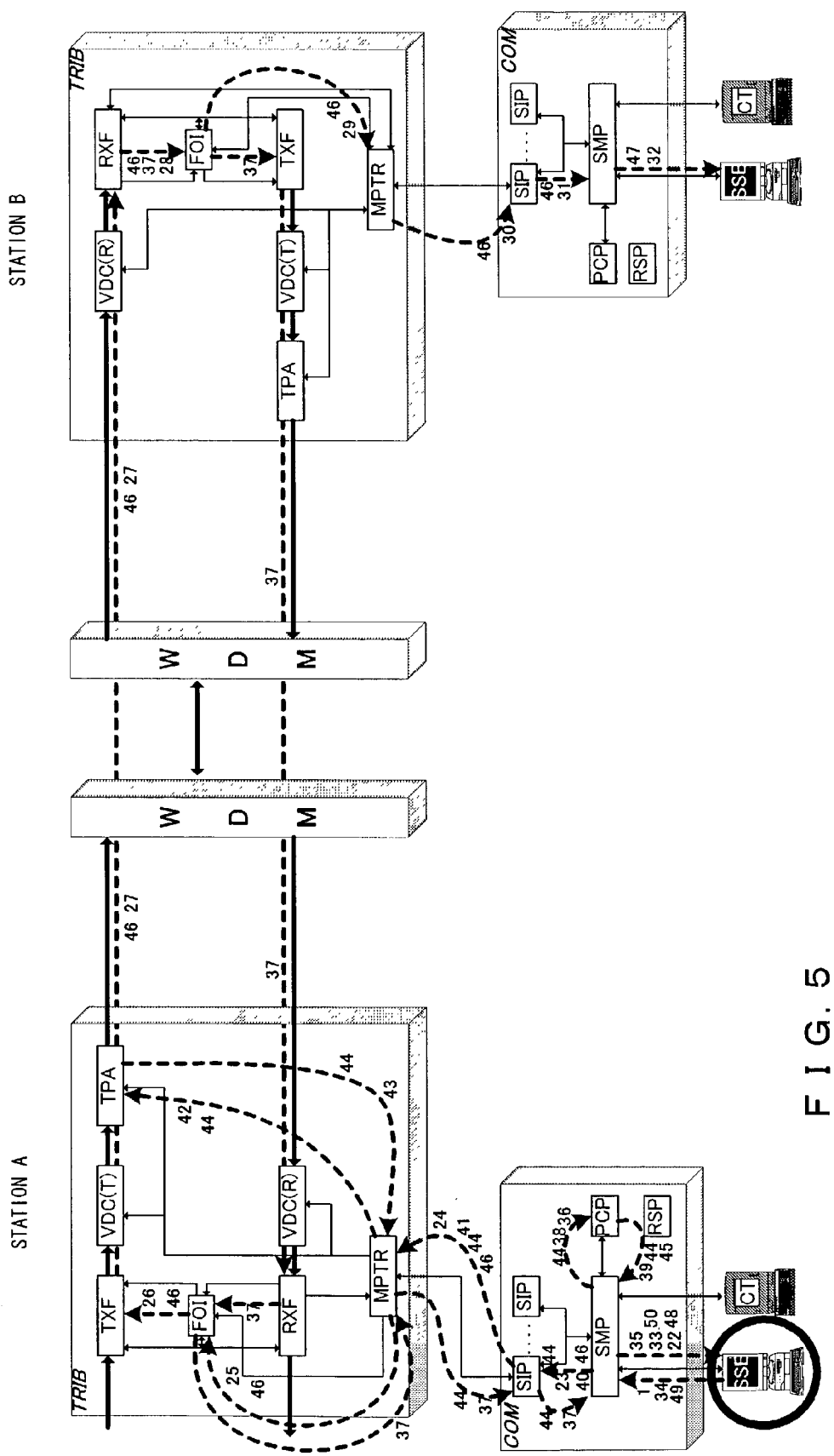
F I G. 5

TABLE 2 MAIN SIGNAL CONTROL PRIORITIES

| ACTION | STATION A | | | | | STATION B | | | | |
|---|---|---|---|---|---|---|---|---|---|---|
| STATUS | SV | PE | VTH | VDC(T) | VDC(R) | SV | PE | VTH | VDC(T) | VDC(R) |
| STATION A  SV |  |  |  |  |  | —*1 | × | × | × | × |
| PE | ○ |  |  |  |  | ○ | ● | × | ● | × |
| VTH | ○ | ● |  |  |  | ○ | ● | ● | × | ● |
| VDC(T) | ○ | ○ | ● |  |  | ○ | ● | ○ | ● | × |
| VDC(R) | ○ | ● | ○ | ● |  | ○ | ○ | ● | ○ | ● |

SV: REPEATER SV COMMAND FUNCTION
PE: PRE-EMPHASIS ADJUSTMENT FUNCTION (TRANSMITTING SIDE CONTROL)
VTH: THRESHOLD VALUE ADJUSTMENT FUNCTION
VDC: DISPERSION COMPENSATION AMOUNT ADJUSTMENT FUNCTION

○: PROCESS WITH HIGHER PRIORITY (PROCESS BEING EXECUTED IS STOPPED (RECOVERY))
●: SIMULTANEOUSLY EXECUTABLE
×: INTERRUPTING CONTROL COMMAND IS REJECTED (PRIORITY IS GIVEN TO PROCESS BEING EXECUTED)
—: SIMULTANEOUS CONTROL DOES NOT EXIST
*1: SIMULTANEOUS CONTROL IS PREVENTED VIA SV FLAG COMMUNICATION BETWEEN SSEs

- FUNDAMENTAL PRIORITIES ARE AS FOLLOWS
  SV > PE > VTH > VDC(T) > VDC(R)

F I G. 9

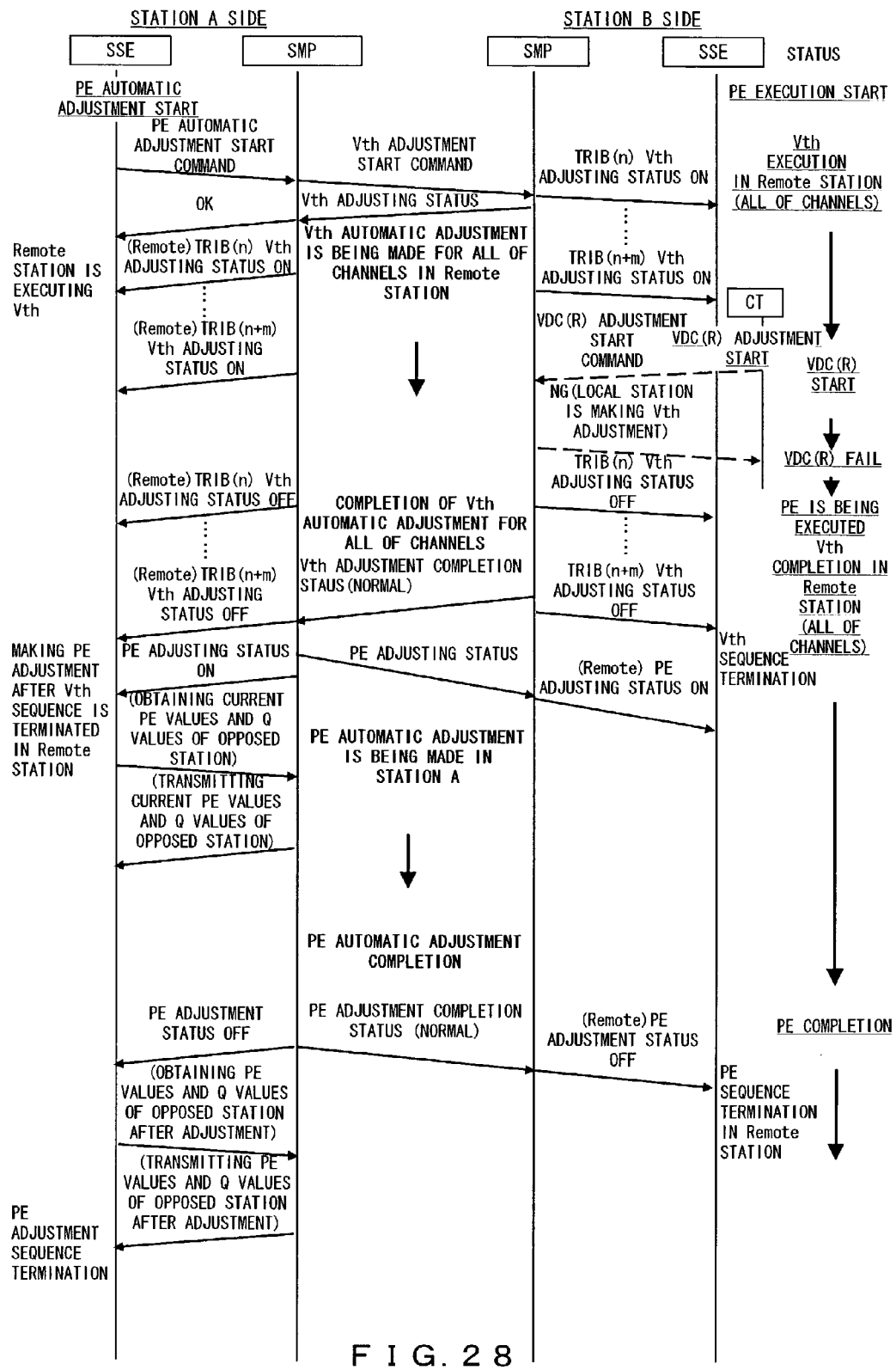
F I G. 28

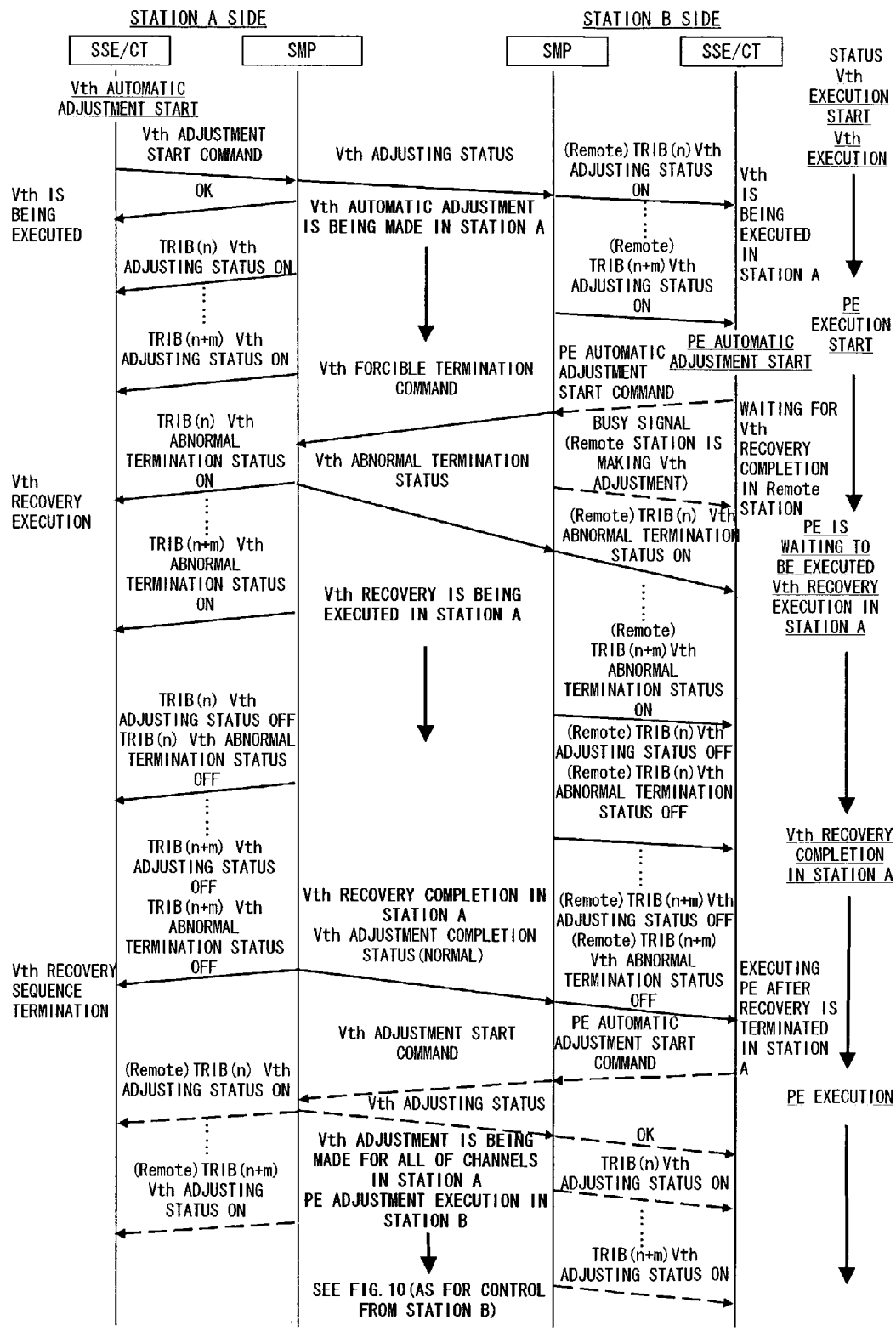
F I G. 3 2

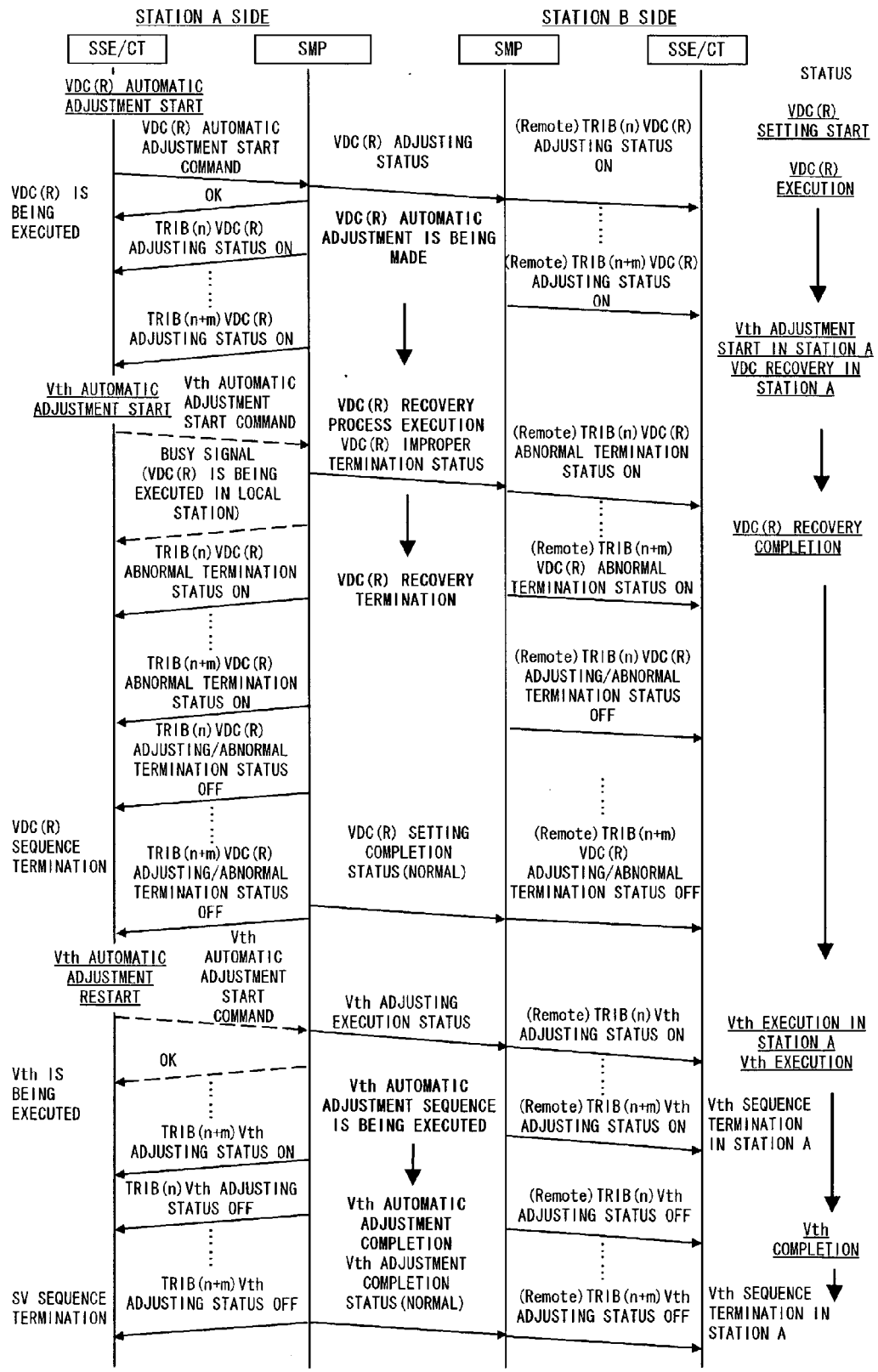
F I G. 4 0

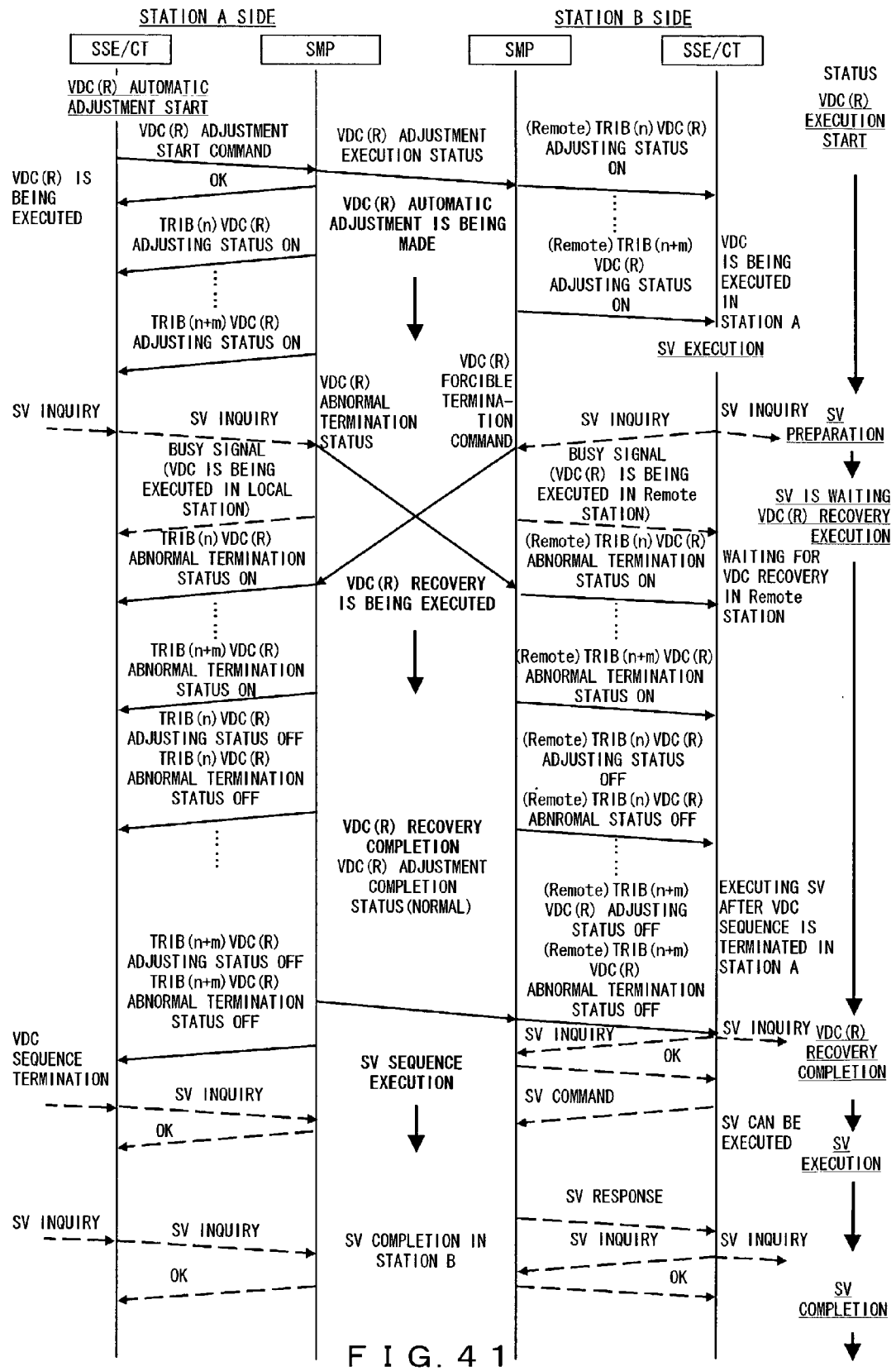
F I G. 41

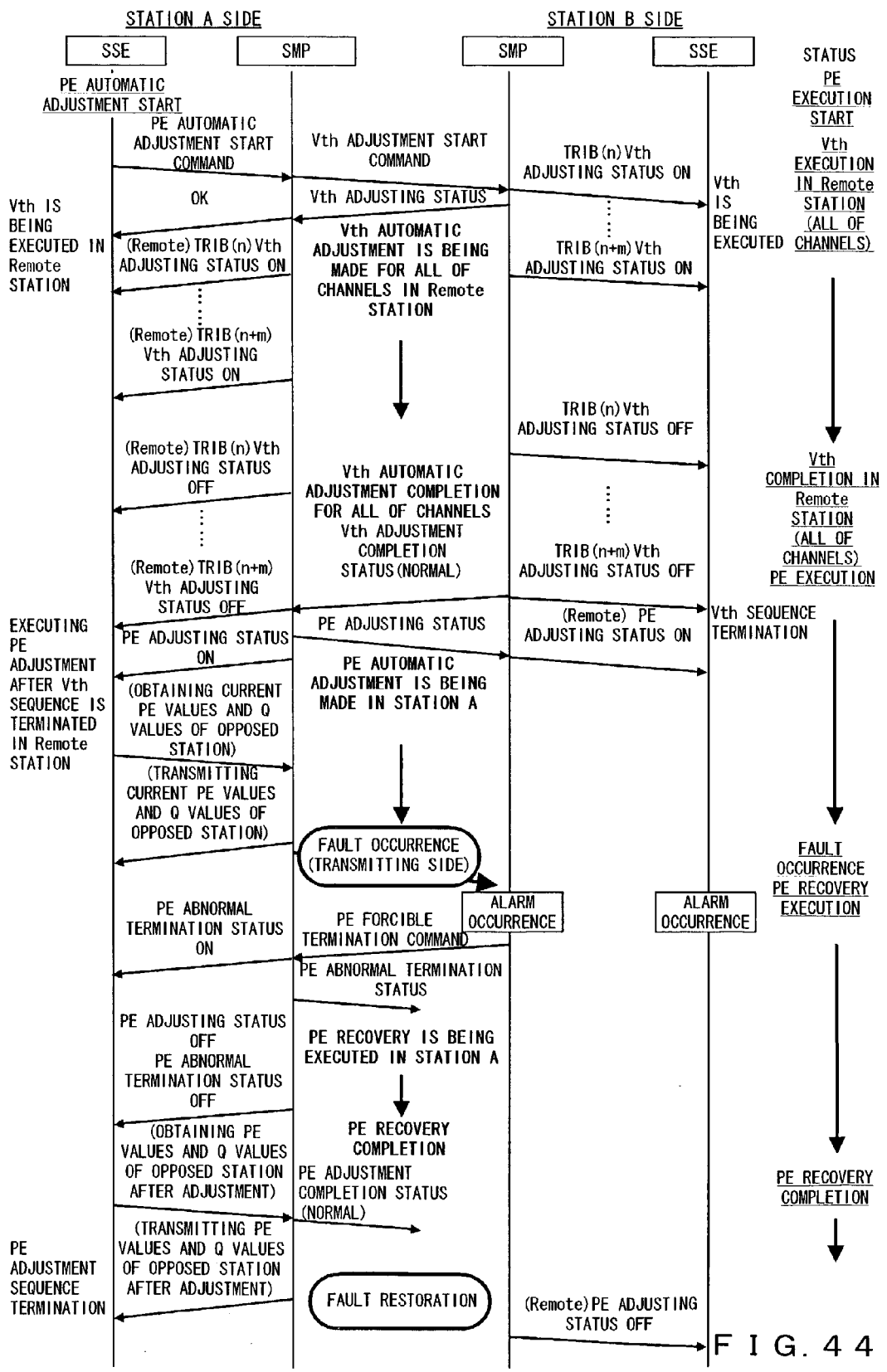
F I G. 44

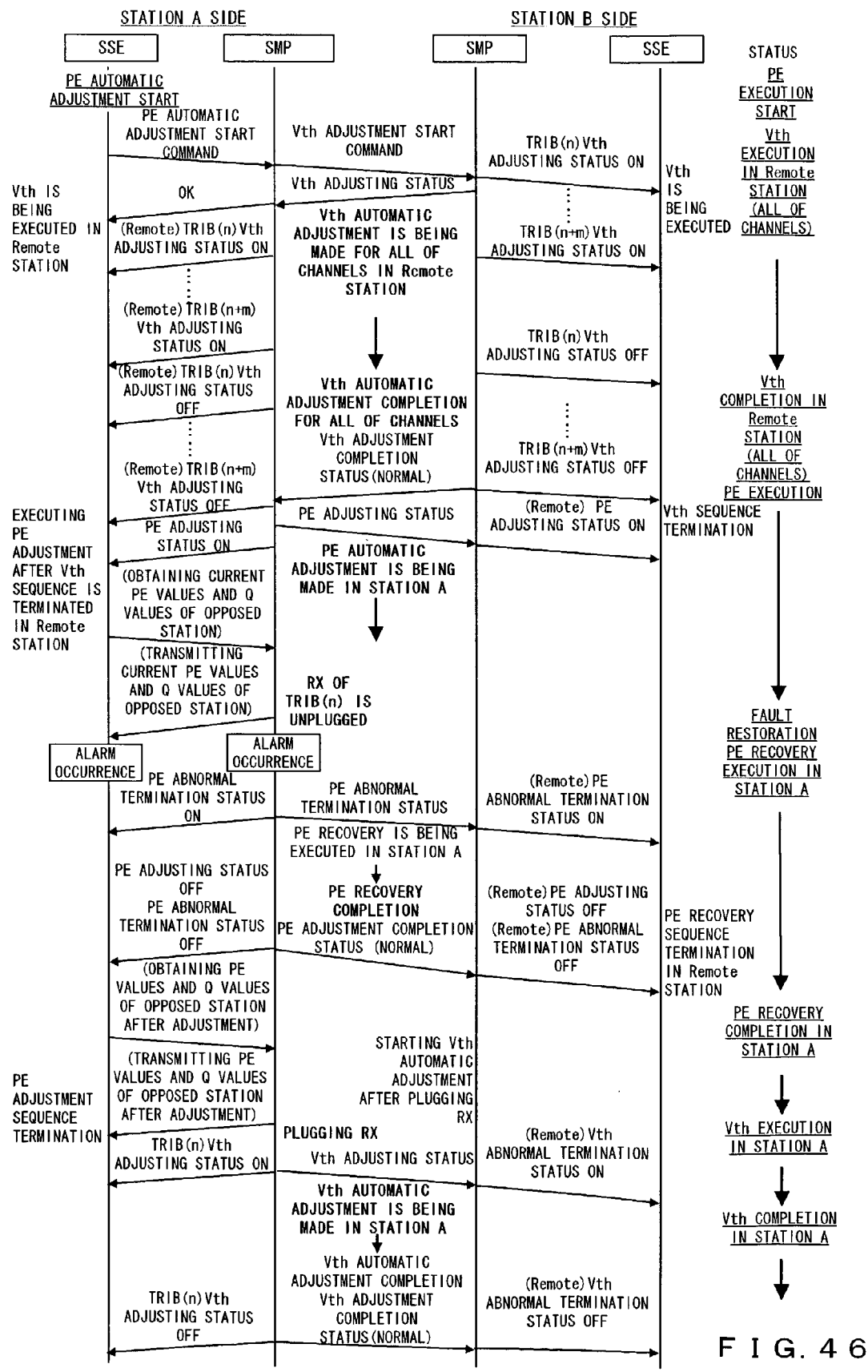
F I G. 4 6

MAIN SIGNAL CONTROLLING APPARATUS AND METHOD IN A WDM OPTICAL COMMUNICATIONS SYSTEM

BACKGROUND OF THE INVENTION

1. Field of the Invention

The present invention relates to a signal controlling apparatus and method in a WDM optical communications system.

2. Description of the Related Art

In recent years, the speed and the capacity of an apparatus that makes a long-haul international communication like an optical submarine terminal apparatus have been increasing rather quickly with WDM technology. Accompanying this phenomenon, the demand for some control functions for maintaining a main signal characteristic has been growing. The first one is a supervisory control function of a submarine repeater or gain equalizer, which is installed on a submarine transmission line. The second one is an automatic pre-emphasis control function for making wavelength characteristics uniform. The third one is an automatic threshold value control function for adjusting an identifying voltage/phase, which shifts with fluctuations of a Q value of a transmission line or fluctuations of a temperature of a receiver, to an optimum value. The fourth one is an automatic dispersion compensation function for compensating for wavelength dispersion with a variable device. These control functions include a function for performing control at the start-up of an apparatus, a function for periodically performing control during operations, and the like. With these controls, however, the level of a main signal is varied or modulated. Therefore, if the individual controls are performed at the same time, a signal characteristic can possibly be degraded in a transient manner, leading to an occurrence of an error.

FIG. 1 exemplifies the configuration of a conventional WDM optical submarine terminal apparatus.

This figure shows an opposed connection between a station A (terminal station 10) and a station B (terminal station 11). Firstly, a TRIB (TRIButary) unit 12 of the station A is, what is called, a transponder unit, and a functioning unit that performs a signal process for one wavelength. Accordingly, TRIB units 12 the number of which is equal to the number of wavelengths are arranged in the terminal station 10 in the WDM system. However, FIG. 1 shows only the TRIB unit 12 for one wavelength. To a TXF (transmitter unit) 18, a SDH signal, etc. from a land is input. The TXF 18 once opt-electrically converts the signal, etc., adds a Reed-Solomon code for error correction, electro-optically converts the signal, and outputs the signal. Then, a CHA (CHannel Amplifier) unit 17 at the next stage amplifies the optical signal from the TXF 10 to a predetermined level. Then, the signal enters a DCF (Dispersion Compensation Fiber) 50, where pre wavelength dispersion compensation is performed for this signal. A TPA (Transmitting Pre-emphasis Amplifier) 16 at the next stage has a pre-emphasis function for adjusting the level of an optical signal after being amplified so that the characteristic of each wavelength (each channel) becomes flat after being transmitted. The above described TRIB units 12 are arranged by the number of wavelengths to be multiplexed, and wavelengths output from the TRIB units 12 are multiplexed by a WDM unit 30, and transmitted to a submarine transmission line.

On the submarine transmission line, optical amplification repeaters 31-1 and 31-2 are inserted. Also gain equalizers 31-3 and 31-4 for equalizing the gain of each wavelength are inserted depending on the number of multiplexed wavelengths or a transmission distance.

The above described signal is received and wavelength-demultiplexed by a WDM unit 32 of the station B (terminal station 11). After post dispersion compensation is made for a signal having each demultiplexed wavelength by a DCF 33, it is amplified by a CHA unit 34 similar to the transmitting side, and input to a RXF (receiver unit) 35. The RXF 35 opt-electrically converts the received signal, demodulates the Reed-Solomon code for error correction, makes error correction, electro-optically converts the signal into a SDH signal, and transmits the signal to a land transmission line.

The above description is the flow of a main signal. MPTRs (Management Processors for TRibutary) 23 and 41 within the TRIB units 12 and 14 warn, supervise, and control the respective units. COM units 13 and 15 interface with the MPTRs 23 and 41 within the TRIB units 12 and 14, and supervise and control the whole of the terminal apparatuses. Additionally, the COM units 13 and 15 are connected to CTs (Craft Terminals) 29 having GUI and 47, and SSEs (System Supervisory Equipments) 18 and 46.

Each of the COM units 13 and 15 is arranged for all of wavelengths, and a signal from the MPTR 23 or 41 of the TRIB unit 12 or 14 for each wavelength is passed to a SMP (System Management Processor) 27 or 45 via a SIP (Signal Interface Processor) 24 or 42 of the COM unit 13 or 15. To the SMPs 27 and 45, PCPs (Pre-emphasis Control Processors) 25 and 43, and RSPs (Repeater Supervisory Processors) 26 and 44 are connected in addition to the SSEs 28 and 46, and the CTs 29 and 47.

Conventionally, a supervisory control of a submarine repeater/gain equalizer, and a pre-emphasis automatic control are normally implemented as controls of a main signal.

With a method of the supervisory control of a submarine repeater/gain equalizer, a supervisory control command is first transmitted from the SSE 28 or 46, or the CT 29 or 47 to the SMP 27 or 45. The SMP 27 or 45 transfers the command to the RSP 26 or 44, which then transmits the command to the WDM unit 30 or 32. The WDM unit 30 or 32 superposes the received command signal on a signal after being wavelength-multiplexed, and transmits the signal. Commands include a control command for varying the output level of a repeater, and a monitor command for monitoring an input/output level, a pump LD current (an electric current controlling a pump light source), etc. Any of the commands are superposed in the same manner. Normally, a modulation frequency is a low frequency of approximately 150 kHz, and its modulation factor is approximately 5%, which exerts less influence on a main signal.

With a method of the pre-emphasis automatic control, an optimum pre-emphasis setting value of each wavelength is calculated and set by monitoring the number of error corrections of each wavelength on a receiving side of an opposed station.

If a pre-emphasis control command is issued from the SSE 46 (CT 47) of the station B (terminal station 11), the MPTR 41 of the station B (terminal station 11) receives the number of error corrections of the TRIB unit 12 of the station A (terminal station 10) (the number of error corrections is obtained by the RXF 20). Specifically, the number of error corrections made by the RXF 20 of the station A (terminal station 10) is transmitted to the MPTR 23 of the station A (terminal station 10), and its information is obtained by a FOI (FEC Overhead Interface) 19. The FOI 19 inserts this information in an overhead for error correction.

Then, this signal is transmitted from the TXF 18 of the station A as a main signal. In the station B (terminal station 11), the information of the number of error corrections of the station A from the signal received by the RXF 35 is transmitted to the MPTR 41 via the FOI 36.

The COM unit 15 of the station B obtains the number of error corrections of the opposed station from the MPTR 41 of a TRIB unit 14 for each wavelength. The information of the number of error corrections is obtained by the PCP 43. The PCP 43 converts the number of error corrections into a Q value for each wavelength, and calculates for each wavelength a pre-emphasis setting which equalizes Q values of wavelengths as much as possible. Then, the calculated value is set in a TPA 40 of each of the TRIB units 14, and a Q value is recalculated. Here, if the Q values of the wavelengths are not equal, the PCP 43 recalculates and resets the Q values. This routine is repeated by several times, so that a difference among the Q values of the wavelengths is gradually converged, and the Q values are finally settled into an optimum value. Here, the pre-emphasis automatic control is completed.

The SSE 28 and the CT 29 of the terminal station 10 are connected to the SSE 46 and the CT 47 of the terminal station 11 via an electric transmission line different from the optical transmission line so that they can exchange information required for the supervisory control of a main signal. Typically, this electric transmission line is an electric line having a transmission rate of 2 Mbps.

Recently, the demand for adopting the following control functions in addition to the above described two controls has been arising due to an increase in the number of wavelengths, speed-up of a transmission rate, etc.

an automatic adjustment function for amplitude and phase threshold values of a receiver an automatic adjustment function for a dispersion compensation amount The former function is demanded, since there is a concern such that an ability originally delivered as an error correction function cannot be fully implemented due to Q value fluctuations of a transmission line or fluctuations of a device temperature, which is caused by an increase in the number of wavelengths or an improvement in a transmission rate, etc. This is because a threshold value in an amplitude direction and that in a phase direction are shifted, when a received waveform is reproduced by a receiver. Accordingly, these threshold values must be automatically adjusted to optimum points with an external trigger.

Additionally, the latter function is demanded, since there are difficulties in a fine adjustment of a dispersion compensation amount and the downsizing of a device with the use of a DCF (Disperson Compensation Fiber). This is because a rather large installment area is required for dispersion compensation that is conventionally made with the DCF whose dispersion compensation amount is fixed. Accordingly, there is a demand for possessing a function that can vary a dispersion compensation amount according to a voltage value with the use of a VIPA (Virtually Imaged Phased Array) device that has been developed recently. Therefore, a function for automatically adjusting the dispersion compensation value with an external trigger becomes necessary.

Fundamentally, these control functions superpose a supervisory signal on a main signal, and vary a main signal level, a threshold value or a dispersion compensation value, etc. Therefore, if these controls are executed at the same time, a signal characteristic can possibly exceed a tolerable range, leading to a degradation and danger.

SUMMARY OF THE INVENTION

An object of the present invention is to provide an apparatus and method that can compensate for the transmission quality of a main signal (optical main signal propagating over a submarine transmission line) more safely for a long time.

A main signal controlling apparatus according to the present invention is a main signal controlling apparatus in a termination station of a WDM optical communications system, and comprises: a repeater supervisory control unit executing a supervisory control for a repeater arranged on a transmission line of the WDM optical communications system; a pre-emphasis control unit making a pre-emphasis that adjusts a level difference among wavelengths of a WDM optical signal transmitted from the terminal station; a threshold value setting control unit setting and controlling a threshold value that an optical signal receiving device uses to detect a signal; a wavelength dispersion compensation control unit adjusting a wavelength dispersion compensation amount at a transmitting end or a receiving end; and a priority control unit preferentially executing a repeater supervisory control, a pre-emphasis control, a threshold value setting control, and a wavelength dispersion compensation control in this order, so that the controls are executed without exerting a bad influence on a quality of a main signal transmitted/received by the WDM optical communications system, when at least two of the controls occur simultaneously.

A main signal controlling method according to the present invention is a main signal controlling method for use in a terminal station of a WDM optical communications system, and comprises: executing a supervisory control for a repeater arranged on a transmission line of the WDM optical communications system; making a pre-emphasis that adjusts a level difference among wavelengths of a WDM optical signal transmitted from the terminal station; setting and controlling a threshold value that an optical signal receiving device uses to detect a signal; adjusting a wavelength dispersion compensation amount at a transmitting end or a receiving end; and preferentially executing a repeater supervisory control, a pre-emphasis control, a threshold value setting control, and a wavelength dispersion compensation control in this order, so that the controls are executed without exerting a bad influence on a quality of a main signal transmitted/received by the WDM optical communications system, when at least two of the controls occur simultaneously.

According to the present invention, it becomes possible to provide an apparatus and method that can safely and easily execute four controls such as a repeater supervisory control, a pre-emphasis control, a threshold value control at a receiving end, and a wavelength dispersion compensation control, which is required hereafter in a high-speed WDM optical communications system, without degrading the quality of a main signal.

BRIEF DESCRIPTION OF THE DRAWINGS

FIG. 5 is a block diagram showing the procedure of each control function (No. 3);

FIG. 9 shows the priorities of control functions according to the preferred embodiment of the present invention;

FIG. 28 exemplifies each operational sequence when an interrupt is made during the pre-emphasis automatic adjustment (No. 5);

FIG. 32 exemplifies each operational sequence when an interrupt is made during the receiver threshold value automatic adjustment (No. 4);

FIG. 40 exemplifies each operational sequence when an interrupt is made during the receiving side dispersion value automatic adjustment (No. 2);

FIG. 41 exemplifies each operational sequence when an interrupt is made during the receiving side dispersion value automatic adjustment (No. 3);

FIG. 44 exemplifies each operational sequence when a fault occurs during each control execution (No. 1);

FIG. 46 exemplifies each operational sequence when a fault occurs during each control execution (No. 3);

DESCRIPTION OF THE PREFERRED EMBODIMENTS

Figure 2:
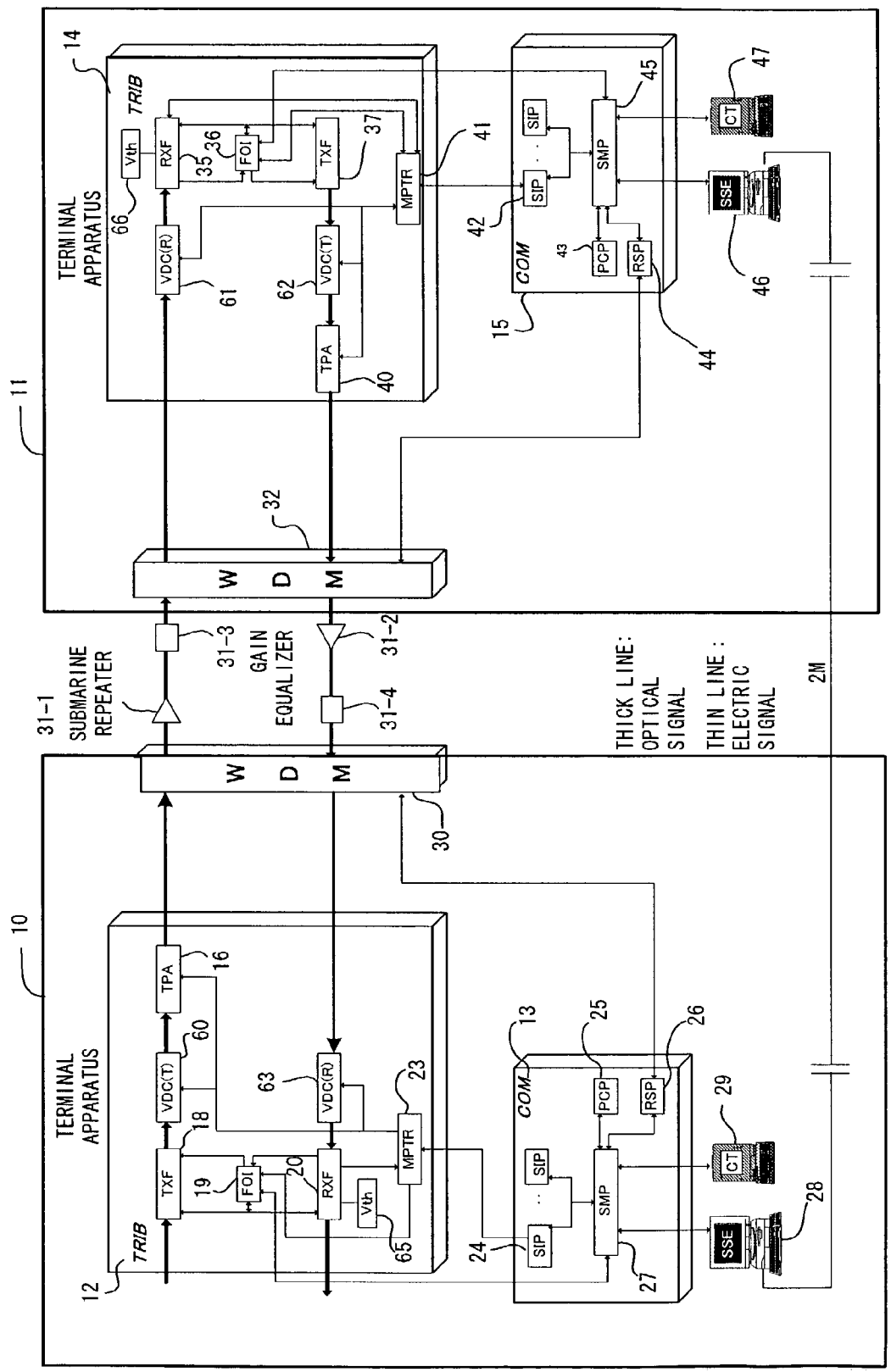
FIG. 2 exemplifies the configuration of an apparatus according to a preferred embodiment of the present invention.

FIG. 2 exemplifies the configuration of an apparatus according to a preferred embodiment of the present invention.

Figure 1:
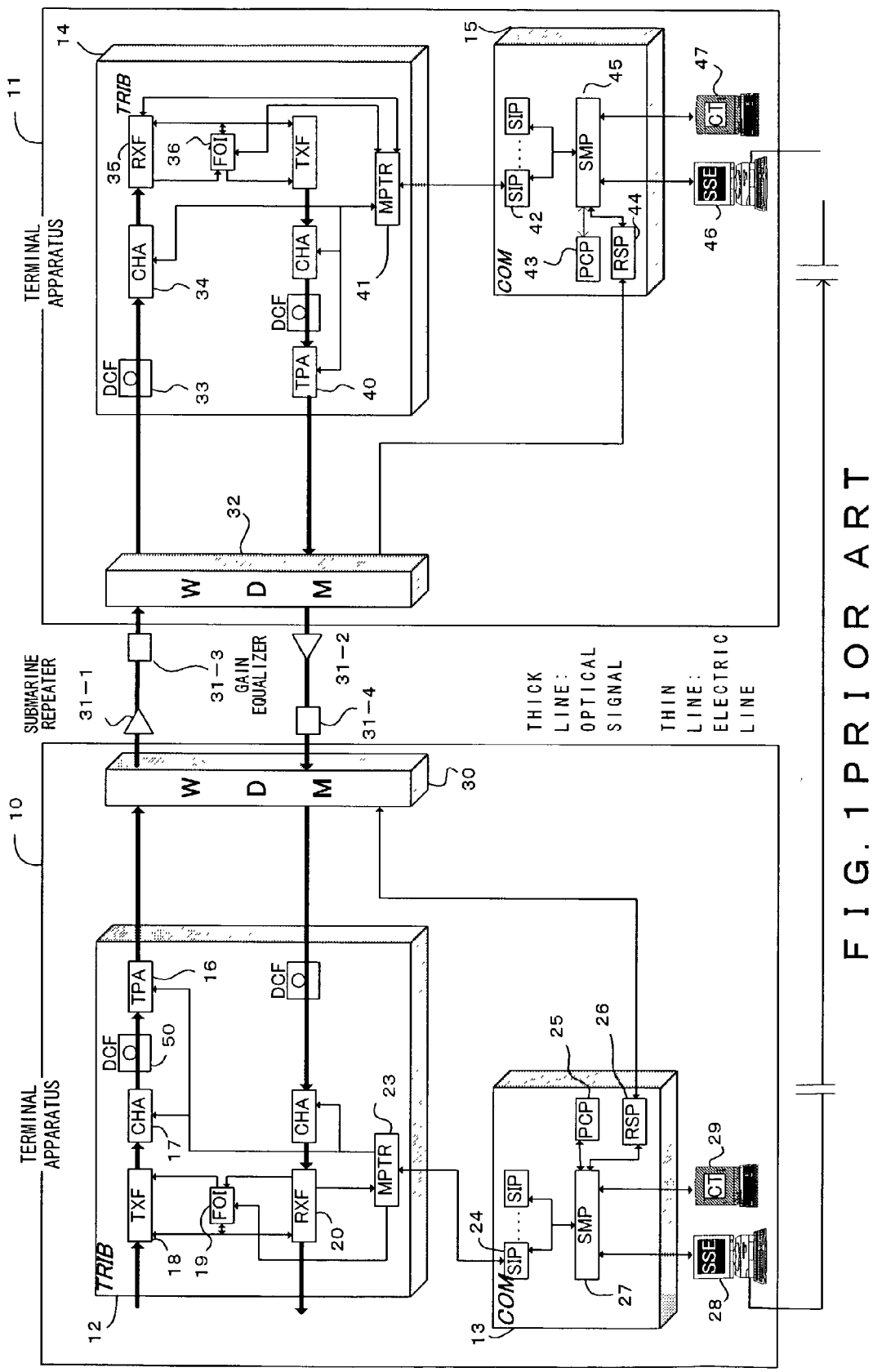
FIG. 1 exemplifies the configuration of a conventional WDM optical submarine terminal apparatus.

In this figure, the same constituent elements as those shown in FIG. 1 are denoted with the same reference numerals, and their explanations are omitted.

A supervisory control function of a repeater/gain equalizer, and a pre-emphasis automatic control function are the same as those of a conventional technique.

An automatic adjustment function for amplitude and phase threshold values of a receiver is described. There is a concern that an ability originally delivered as an error correction function cannot be fully implemented due to Q value fluctuations of a transmission line or fluctuations of a device temperature, which is caused by an increase in the number of wavelengths or an improvement in a transmission rate, etc. This is because a threshold value in an amplitude direction and that in a phase direction are shifted, when a received waveform is reproduced by a receiver.

Therefore, these threshold values must be automatically readjusted to optimum points with an external trigger. Additionally, a mechanism for automatically starting an adjustment also for temperature fluctuations becomes necessary. Accordingly, in FIG. 2, threshold value control circuits 65 and 66 are respectively arranged in the TRIB units 12 and 14 of the terminal stations 10 and 11.

With a method for controlling a threshold value, the number of error corrections made by the RXF 20 is monitored while varying the amplitude threshold values of the RXFs 20 and 35 in predetermined steps, and a point where the number of error corrections becomes the minimum is detected and set as an optimum point. These operations are performed also for the phase threshold value. These controls are executed by the MPTRs 23 and 41. Threshold values are varied according to a flow that does not exert an influence on a main signal. As a matter of course, the threshold values are respectively controlled in units of wavelengths. Or, a command for simultaneously controlling a threshold value for all of wavelengths can be transmitted by making a specification from the SSEs 28 and 46 or the CTs 29 and 47.

Examples of a trigger that causes this function to be executed include the following types.
(1) an execution command from the SSE (28 or 46)
(2) an execution command from the CT (29 or 47)
(3) when the pre-emphasis control is performed
(4) when the ambient temperature of a receiver fluctuates For (3) among the above described trigger types, an execution trigger for adjusting a threshold value is provided in the flow of a pre-emphasis automatic adjustment sequence. This is because the threshold value of the receiver of an opposed station must be once preset to an optimum value when the pre-emphasis control is executed. This trigger is provided in this preferred embodiment according to the present invention.

An automatic adjustment function for a dispersion compensation amount is described next. Conventionally, dispersion compensation is performed with a DCF. With the DCF, however, its dispersion compensation amount is fixed. Therefore, a fine adjustment is difficult, and a rather large installment area is required, leading to a difficulty in downsizing an apparatus. Accordingly, there arises a demand for varying a dispersion compensation amount according to a voltage value with the use of a VIPA device that has been developed recently.

Specifically, as shown in FIG. 2, VDCs (Variable Dispersion Compensators) 60 and 62 are arranged at the stages preceding the TXFs 18 and 37. The VDC 60 includes a VIPA and an optical amplifier are included. Additionally, VDCs 61 and 63 are arranged at the stages preceding the RXFs 20 and 35 also on the receiving sides. With this configuration, both of pre-stage compensation and post-stage compensation can be made.

With a dispersion compensation method, the numbers of error corrections made by the RXFs 20 and 35 are monitored while varying the dispersion compensation values of the VDCs 60, 61, 62, and 63 in predetermined steps, a point where the number of error corrections becomes the minimum is detected, and this point is set as an optimum point likewise a general threshold value adjustment. These controls are performed by the MPTRs 23 and 41. As a matter of course, dispersion compensation is controlled in units of wavelengths. Or, a command for simultaneously controlling disperson compensation for all of wavelengths can be transmitted by making a specification from the SSEs/CTs.

Examples of a trigger that causes this function to be executed include the following types.
(1) an execution command from the SSE (28 or 46)
(2) an execution command from the CT (29 or 47)

With both of the threshold value control and the dispersion compensation control, set values of all of wavelengths are transmitted to the SSEs 28 and 46/the CTs 29 and 47 after optimum points are set, and the SSEs/the CTs are made to display and store the set values.

FIGS. 3 to 8 are block diagrams showing the procedures of the respective control functions.

Figure 3:
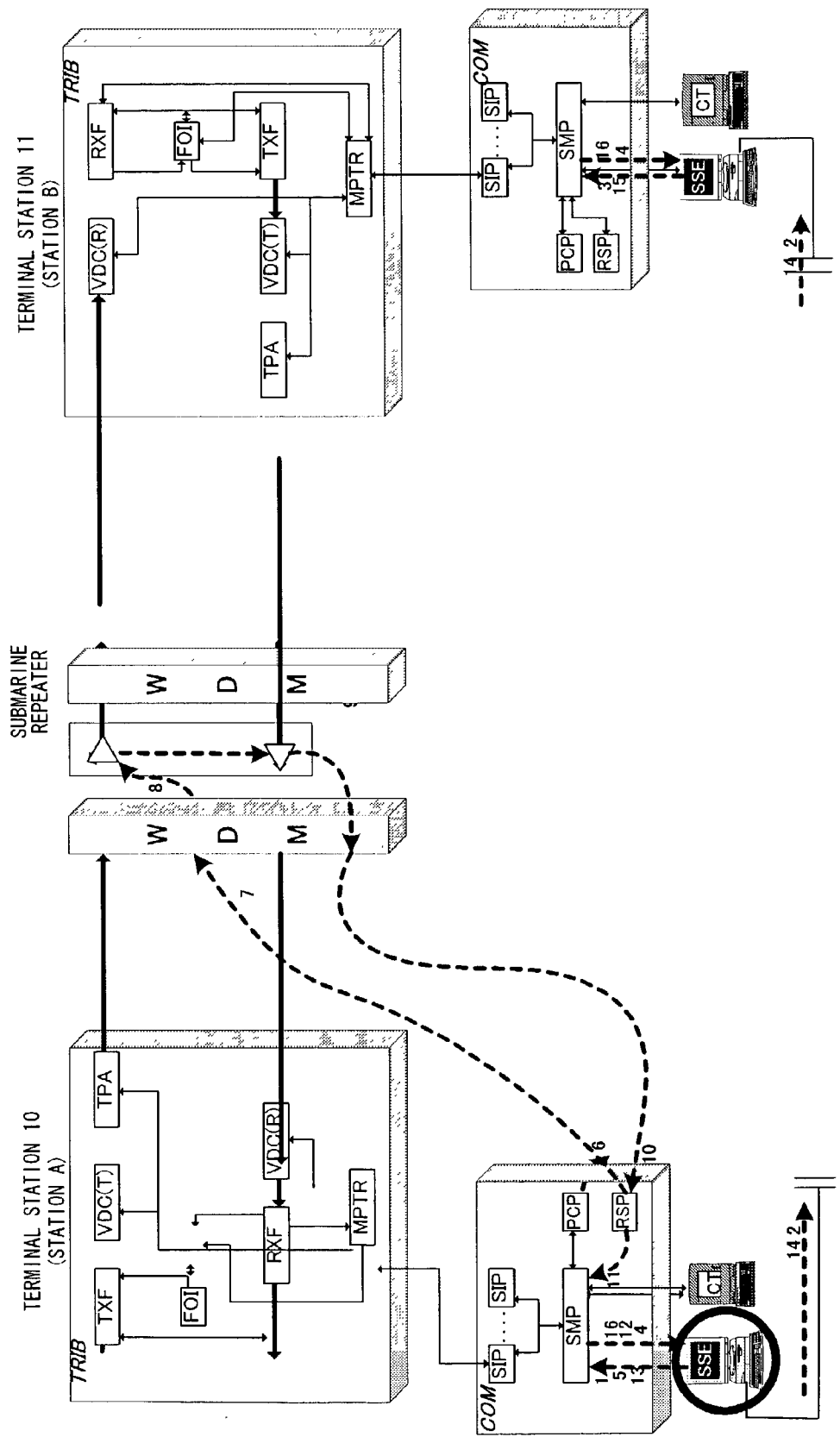
FIG. 3 is a block diagram showing the procedure of each control function (No. 1)

FIG. 3 is a block diagram showing an execution sequence of a repeater supervisory control (hereinafter referred to as SV). This figure shows a sequence that originates from the station A. However, a sequence is similar if it originates from the station B.
(1) Firstly, an SV inquiry (preparation) request is transmitted from the SSE of the station A to the SMP. This is a request to make an inquiry about whether or not a repeater supervisory control command can be executed before this command is actually issued.
(2) An SV inquiry (preparation) request is similarly transmitted from the SSE of the station A to the SSE of the station B. Both of the SSEs are connected normally with a 2M public line (2 Mega line), etc.
(3) The SV inquiry (preparation) request is transmitted also from the SSE of the station B, which receives the SV inquiry (preparation) request, to the SMP of the station B.
(4) After the SMP of the station A verifies that the other main signal controls are not executed, it returns an OK response, which permits the transmission of the repeater supervisory command, to the SSE of the station A.
(5) The repeater supervisory command is transmitted from the SSE of the station A to the SMP of the station A.
(6) The SMP transfers the repeater supervisory command to the RSP.
(7) The RSP converts the level of the command, and transmits the command to the WDM unit, by which the command is superposed on a main signal.
(8) The command is transmitted to the repeater.
(9) A response signal to the command is transmitted from the repeater.
(10) The response signal is input to the RSP of the COM unit via the WDM unit.
(11) The response signal is transmitted from the RSP to the SMP.

(12) The SMP returns the response signal to the SSE. The SSE displays a result of the response.
(13) An SV inquiry (completion) request is transmitted from the SSE in order to notify the termination of the repeater supervisory control.
(14) An SV inquiry (completion) request is also transmitted from the SSE of the station A to the SSE of the station B.
(15) The SV inquiry (completion) request is transmitted also from the SSE of the station B, which receives the SV inquiry (completion) request, to the SMP of the station B.
(16) The SMP of the station A returns an OK response to the SSE of the station A as a response to the repeater supervisory completion notification.

Up to this point, this sequence is completed.

Figure 4:
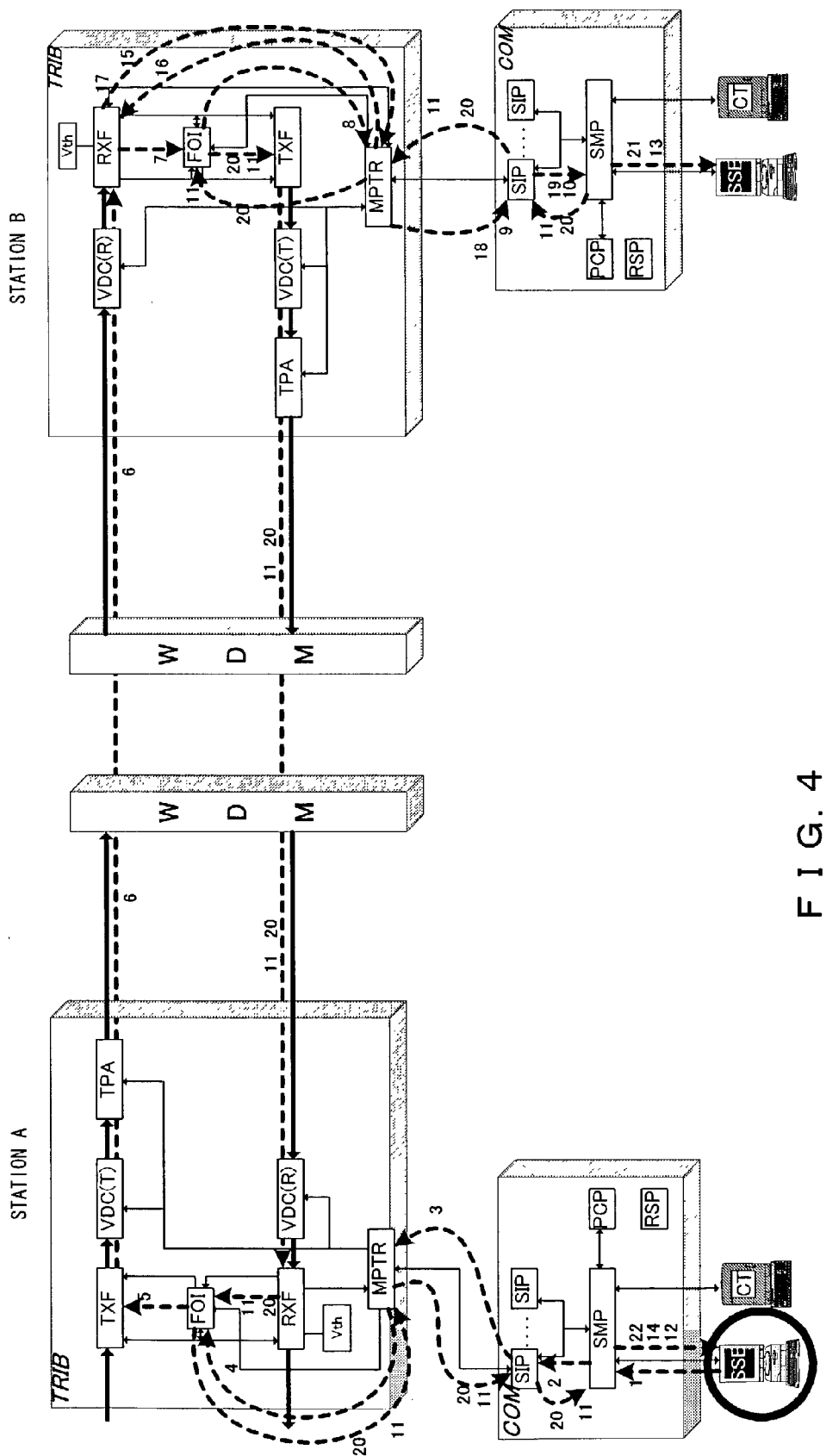
FIG. 4 is a block diagram showing the procedure of each control function (No. 2)

FIG. 4 is a block diagram showing the first half of a pre-emphasis automatic adjustment sequence. This sequence originates from the station A. However, a sequence is similar if it originates from the station B.

In the preferred embodiment according to the present invention, receiver threshold values of all of wavelengths of an opposed station are once automatically adjusted in all cases before the pre-emphasis control is executed. The first half portion is a sequence until the threshold value automatic adjustment is completed.

(1) A pre-emphasis (PE) adjustment start command is transmitted from the SSE of the station A to the SMP.
(2) An opposed station threshold value adjustment execution command is transmitted from the SMP to the SIP.
(3) The information of (2) is transmitted to the MPTR of the TRIB unit for a communication channel used to transmit the PE adjustment start command.
(4) The information of (3) is transferred to the FOI.
(5) 2M data of the information is multiplexed in an overhead by the TXF.
(6) The information is transmitted to the station B as a main signal.
(7) The 2M data is extracted from the overhead by the RXF of the station B.
(8) The information of (2) extracted by the RXF of the station B is transmitted to the MPTR of the station B.
(9) The information of (8) is transferred to the SIP of the COM unit of the station B.
(10) The information of (9) is transferred to the SMP.
(11) The SMP issues a threshold value automatic adjustment start command to the TRIB units for all of wavelengths by using the received information as a trigger. All of the TRIB units then start the threshold value automatic adjustment. As a result, status information of the MPTR "a receiver threshold value is being adjusted" is transmitted to the TRIB unit for the same wavelength within the opposed station.
(12) The SMP of the station A returns an OK response to the SSE as a response to (1).
(13) A Vth adjusting status, which indicates that the threshold value (Vth) adjustment is started in each of the TRIB units of the station B, is transmitted to the SSE of the station B for each of the TRIB units.
(14) A remote station Vth adjusting status is transmitted to the SSE also in the station A.
(15) In the station B, the number of FEC error corrections is collected from the RXF by the MPTR.
(16) The MPTR instructs the RXF to vary the threshold value (Vth).
(17) The MPTR reads the set values written in (15), evaluates the values, and repeats (13) to (16) to iterate the adjustment. These operations are respectively performed for an amplitude threshold value and a phase threshold value, which are converged by the automatic adjustment, and settled in optimum values.
(18) Completion of the threshold value settings is notified from the MPTR of each of the TRIB units to the SIP of the COM unit.
(19) The information of (18) is transferred to the SMP.
(20) A threshold value adjustment completion status, which indicates that the threshold value adjustment is completed in all of the TRIB units, is transmitted from the SMP of the station B to the SMP of the station A.
(21) In the station B, the Vth adjusting status of all of the TRIB units is changed to OFF, and transmitted to the SSE.
(22) Remote station Vth adjustment status OFF signals of all of the TRIB units are transmitted to the SSE also in the station A.

Upon termination of the above described threshold value automatic adjustment of the receiver of the station B, a transfer is made to the sequence of the pre-emphasis adjustment of the station A as the latter half shown in FIG. 5.

(23) The pre-emphasis adjustment is started in the station A, and a PE adjusting status is transmitted to the SIP.
(24) The information of (20) is transferred to the MPTR of a TRIB unit for a communications path.
(25) The information of (21) is transferred to the FOI.
(26) The information of (20) is multiplexed in an overhead by the TXF as 2M data.
(27) The information is transmitted to the station B as a main signal.
(28) The 2M data is extracted from the overhead by the RXF of the station B.
(29) The information of (20) is transmitted to the MPTR.
(30) The information of (26) is transferred to the SIP.
(31) The information of (27) is transferred to the SMP.
(32) The SMP of the station B transmits a remote station PE adjusting status ON signal, which indicates that the remote station starts the pre-emphasis adjustment, to the SSE of the station B.
(33) The PE adjusting status ON signal is transmitted from the SMP to the SSE also in the station A.
(34) The SSE of the station A requests the SMP to obtain the currently set PE values of all of wavelengths, and Q value information (obtained by the MPTR of the station A via a communication between the MPTRs, and transferred to the SMP), which is measured on the receiving side of the opposed station.
(35) The SMP transmits the current PE values and the Q value information of the opposed station to the SSE. As a result, the SSE can display the set values and the Q values before the automatic adjustment is started.
(36) The SMP transmits a PE adjustment start command to the PCP.
(37) In the station B, the MPTR collects the information of the number of FEC error corrections made by the RXF, and transmits this information to the station A.
(38) In the station A, the information of (37) is transmitted from the SMP to the PCP.
(39) The PCP transmits a PE set value write command to the SMP.
(40) The PE set value write command is transmitted to the SIP of the corresponding TRIB unit.
(41) The PE set value write command is transmitted to the MPTR of the corresponding TRIB unit.
(42) The MPTR sets the instructed set value in the TPA.
(43) The MPTR reads the value set in (40) from the TPA, and evaluates the content of the value.
(44) After the setting is completed, the PCP calculates a Q value, and calculates the next set value. Then, (39) to (43)

are repeated, and pre-emphases of wavelengths are set to make Q values of all of the wavelengths equal. Here, the adjustment is completed.

(45) Upon completion of the adjustment, the PCP sets a PE adjustment flag to OFF, and transmits ths information to the SMP.
(46) A PE adjustment completion status is transmitted to the SMP of the station B as in (23) to (31).
(47) A remote station PE adjusting status OFF signal is transmitted from the SMP of the station B to the SSE.
(48) Also in the station A, the SMP transmits a PE adjusting status OFF signal to the SSE.
(49) The SSE of the station A requests the SMP to obtain currently set PE values of wavelengths and the Q values of the opposed station after the automatic adjustment is completed.
(50) The SMP of the station A transmits to the SSE the PE set values and the Q values after the automatic adjustment is made.

Up to this point, this sequence is completed.

Figure 6:
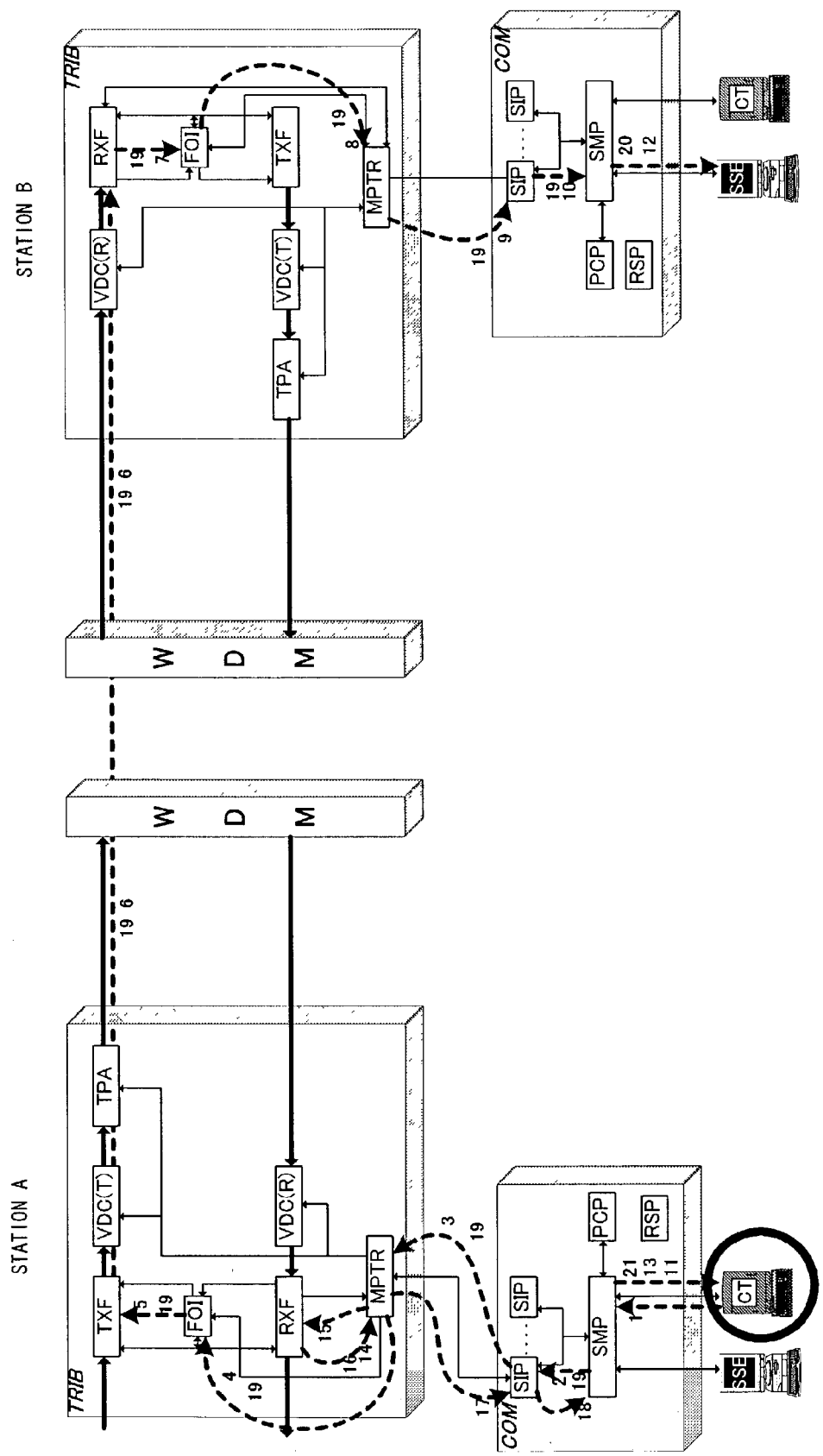
FIG. 6 is a block diagram showing the procedure of each control function (No. 4)

FIG. 6 is a block diagram showing a receiver threshold value automatic adjustment sequence. This sequence originates from the station A. However, a sequence is similar if it originates from the station B.

Fundamentally, this sequence is the same as the first half of the pre-emphasis adjustment (however, a command is issued to the TRIP units of the local station).

(1) A threshold value adjustment start command is transmitted from the SSE of the station A to the SMP of the station A.
(2) A threshold value adjusting status is transmitted from the SMP of the station A to the SIP of all of the TRIB units of the station A.
(3) The information of (2) is transferred to the MPTR of the corresponding TRIB unit of the station A.
(4) The information of (3) is transferred to the FOI.
(5) 2M data from the FOI is multiplexed in an overhead by the TXF.
(6) A main signal on which the information from the FOI is multiplexed is transmitted to the station B.
(7) The RXF of the station B demultiplexes the 2M data from the overhead.
(8) The information of (2) is transferred to the MPTR of the station B.
(9) The information of (8) is transferred to the SIP of the station B.
(10) The information of (9) is transferred to the SMP of the station B.
(11) It is notified to the CT of the station A that the threshold value adjustment can be made.
(12) A remote threshold value adjusting status ON signal is transmitted from the SMP of the station B to the SSE of the station B.
(13) A threshold value adjusting status ON signal is transmitted from the SMP of the station A to the CT of the station A.
(14) The MPTR of the station A collects the current identifing voltage, phase, and the number of FEC error corrections from the RXF of the station A.
(15) The threshold value is varied and set for the RXF of the station A.
(16) The set value is read and evaluated. (15) and (16) are repeated, an optimum value is set, and a setting completion is transmitted to the MPTR of the station A.
(17) The setting completion is transmitted to the SIP of the station A.
(18) The information of (17) is transferred to the SMP of the station A.
(19) A threshold value adjustment completion status is transmitted from the SMP of the station A to the SMP of the station B as in (2) to (10).
(20) A remote threshold value adjusting status OFF signal is transmitted from the SMP of the station B to the SSE of the station B.
(21) A threshold value adjusting status OFF signal is transmitted from the SMP of the station A to the CT of the station A.

Up to this point, this sequence is completed.

Figure 7:
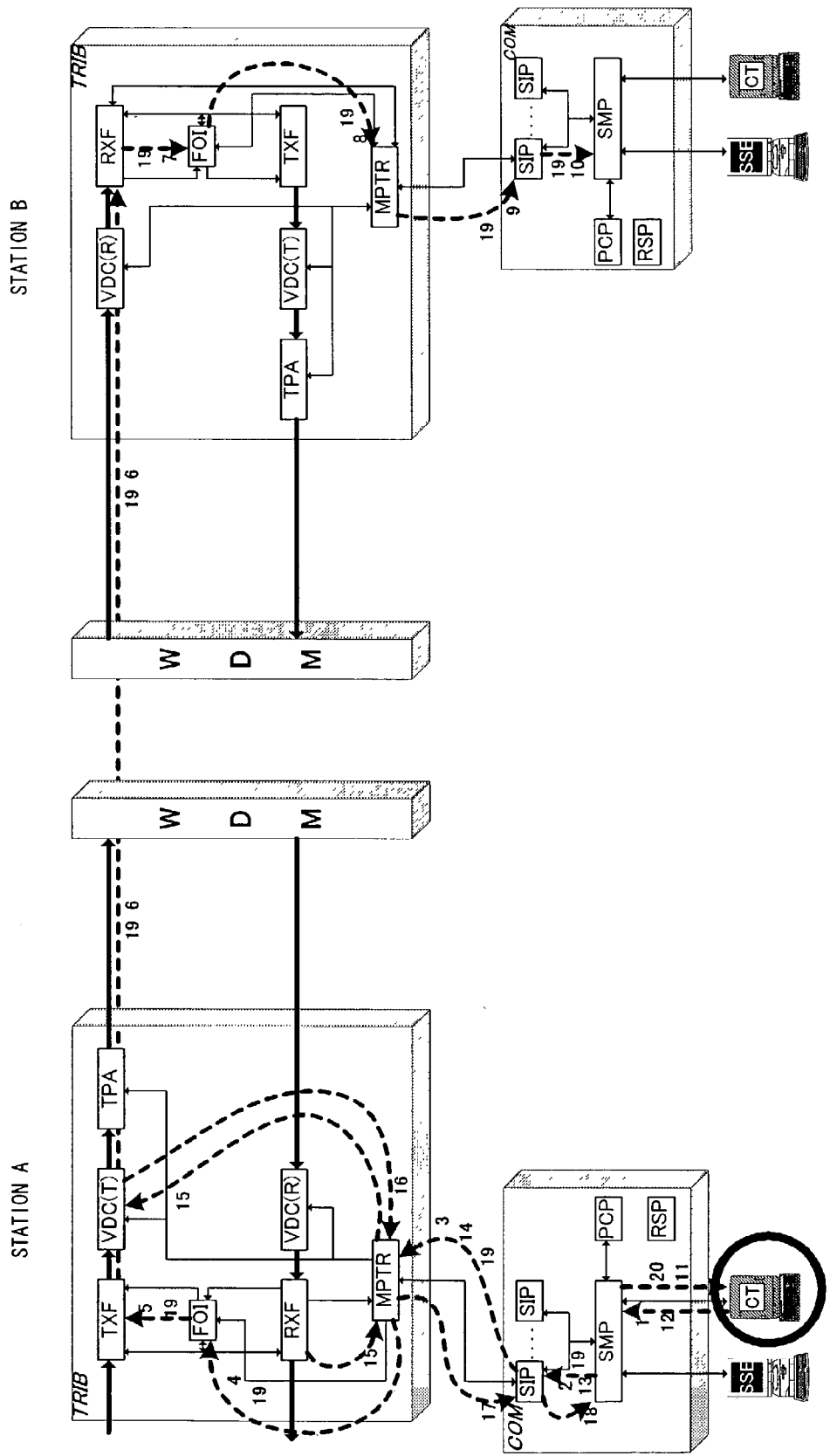
FIG. 7 is a block diagram showing the procedure of each control function (No. 5)
Figure 8:
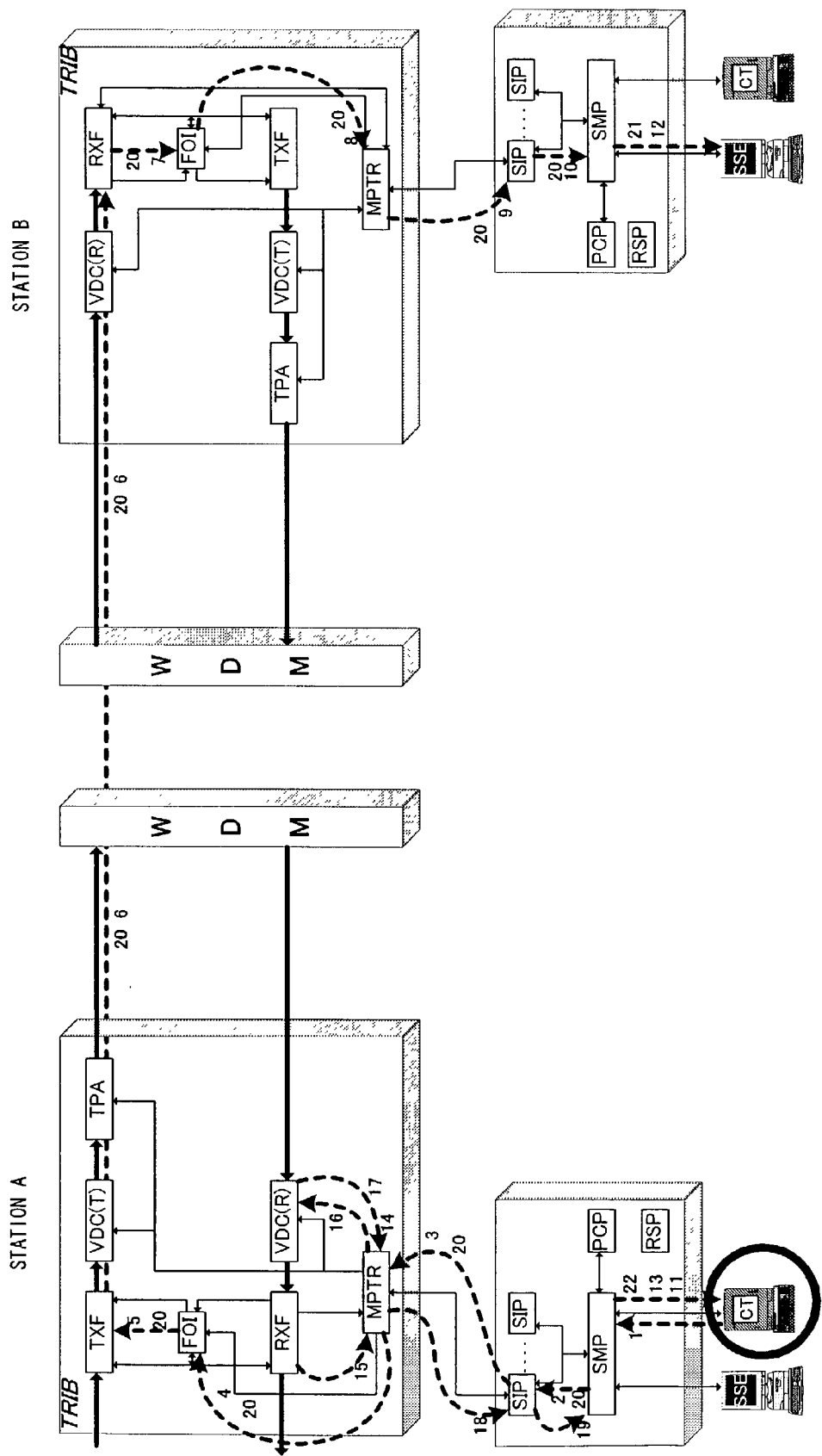
FIG. 8 is a block diagram showing the procedure of each control function (No. 6)

FIGS. 7 and 8 are block diagrams showing a dispersion value automatic adjustment sequence. This sequence originates from the station A. However, a sequence is similar if it originates from the station B. Although VDCs exist on both of the transmitting and the receiving sides, there is no need to arrange an automatic adjustment function on both of the sides. Fundamentally, a method making an automatic adjustment for the VDC on the receiving side of the opposed station after setting the VDC on the transmitting side to a predetermined value is suitable.

FIG. 7 is a block diagram showing a dispersion compensation amount setting sequence on the transmitting side.

(1) A VDC(T) (a transmitting side VDC) setting start command is transmitted from the SSE (CT) of the station A to the SMP.
(2) After the SMP of the station A verifies that the other controls are not executed, it transmits a VDC(T) setting flag to the SIP of the station A.
(3) The above described two information are transferred also to the MPTR of the TRIB unit of the station A, which corresponds to a channel for transmitting the information.
(4) The VDC(T) setting flag is transferred to the FOI of the station A.
(5) The TXF of the station A multiplexes the data of (4) in an overhead.
(6) The data of (4) is transmitted to the station B as a main signal.
(7) The RXF of the station B extracts the 2M data of (4) from the overhead.
(8) The information of (4) is transmitted to the MPTR of the station B.
(9) The information of (8) is transferred to the SIP of the station B.
(10) The information of (9) is transferred to the SMP of the station B.
(11) An OK response is returned from the SMP of the station A to the SSE (CT) of the station A as a response to (1).
(12) The SSE (CT) of the station A transmits a set value to the SMP of the station A.
(13) The information of (12) is transferred to the SIP of the TRIB unit of the station A, which corresponds to a channel for which a dispersion compensation amount is set.
(14) The information of (13) is transmitted to the MPTR of the corresponding TRIB.
(15) The MPTR sets the dispersion compensation value instructed in (12) in the VDC(T).
(16) The set value is read and evaluated.
(17) The MPTR notifies the SIP that the setting is completed.
(18) The information of (17) is transferred to the SMP of the station A. (19) A VDC(T) setting completion status is transmitted to the SMP of the station B.
(20) The VDC(T) setting completion status is transmitted from the SMP of the station B to the SSE (CT).

Up to this point, this sequence is completed.

FIG. 8 is a block diagram showing a dispersion value automatic adjustment sequence (on the receiving side). This sequence originates from the station A. However, a sequence is similar if it originates from the station B.
(1) A VDC R (a receiving side VDC) adjustment start command is transmitted from the SSE (CT) of the station A to the SMP.
(2) After the SMP verifies that the other controls are not executed, it transmits a VDC (R) automatic adjusting status to the SIP.
(3) The information of (2) is transferred to the MPTR of the TRIB unit, which corresponds to a channel for communicating the information.
(4) A VDC(R) automatic adjusting flag is transferred to the FOI.
(5) The TXF multiplexes the data of (4) in an overhead.
(6) The data multiplexed in the overhead is transmitted to the station B as a main signal.
(7) The 2M data multiplexed in the overhead is extracted from the overhead by the RXF of the station B.
(8) The information of (4) is transmitted to the MPTR of the station B.
(9) The information of (8) is transferred to the SIP.
(10) The information of (9) is transferred to the SMP.
(11) In the station A, an OK response notifying that the VDC(T) setting can be made is transmitted to the CT (SSE).
(12) The SMP of the station B transmits a remote station VDC(R) adjusting status ON signal to the SSE (CT).
(13) The SMP of the station A transmits a VDC(R) adjusting status ON signal to the SSE (CT).
(14) In the station A, the currently set dispersion value is collected from the VDC(R) by the MPTR.
(15) Furthermore, the number of FEC error corrections is collected from the RXF by the MPTR.
(16) The dispersion compensation value is varied in predetermined steps and set in the VDC(R).
(17) The set value is read from the VDC(R) and evaluated.
(14) and (15) are repeated, the dispersion compensation value is set to a value that minimizes the number of errors, and the setting is completed.
(18) The MPTR sets the VDC(R) automatic adjusting(?) flag to OFF, and transmits this information to the SIP.
(19) The information of (18) is transferred to the SMP.
(20) A VDC(R) automatic adjustment completion status is transmitted to the SMP of the station B.
(21) The SMP of the station B transmits a remote station VDC(R) automatic adjusting status OFF signal to the SSE (CT).
(22) A VDC(R) automatic adjusting status OFF signal is transmitted from the SMP of the station A to the SSE (CT).
Up to this point, this sequence is completed.

As a means for providing protection so as not to simultaneously execute the above described four control functions, there is a method making a communication between the SMPs of the COM units of local and opposed stations, or between the SSEs of the local and the opposed stations. As a means for making a communication between the SMPs, an overhead of a main signal is used. There are a method directly connecting the SMP and the FOI of the TRIB unit, and a method interfacing with the FOI via the SIP and the MPTR of the TRIB unit. In this case, a TRIB unit used for a communication path is predetermined, and a communication is made via this path.

As information exchanged between the SMPs, two types of information such as a command and a status are used. The command is information that a local station instructs an opposed station, and is transmitted, for example, in the case where an opposed station is instructed to start a threshold value control.

The status is information that a local station notifies an opposed station of its current status. Commands and statuses, which are exchanged in a communication between the SMPs, are listed in Table 1.

TABLE 1

| Information type | Name | Description |
|---|---|---|
| command | threshold value (Vth) automatic adjustment execution command | Instructing an opposed station to make a threshold value adjustment when a local station receives a pre-emphasis adjustment start command from SSE/CT. |
| | threshold value (Vth) automatic adjustment forcible termination command | Instructing an opposed station to stop/recover a threshold value adjustment when the opposed station receives a control command (repeater control or pre-emphasis) with higher priority during threshold value automatic adjustment. |
| | pre-emphasis (PE) automatic adjustment forcible termination command | Instructing an opposed station to stop/recover a pre-emphasis adjustment when the opposed station receives a control command (repeater control) with higher priority during pre-emphasis automatic adjustment. |
| | receiver dispersion value (VDC(R)) automatic adjustment forcible termination command | Instructing an opposed station to stop/recover receiver dispersion value automatic adjustment when the opposed station receives a control command (repeater control, pre-empahsis, or threshold value control) with higher priority during receiver dispersion value automatic adjustment. |
| status | threshold value (Vth) automatic adjusting status | Notifying an opposed station that a local station is making a threshold value automatic adjustment. |
| | threshold value (Vth) automatic adjustment rejection status | Notifying that a threshold value adjustment cannot be made in response to a threshold value (Vth) automatic adjustment execution command from an opposed station |
| | threshold value (Vth) automatic adjustment abnormal termination status | Notifying that a recovery process is performed when a local station receives a control with higher priority or a fault occurs during a threshold value adjustment. |

TABLE 1-continued

| Information type | Name | Description |
|---|---|---|
| | threshold value (Vth) automatic adjustment completion status | Notifying that a threshold value adjustment of a local station is completed. |
| | pre-emphasis (PE) automatic adjusting status | Notifying an opposed station that a local station is making a pre-emphasis automatic adjustment. |
| | pre-emphasis (PE) automatic adjustment abnormal termination status | Notifying that a recovery process is performed when a local station receives a control with higher priority or a fault occurs during a pre-emphasis automatic adjustment. |
| | pre-emphasis (PE) automatic adjustment completion status | Notifying that a pre-emphasis automatic adjustment of a local station is completed. |
| | transmitting side dispersion value (VDC (T)) in-setting status | Notifying that a local station is setting a transmitting side dispersion value. |
| | transmitting side dispersion value (VDC (T)) setting completion status | Notifying that a transmitting side dispersion value setting of a local station is completed. |
| | receiving side dispersion value (VDC(R)) automatic adjusting status | Notifying that a local station is making a receiving side dispersion value automatic adjustment. |
| | receiving side dispersion value (VDC(R)) automatic adjustment forcible termination status | Notifying that a recovery process is performed when a local station receives a control with higher priority or a fault occurs during a receiving side dispersion value adjustment. |
| | receiving side dispersion value (VDC(R)) automatic adjustment completion status | Notifying that a receiving side dispersion value automatic adjustment of a local station is completed. |

For the repeater supervisory control, its commands themselves are managed by the SSEs. Therefore, the commands and the statuses are communicated between the SSEs.

Additionally, a control function with higher degrees of importance and emergency can be preferentially processed by assigning priorities to the above described four control functions. A priority referred to here is a priority assigned to any of diverse control commands, for example, some of which simultaneously occur.

The priorities are represented by Table 2 of FIG. 9. The following priorities are provided. repeater supervisory control>pre-emphasis control>receiver threshold value control>dispersion compensation control The above described controls are arranged in a descending order of the degrees of importance and emergence.

The repeater supervisory control has the highest degree of emergency. There is a high possibility that a fault which occurrs in a repeater becomes a signal fault of all of wavelengths. Therefore, the highest priority must be assigned. The pre-emphasis control has the second highest priority. If a pre-emphasis of a certain wavelength changes, it exerts an influence on other wavelengths. Therefore, the second highest priority must be assigned. The receiver threshold value control has the third highest priority. Since this is a control function for a single wavelength, it exerts less influence on other wavelengths than the pre-emphasis, etc. Therefore, the third highest priority is assigned. The dispersion compensation control has the lowest priority. Because wavelength dispersion is almost determined by a system length and a nonlinear effect of a transmission line, readjustment is not so required once an adjustment is made at the start-up of an apparatus. Accordingly, the lowest priority is assigned.

According to these priorities, a pre-emphasis control command is rejected if it is issued, for example, during the repeater supervisory control. Inversely, if the repeater supervisory control command is executed during the pre-emphasis control, the pre-emphasis control is immediately stopped, and the repeater supervisory control command is accepted.

To implement this, a communication is made between the SMPs. As information exchanged between the SMPs, two types of information such as a command and a status are used.

The command is information that a local station instructs an opposed station, and is transmitted, for example, when an opposed station is instructed to stop a pre-emphasis control or a dispersion control.

The status is information that a local station notifies an opposed station of its current status.

If a warning occurs while the above described four control functions are executed, or if a controlling unit is unplugged, protection must be provided. Accordingly, if a warning, etc. occurs during a control, so to speak, a recovery process for recovering to a set value before the control is executed is performed. This process protects a set value from being fixed to a halfway value during a control. This recovery process is applied to all of the controls other than the repeater supervisory control.

Firstly, for the pre-emphasis adjustment, it is dangerous to further continue the pre-emphasis control if an input disconnection occurs in a signal having a certain wavelength. Therefore, the adjustment sequence is stopped. Then, the recovery process is performed, and pre-emphasis values of all of wavelengths are recovered to values before the adjustment is made. These judgment and command issuance are executed by the PCP of the COM unit. Additionally, if the PCP is accidentally unplugged during the automatic adjustment, the pre-emphasis control cannot be continued. Therefore, the SMP prestores in an internal memory set values before adjustment, and sets the values for all of TRIB units. Or, if the MPTR of the TRIB unit is unplugged during the automatic adjustment, the TPA also prestores in an internal memory set values before adjustment, and resets the values inside.

The receiver threshold value adjusting and the dispersion compensation value adjusting are fundamentally the same as the pre-emphasis control. Unlike the pre-emphasis control, however, these adjustment sequences are executed within the TRIB unit. Therefore, the adjustments can be originally continued even if the SMP of the COM unit is unplugged. However, a communication between the SMPs cannot be made, so that a simultaneous control prevention function cannot be used. Accordingly, the recovery process for recovering to values before the adjustment is made is performed for safety also in this case.

Fundamental operations of the present invention are shown in FIGS. 10 to 14. These figures explain an information exchange made between the stations.

Figure 10:
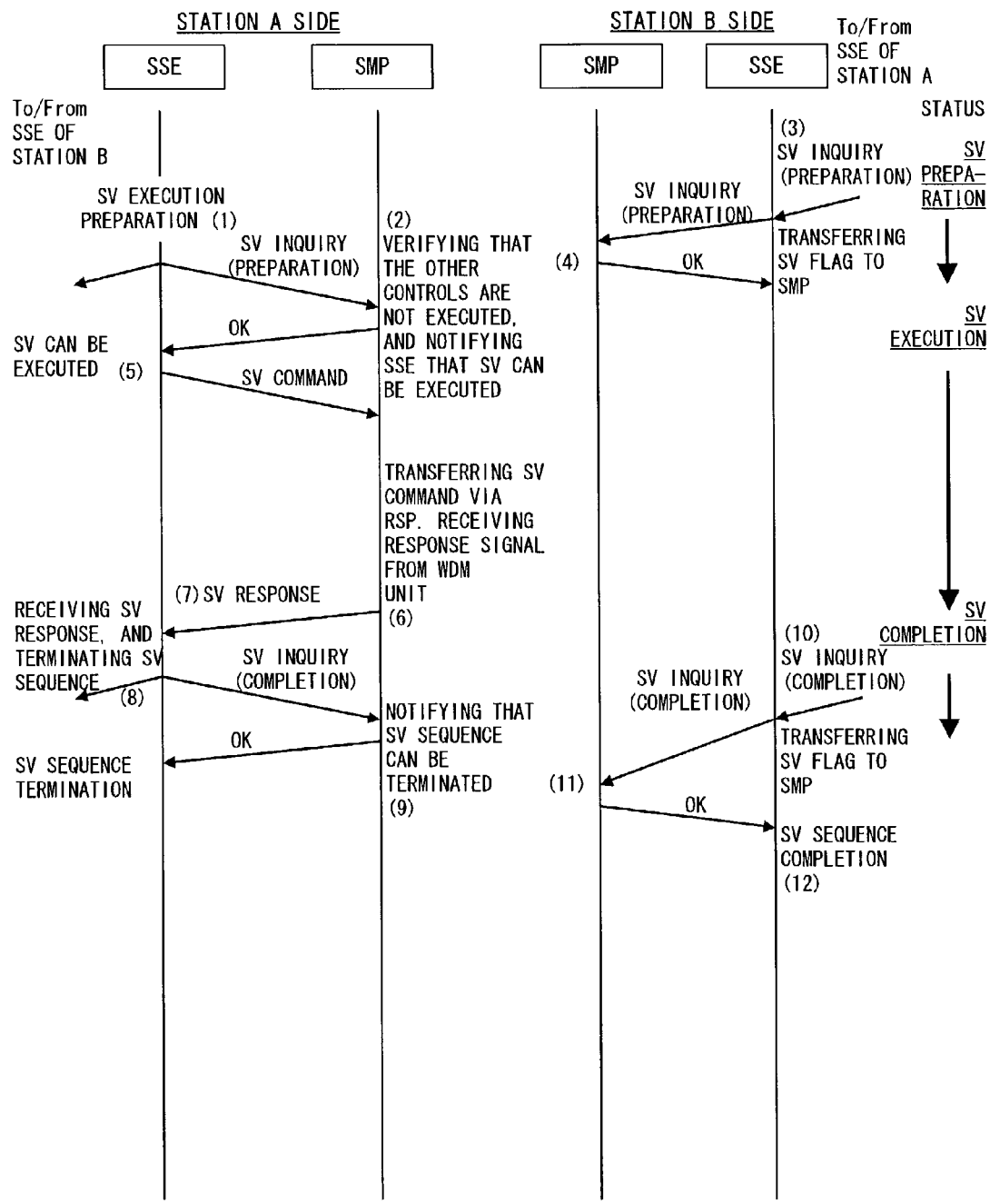
FIG. 10 shows the fundamental operations of the preferred embodiment according to the present invention, and explains each information exchange made between stations (No. 1)
Figure 11:
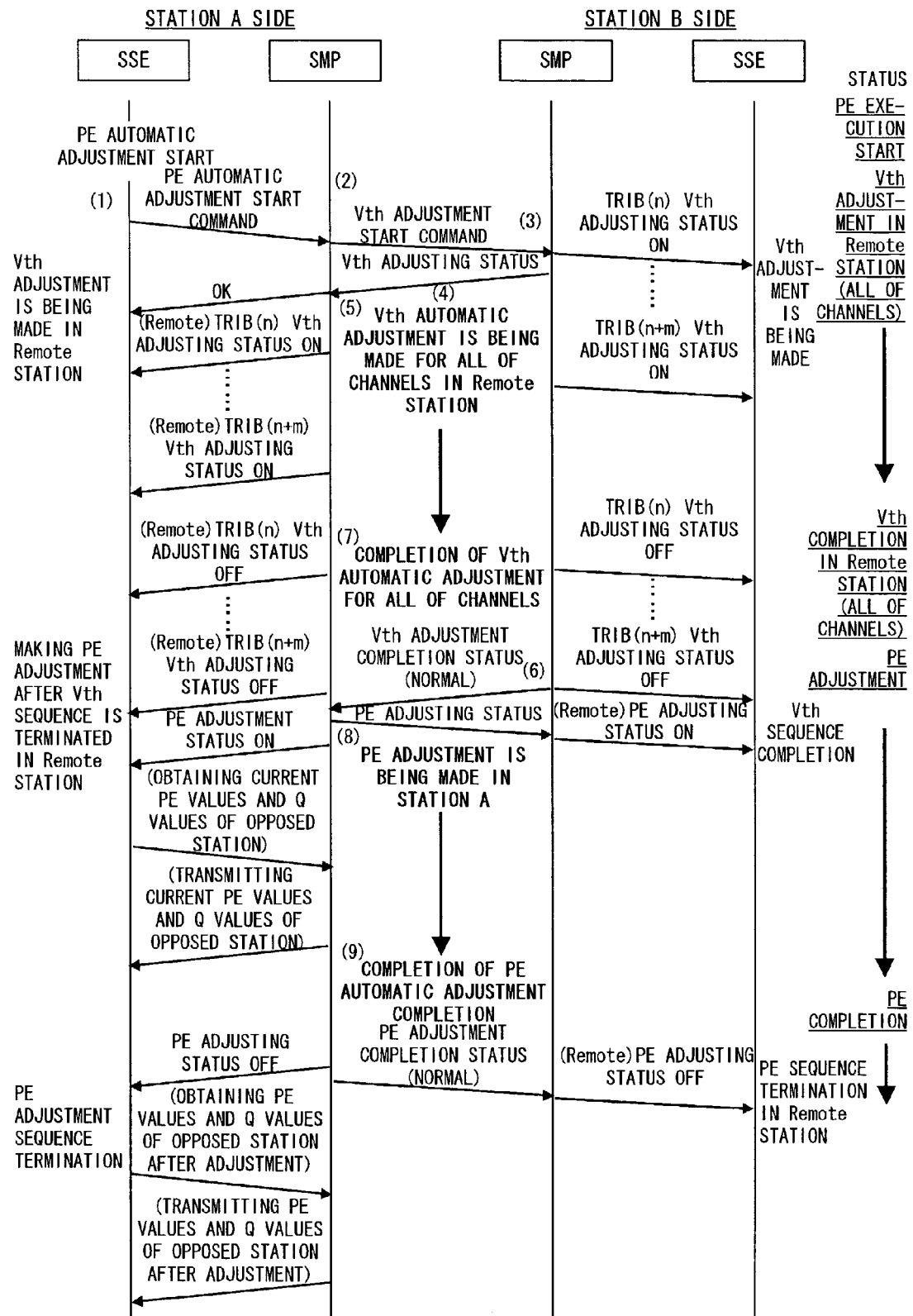
FIG. 11 shows the fundamental operations of the preferred embodiment according to the present invention, and explains each information exchange made between stations (No. 2)
Figure 12:
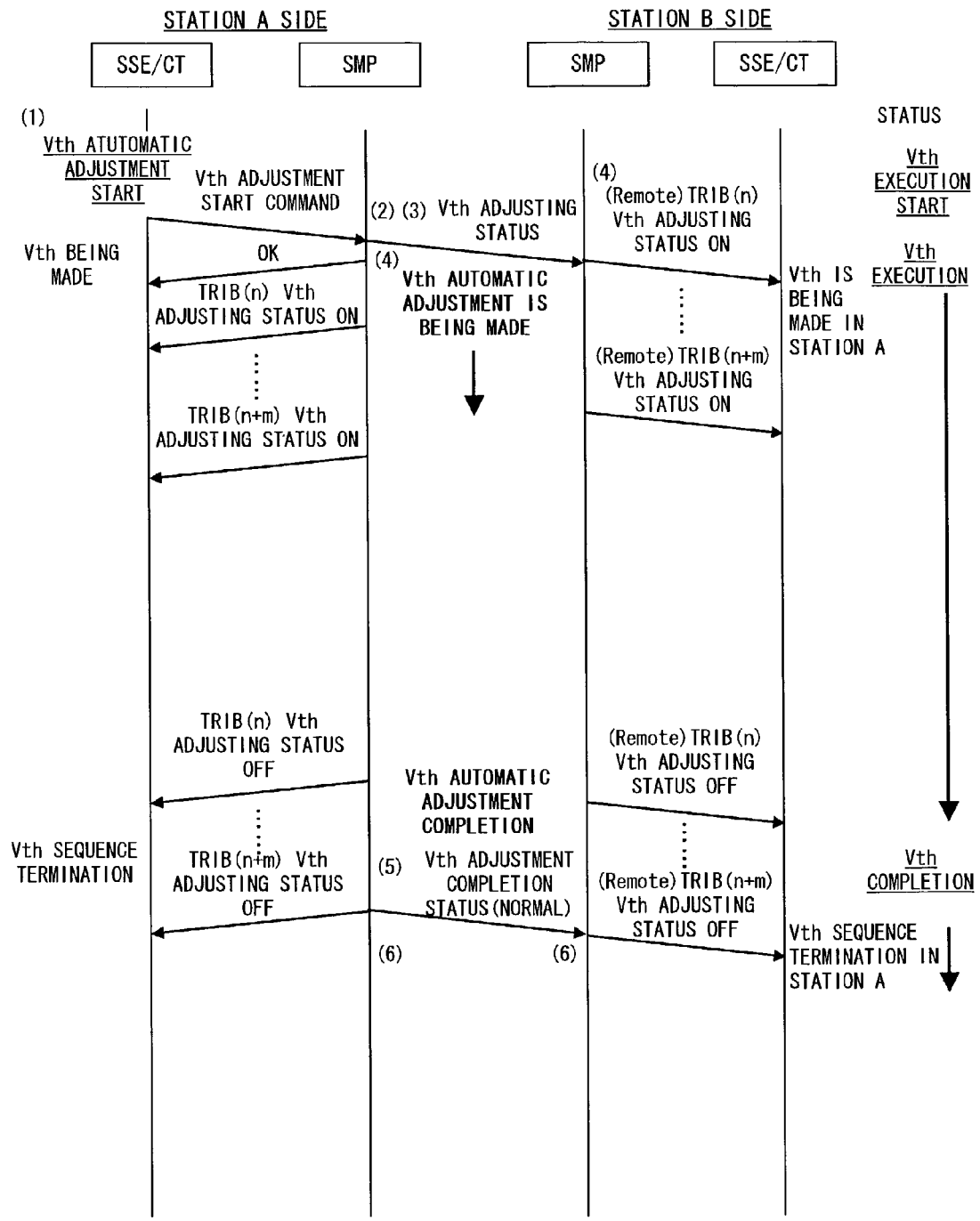
FIG. 12 shows the fundamental operations of the preferred embodiment according to the present invention, and explains each information exchange made between stations (No. 3)
Figure 13:
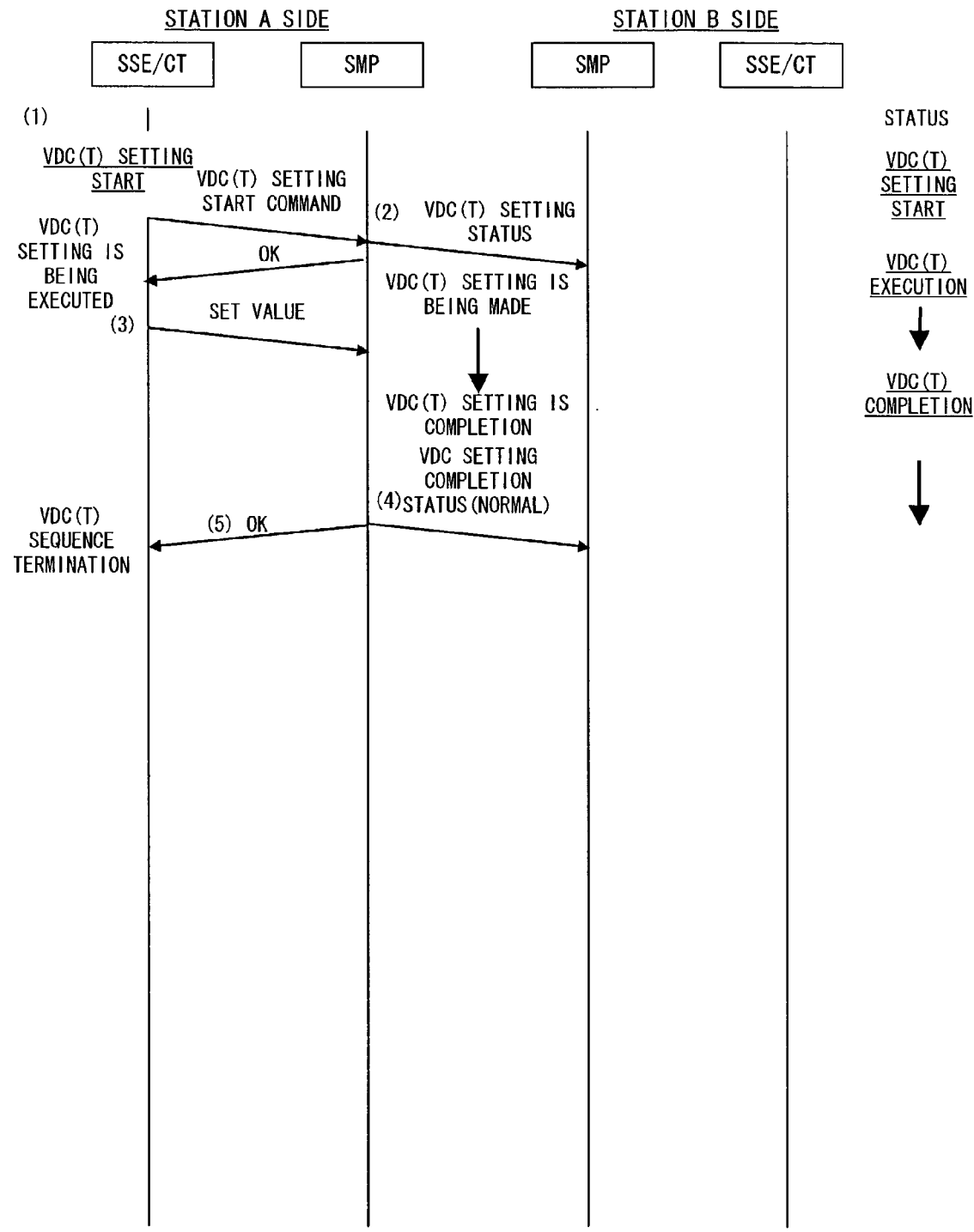
FIG. 13 shows the fundamental operations of the preferred embodiment according to the present invention, and explains each information exchange made between stations (No. 4)
Figure 14:
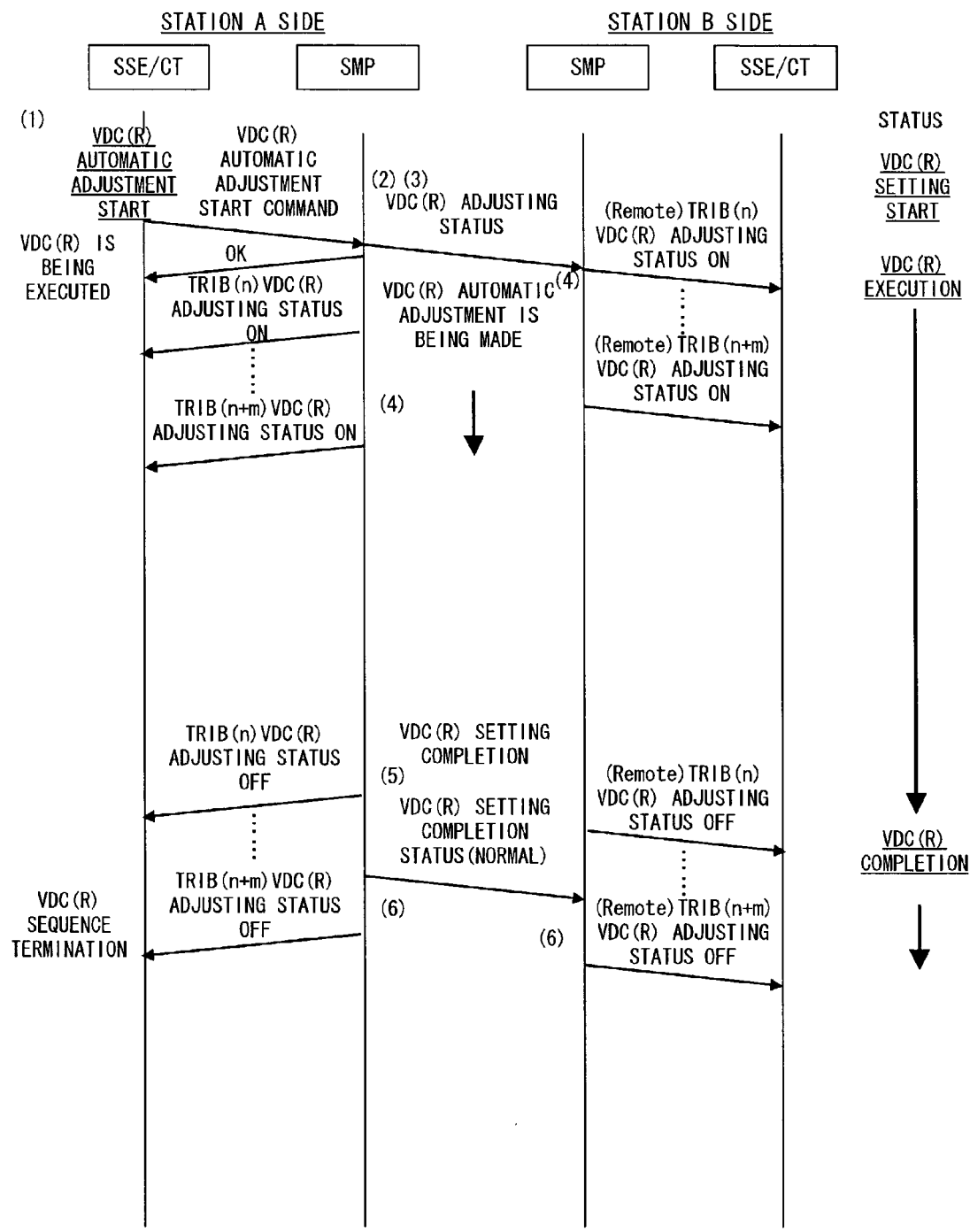
FIG. 14 shows the fundamental operations of the preferred embodiment according to the present invention, and explains each information exchange made between stations (No. 5)
Figure 15:
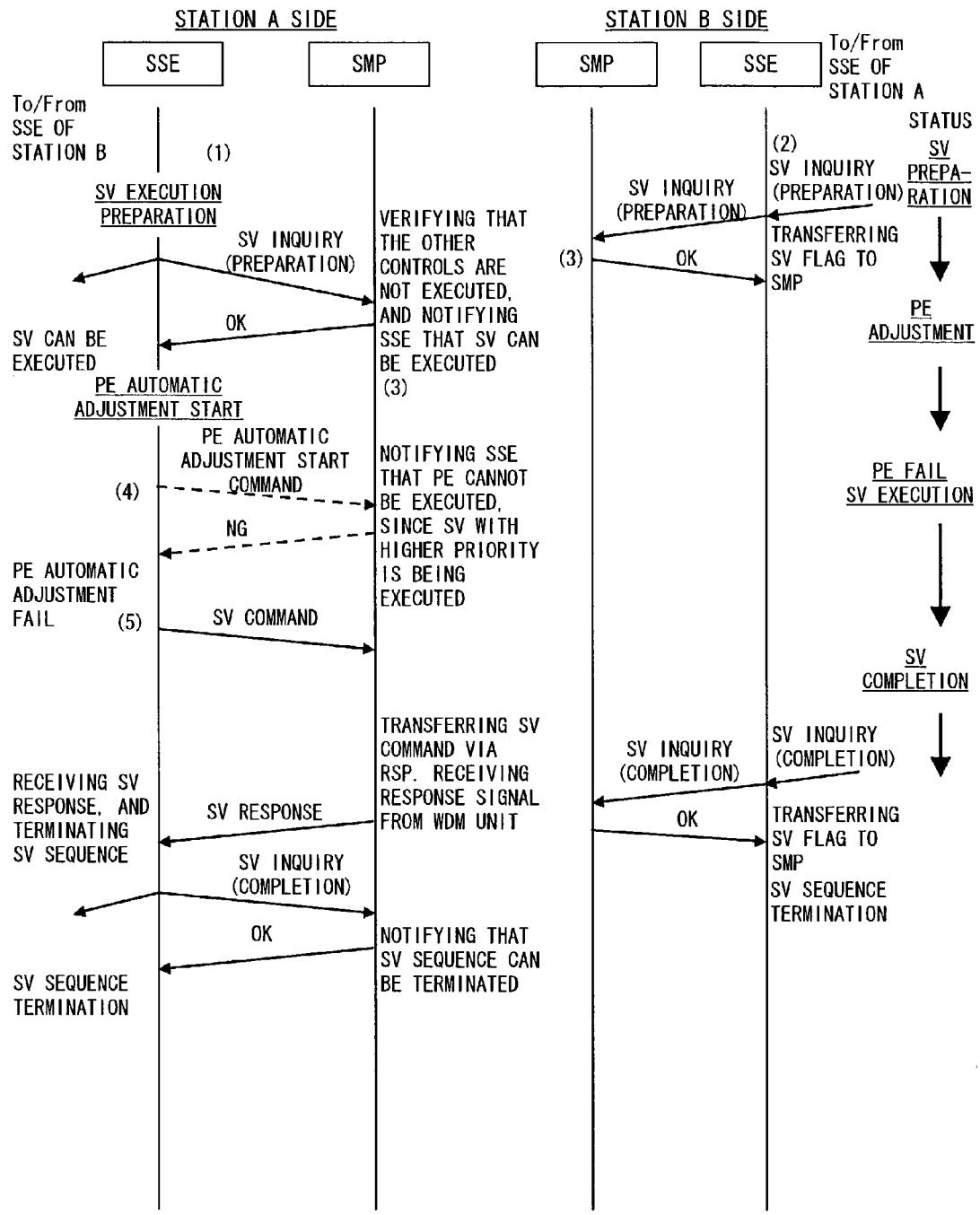
FIG. 15 exemplifies each operational sequence when an interrupt is made during a repeater supervisory control (No. 1)

FIG. 10 shows a sequence of fundamental operations of the repeater supervisory control (SV), FIG. 11 shows a sequence of fundamental operations of the pre-emphasis automatic adjustment (PE), FIG. 12 shows a sequence of fundamental operations of the receiver threshold value automatic adjustment, FIG. 13 shows a sequence of fundamental operations of the transmitting side dispersion compensation value setting, and FIG. 14 shows a sequence of fundamental operations of the receiving side dispersion compensation value automatic adjustment.

Commands and statuses are exchanged between the SMPs (between the SSEs for the repeater supervisory control), so that the respective control sequences are implemented.

Here, the repeater supervisory control, the pre-emphasis automatic adjustment, the receiver threshold value automatic adjustment, and the dispersion value automatic adjustment are respectively referred to as SV, PE automatic adjustment, Vth automatic adjustment, and VDC automatic adjustment.

repeater supervisory control (FIG. 10)
(1) An SV inquiry (preparation) request is transmitted from the SSE of the station A to the SMP.
(2) The SMP of the station A verifies that the other controls are not executed and a warning does not occur within the local station, and returns an OK response to the SSE.
(3) The information of SV preparation is transmitted also to the SSE of the station B via a communication made between the SSEs, and an SV inquiry (preparation) request is also transmitted from the SSE of the station B to the SMP of the station B.
(4) The SMP of the station B verifies that the other controls are not executed and a warning does not occur within the local station, and returns an OK response to the SSE.
(5) A repeater supervisory control command (SV command) is transmitted from the SSE of the station A to the SMP.
(6) The SV command is transmitted to the repeater, and its response is returned from the repeater.
(7) The SV response is transmitted from the SMP of the station A to the SSE of the station A.
(8) After the SSE of the station A verifies that the SV response is received, it transmits an SV inquiry (completion) request to the SMP.
(9) An OK response is returned from the SMP of the station A to the SSE of the station A.
(10) An SV inquiry (completion) request from the SSE of the station A is transmitted also to the SSE of the station B.
(11) The SV inquiry (completion) request is transmitted from the SSE of the station B to the SMP of the station B.
(12) The SMP of the station B returns an OK response to the SSE of the station B.

Namely, the repeater supervisory control is operated with a communication made between the SSEs.

pre-emphasis automatic adjustment (FIG. 11)
(1) A PE automatic adjustment start command is transmitted from the SSE of the station A to the SMP.
(2) The SMP of the station A transmits a Vth adjustment start command to the opposed station.
(3) The SMP of the station B that receives the Vth adjustment start command verifies that the other controls are not executed and a warning is not issued, and issues a threshold value adjustment command to the TRIB units for all of wavelengths (the threshold value automatic adjustment sequence is executed in the station B). Additionally, a Vth adjusting status ON signal for each of the TRIB units is transmitted to the SSE of the station B.
(4) A Vth adjusting status is transmitted from the SMP of the station B to the SMP of the station A.
(5) The SMP of the station A that receives the Vth adjusting status transmits an OK response to the SSE as a response to (1). Additionally, the SMP of the station A transmits a remote station Vth adjusting status ON signal for each of the TRIB units to the SSE of the station A.
(6) Upon completion of the threshold value automatic adjustment sequence in the station B, a Vth adjustment completion status is transmitted from the SMP of the station B to the SMP of the station A. Furthermore, a Vth adjusting status OFF signal for each of the TRIB units is transmitted to the SSE of the station B.
(7) Also in the station A, a Vth adjusting status OFF signal for each of the TRIB units is transmitted to the SSE. The SMP of the station A that receives the Vth adjustment completion status issues a pre-emphasis adjustment command to the PCP. The pre-emphasis automatic adjustment sequence starts in the station A by using this command as a trigger.
(8) A PE automatic adjusting status is transmitted from the SSE of the station A to the SMP of the station B. Additionally, a PE adjusting status ON signal is transmitted also to the SSE.
(9) Upon completion of the pre-emphasis automatic adjustment sequence, a PE adjustment completion status is transmitted from the SMP of the station A to the SMP of the station B. Additionally, a PE adjustment status OFF signal and a remote station PE adjusting status OFF signal are respectively transmitted to the SSE of the station A and the SSE of the station B.

receiver threshold value automatic adjustment (FIG. 12)
(1) A Vth automatic adjustment start command is transmitted from the SSE of the station A to the SMP.
(2) After the SMP of the station A verifies that the other controls are not executed and a waning does not occur, it issues a Vth adjustment command to a specified TRIB unit or the TRIB units for all of wavelengths. As a result, the threshold value automatic adjustment sequence is started in each of the TRIB units.
(3) The SMP of the station A returns an OK response to the SSE as a response to (1). At the same time, the SMP transmits a Vth automatic adjusting status to the opposed station.
(4) A Vth adjusting status ON signal for each of the TRIB units is transmitted to the SSE of the station A. Furthermore, a remote station Vth adjusting status ON signal for each of the TRIB units is transmitted to the SSE of the station B.
(5) Upon completion of the threshold value automatic adjustment sequence, a Vth adjustment completion status is transmitted from the SMP of the station A to the SMP of the station B.
(6) A Vth adjusting status OFF signal for each of the TRIB units is transmitted to the SSE of the station A. Furthermore, a remote station Vth adjusting status OFF signal for each of the TRIB units is transmitted to the SSE of the station B.

transmitting side dispersion value setting (FIG. 13)
(1) A VDC(T) setting start command is transmitted from the SSE of the station A to the SMP.
(2) After the SMP of the station A verifies that the other controls are not executed and a warning does not occur, it returns an OK response to the SSE. At the same time, the SMP transmits a VDC(T) setting status to the opposed station.

(3) The SSE of the station A transmits a set value input by an operator to the SMP. The SMP transmits the received set value to a specified TRIB unit, so that the transmitting side dispersion value is set for a VDC(T) unit.

(4) Upon completion of the setting, a VDC(T) setting completion status is transmitted from the SMP of the station A to the SMP of the station B.

(5) An OK response is returned to the SSE of the station A as a response to (3).

receiving side dispersion value automatic adjustment (FIG. 14)

(1) A VDC(R) automatic adjustment start command is transmitted from the SSE of the station A to the SMP.

(2) After the SMP of the station A verifies that the other controls are not executed and a warning does not occur, it issues a VDC(R) automatic adjustment command to a specified TRIB unit or the TRIB units for all of wavelengths. As a result, the receiving side dispersion value automatic adjustment sequence is started in each of the TRIB units.

(3) The SMP of the station A returns an OK response to the SSE as a response to (1). At the same time, the SMP transmits a VDC(R) automatic adjusting status to the opposed station.

(4) A VDC(R) adjusting status ON signal for each of the TRIB units is transmitted to the SSE of the station A. Additionally, a remote station VDC(R) adjusting status ON signal for each of the TRIB units is transmitted to the SSE of the station B.

(5) Upon completion of the automatic adjustment sequence, a VDC(R) adjustment completion status is transmitted from the SMP of the station A to the SMP of the station B.

(6) A VDC (R) adjusting status OFF signal for each of the TRIB units is transmitted to the SSE of the station A. Additionally, a remote station VDC (R) adjusting status OFF signal is transmitted to the SSE of the station B.

As described above, the commands and the statuses are transmitted/received between the SSEs and between the SMPs, whereby the status of an opposed station can be continuously learned. As a result, the repeater supervisory control, the pre-emphasis control, the threshold value control, and the dispersion value control can be executed without exerting an influence on a main signal, and without making an operator conscious of the controls.

FIGS. 15 to 23 exemplify each operational sequence when an interrupt is made during the repeater supervisory control.

By assigning priorities, the repeater supervisory control is defined as the highest priority item. Accordingly, any other controls are rejected during the repeater supervisory control in both of local and opposed stations.

(1) An SV inquiry (preparation) is transmitted from the SSE of the station A to the SMP of the station A and the SSE of the station B.

(2) An SV inquiry (preparation) is transmitted from the SSE of the station B to the SMP of the station B.

(3) An OK response is returned from the SMPs of the stations A and B as a response to the SV inquiry (preparation).

The operations so far are the same as those of the beginning of the above described repeater supervisory control sequence. Here, assume that a PE automatic adjustment start interrupt is made (4). The PE automatic adjustment start command is transmitted to the SMP. However, since the SMP is executing the repeater supervisory control sequence with a higher priority, it notifies the SSE that the PE automatic adjustment cannot be made, and transmits an SV command to the SMP in (5) to continue the SV sequence without making the PE automatic adjustment. Because subsequent operations are the same as those of the above described SV sequence, an explanation is omitted.

Figure 16:
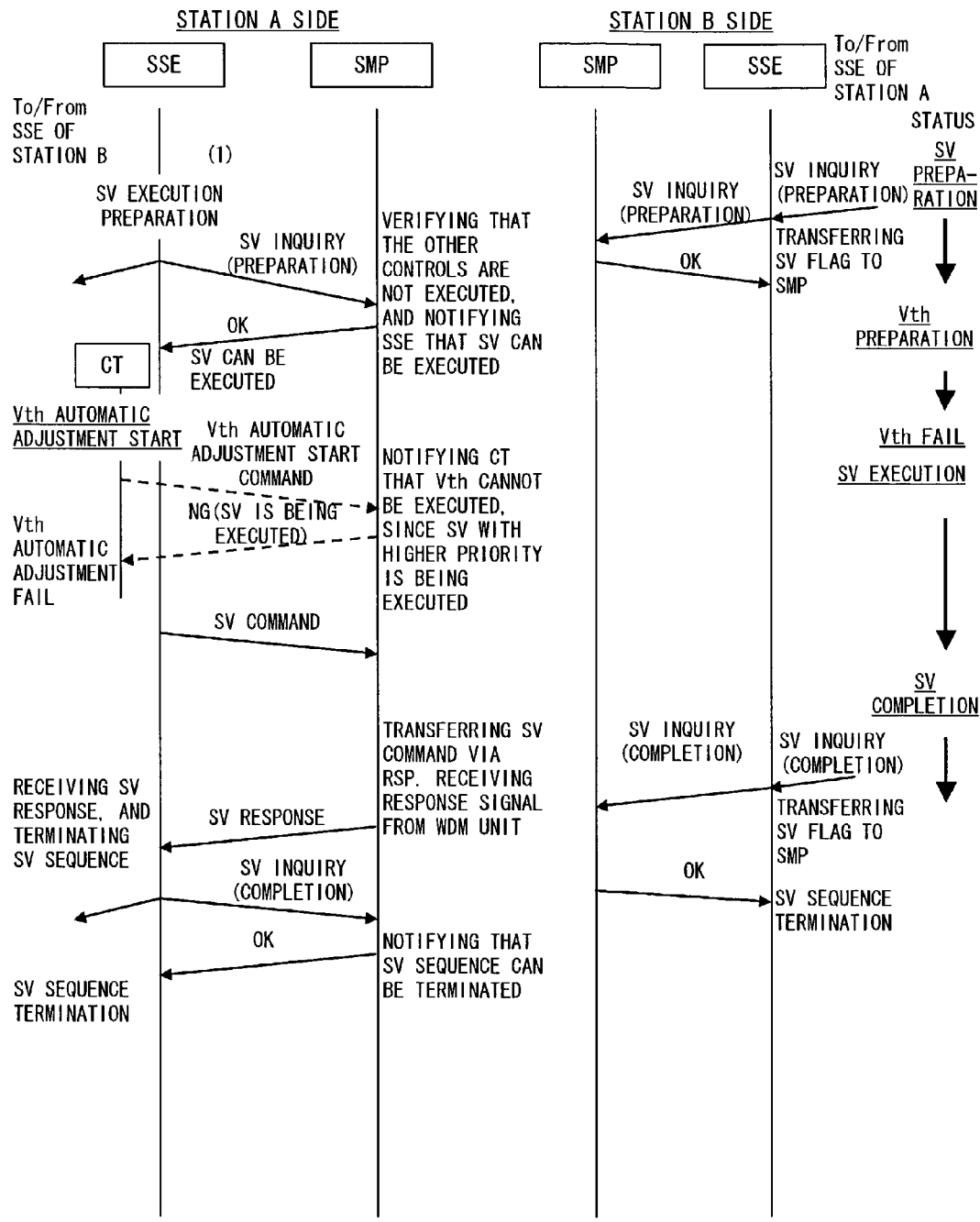
FIG. 16 exemplifies each operational sequence when an interrupt is made during the repeater supervisory control (No. 2)

FIG. 16 shows the case where an SV inquiry (preparation) request to prepare for SV execution is transmitted from the SSE of the station A to the SMP of the station A, and the SSE and the SMP of the station B, and a Vth automatic adjustment start command is issued from the CT of the station A to the SMP when an OK response is returned as a response to the request. Since the SMP of the station A that receives the Vth automatic adjustment start command is executing the SV with a higher priority, it notifies the CT that the Vth automatic adjustment cannot be made, and the SV sequence is continued. The SV sequence is described above, and accordingly, its explanation is omitted here.

Figure 17:
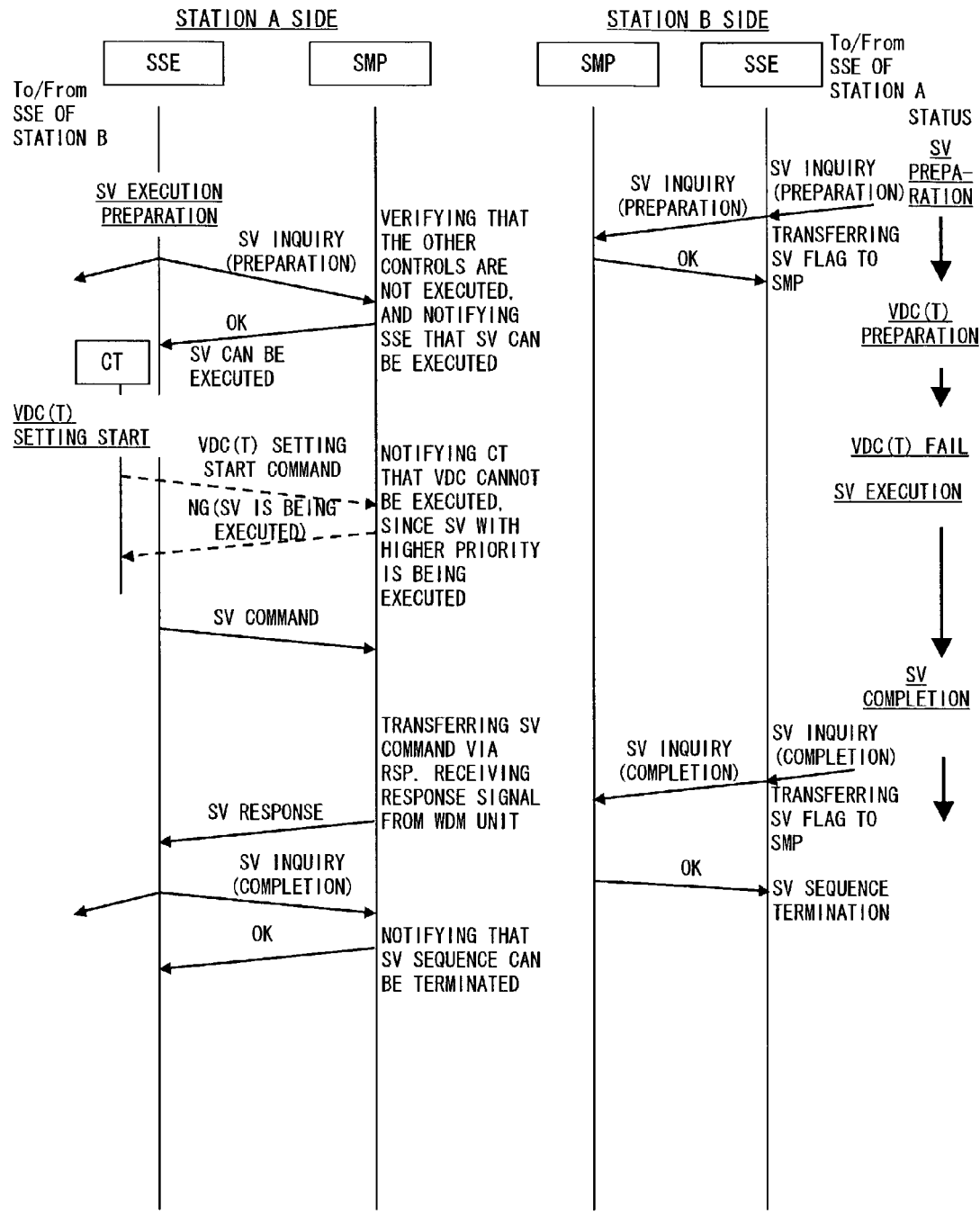
FIG. 17 exemplifies each operational sequence when an interrupt is made during the repeater supervisory control (No. 3)

FIG. 17 shows the case where a VDC(T) setting start command is issued from the CT to the SMP of the station A, after the SV sequence is originated from the SSE of the station A. Because the SMP is executing the SV sequence the priority of which is higher than the VDC(T) setting also in this case, it returns to the CT a notification that the request from the CT cannot be accepted, and the SV sequence is continued. For the SV sequence, see the above provided explanation.

Figure 18:
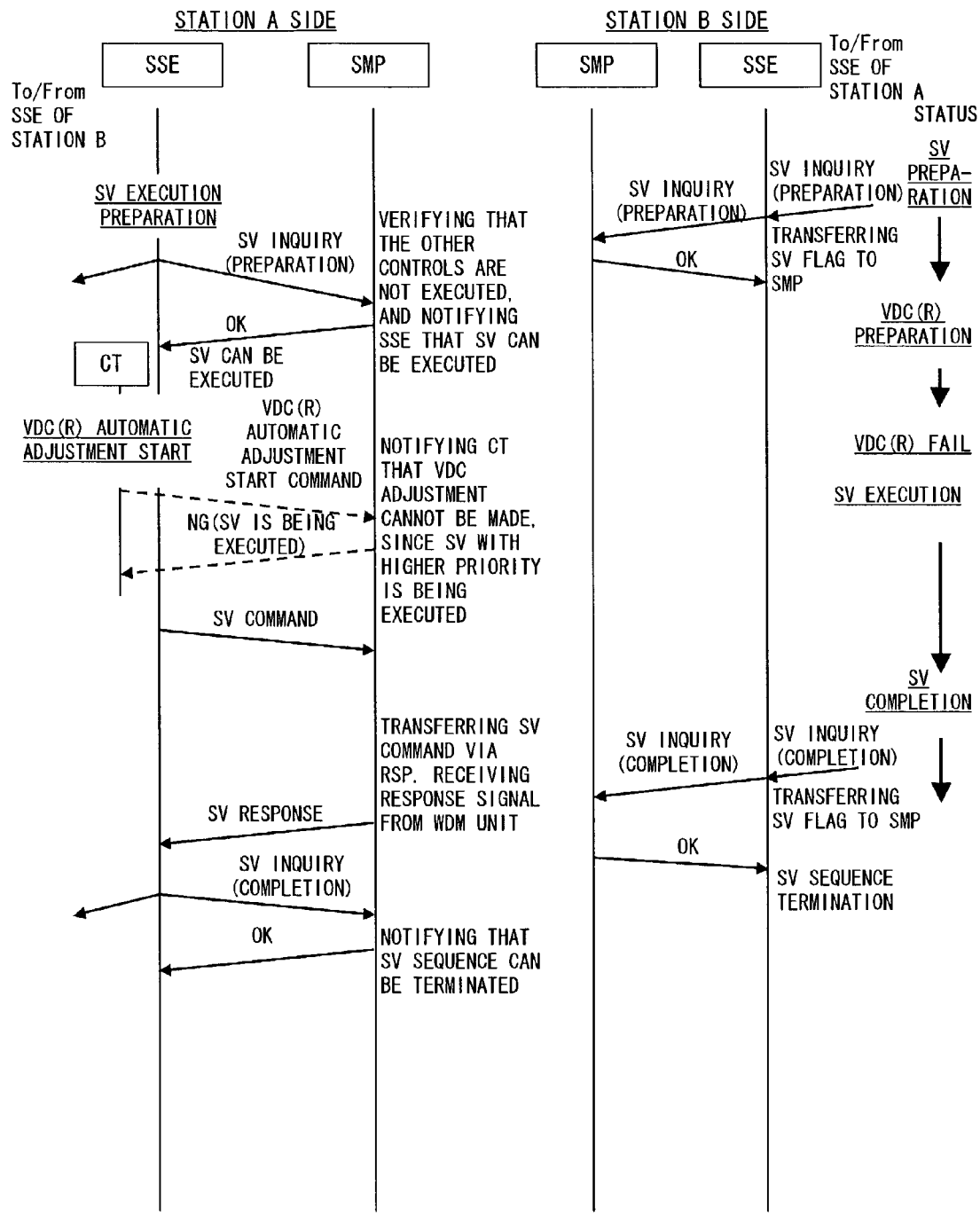
FIG. 18 exemplifies each operational sequence when an interrupt is made during repeater supervisory control (No. 4)

FIG. 18 shows the case where a VDC(R) automatic adjustment start command is issued from the CT of the station A to the SMP of the station A, when the SV sequence is originated from the SSE of the station A. The SMP of the station A detects that the SV sequence the priority of which is higher than the VDC(R) automatic adjustment is being executed, notifies the CT that the VDC(R) automatic adjustment cannot be made, and the SV sequence is continued.

Figure 19:
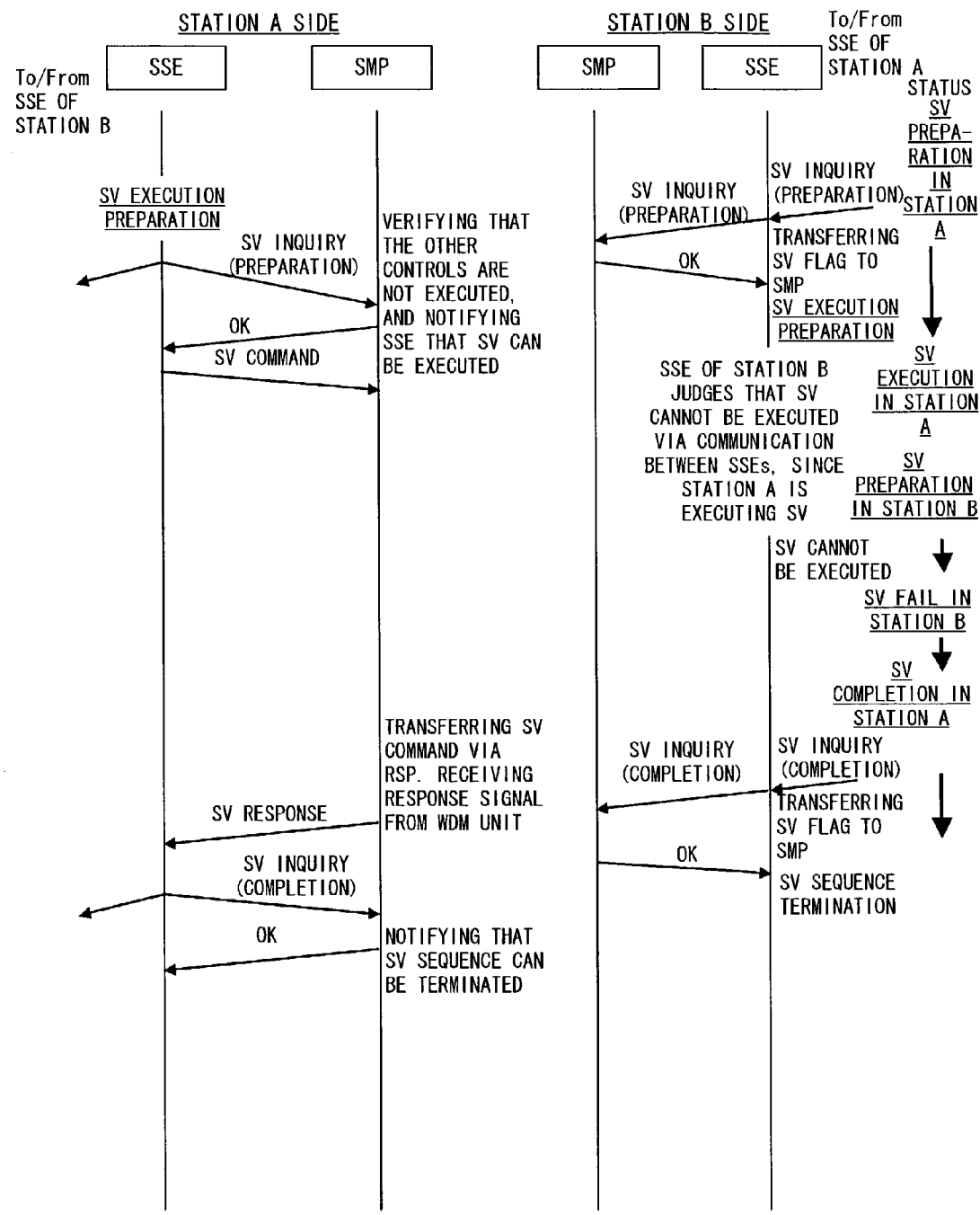
FIG. 19 exemplifies each operational sequence when an interrupt is made during the repeater supervisory control (No. 5)

FIG. 19 shows the case where an SV sequence start command is to be issued from the SSE of the station B after the SV sequence is originated from the SSE of the station A. Since both of the sequences are SV sequences in this case, their priorities are the same. However, the SSE of the station B learns that the station A is executing the SV sequence, via a communication between the SSEs, and the SSE of the station B protects the SV sequence start command from being issued from the station B. Thereafter, the SV sequence originated with the command from the SSE of the station A is continued.

Figure 20:
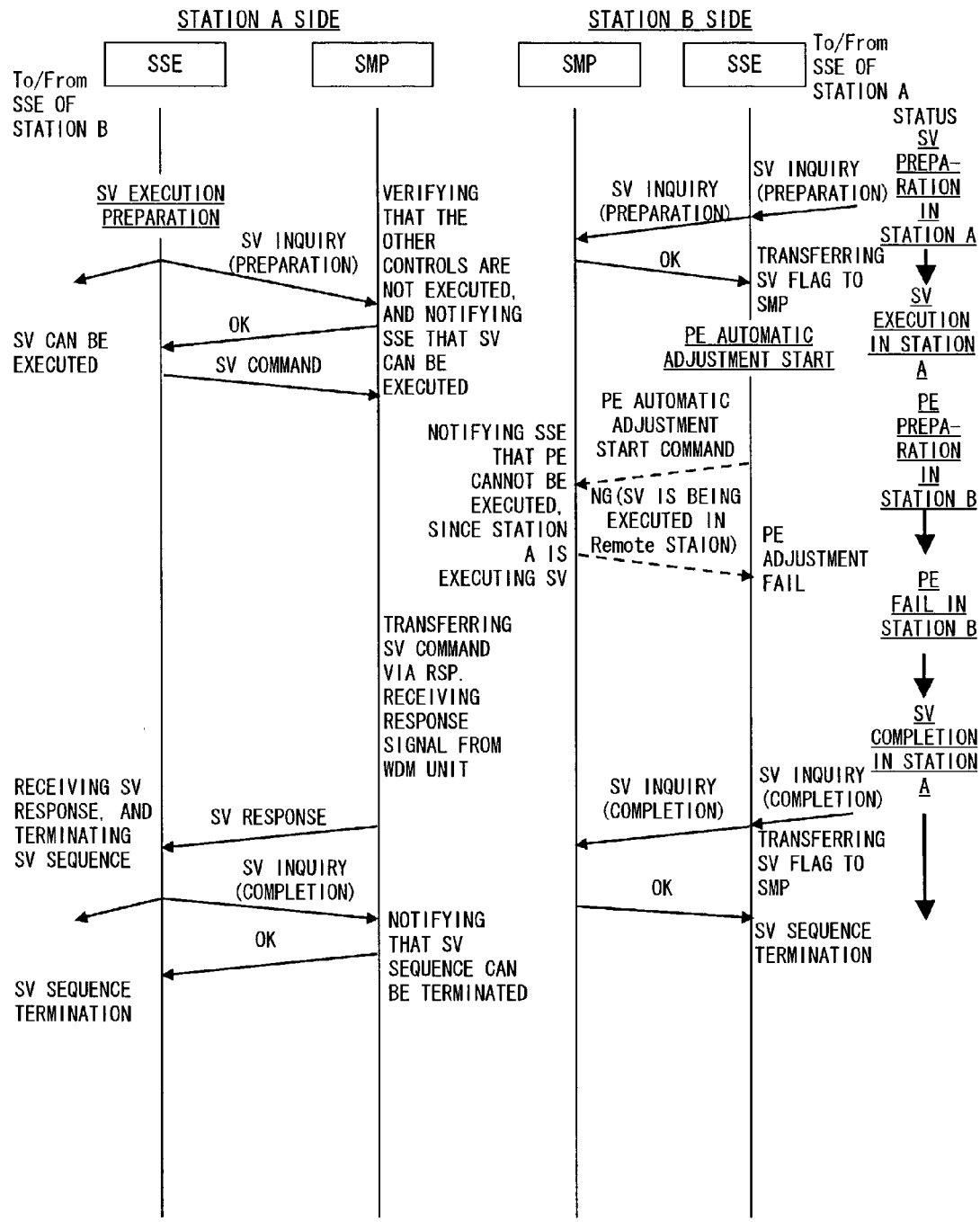
FIG. 20 exemplifies each operational sequence when an interrupt is made during the repeater supervisory control (No. 6)

FIG. 20 shows the case where a PE automatic adjustment start command is issued from the SSE of the station B when an SV sequence based on a command from the SSE of the station A is being executed. Since the SMP of the station B learns that the SV sequence is being executed according to the command from the SSE of the station A in this case, it notifies the SSE of the station B that the PE automatic adjustment command cannot be executed, upon receipt of the PE automatic adjustment command from the SSE of the station B. Thereafter, the SV sequence according to the command from the SSE of the station A is continued.

Figure 21:
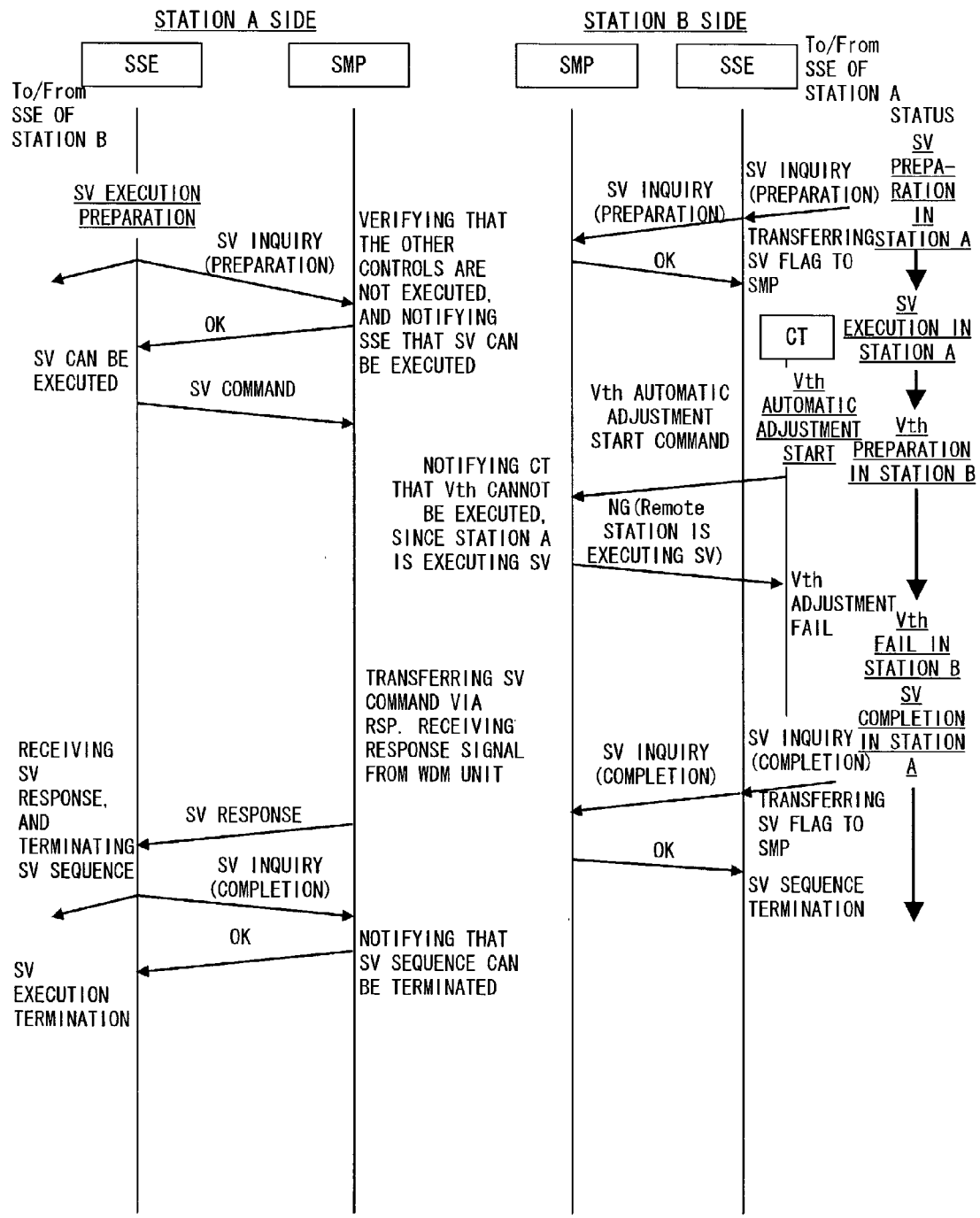
FIG. 21 exemplifies each operational sequence when an interrupt is made during the repeater supervisory control (No. 7)

FIG. 21 shows the case where a Vth automatic adjustment start command is issued from the CT of the station B to the SMP of the station B, after an SV sequence based on a command from the SSE of the station A is originated. Although the Vth automatic adjustment start command is issued from the SSE of the station B to the SMP of the station B, the SMP of the station B learns that the SV sequence originated from the station A is being executed.

Therefore, the SMP notifies the CT of the station B that the Vth automatic adjustment sequence cannot be executed. The SV sequence originated with the command from the SSE of the station A is continued.

Figure 22:
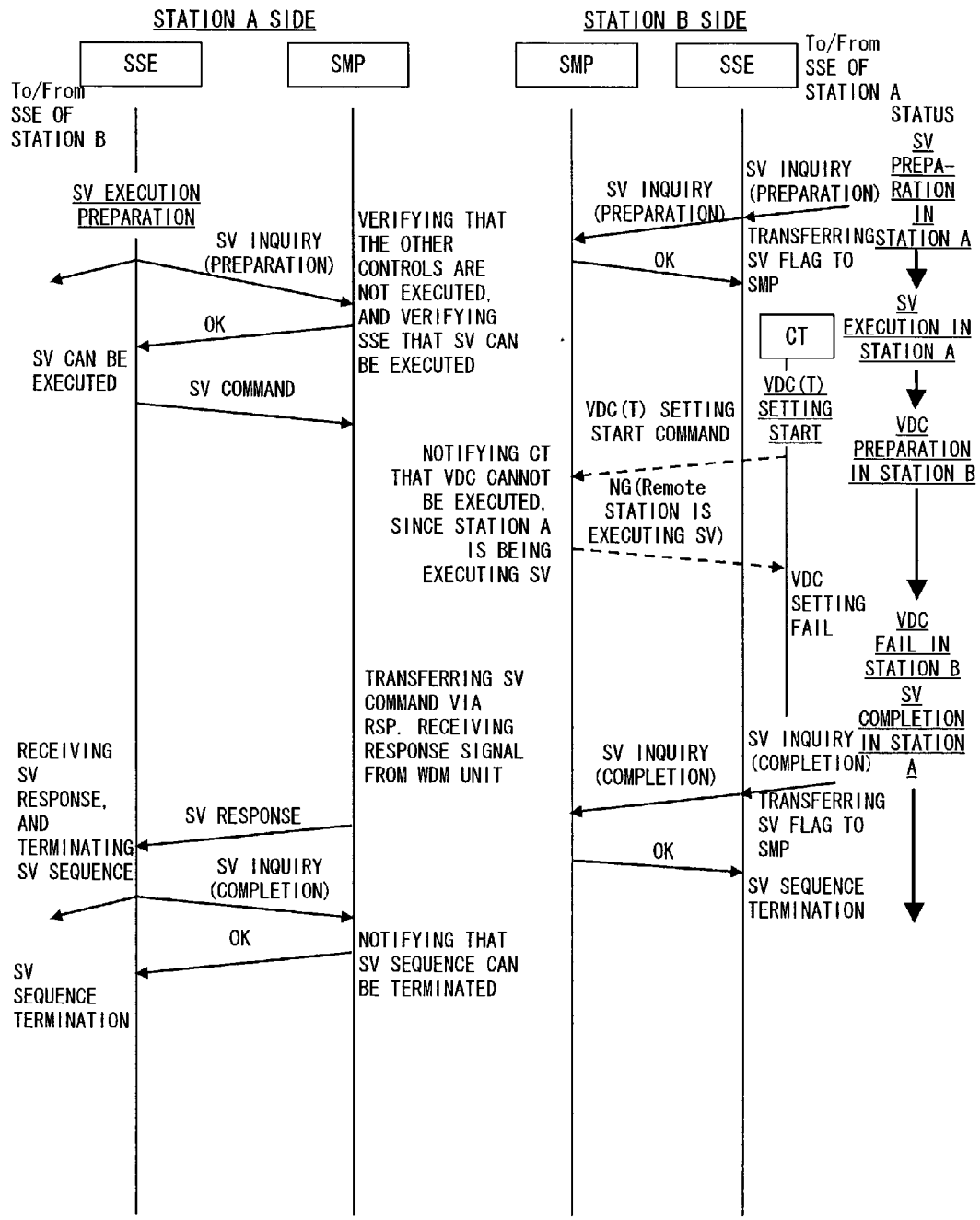
FIG. 22 exemplifies each operational sequence when an interrupt is made during the repeater supervisory control (No. 8)

FIG. 22 shows the case where a VDC(T) automatic setting command is issued from the CT of the station B to the SMP of the station B while an SV sequence originated from the SSE of the station A is being executed. Since the SV sequence is being executed also in this case, the SMP of the station B notifies the CT of the station B that the VDC(T) automatic setting command issued from the CT of the station B cannot be executed, and the SV sequence is continued.

Figure 23:
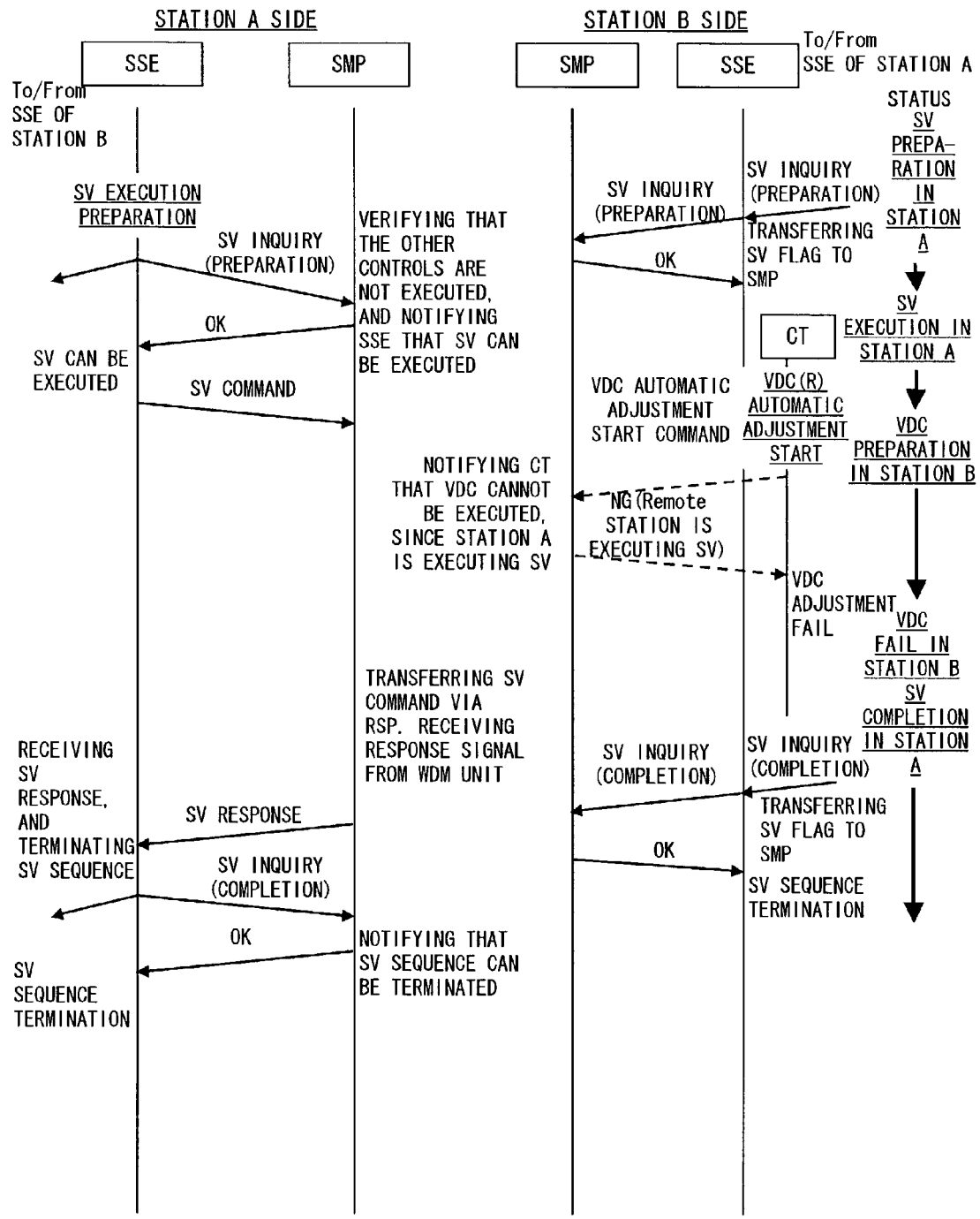
FIG. 23 exemplifies each operational sequence when an interrupt is made during the repeater supervisory control (No. 9)

FIG. 23 shows the case where a VDC(R) automatic adjustment start command is issued from the CT of the station B to the SMP of the station B while an SV sequence originated from the SSE of the station A is being executed. Because the SMP of the station B learns that the SV sequence is being executed also in this case, it notifies the CT of the station B that the VDC(R) automatic adjustment start command issued from the CT cannot be executed, and the SV sequence is continued.

FIGS. 24 to 28 exemplify each operational sequence when an interrupt is made during the pre-emphasis automatic adjustment.

Figure 24:
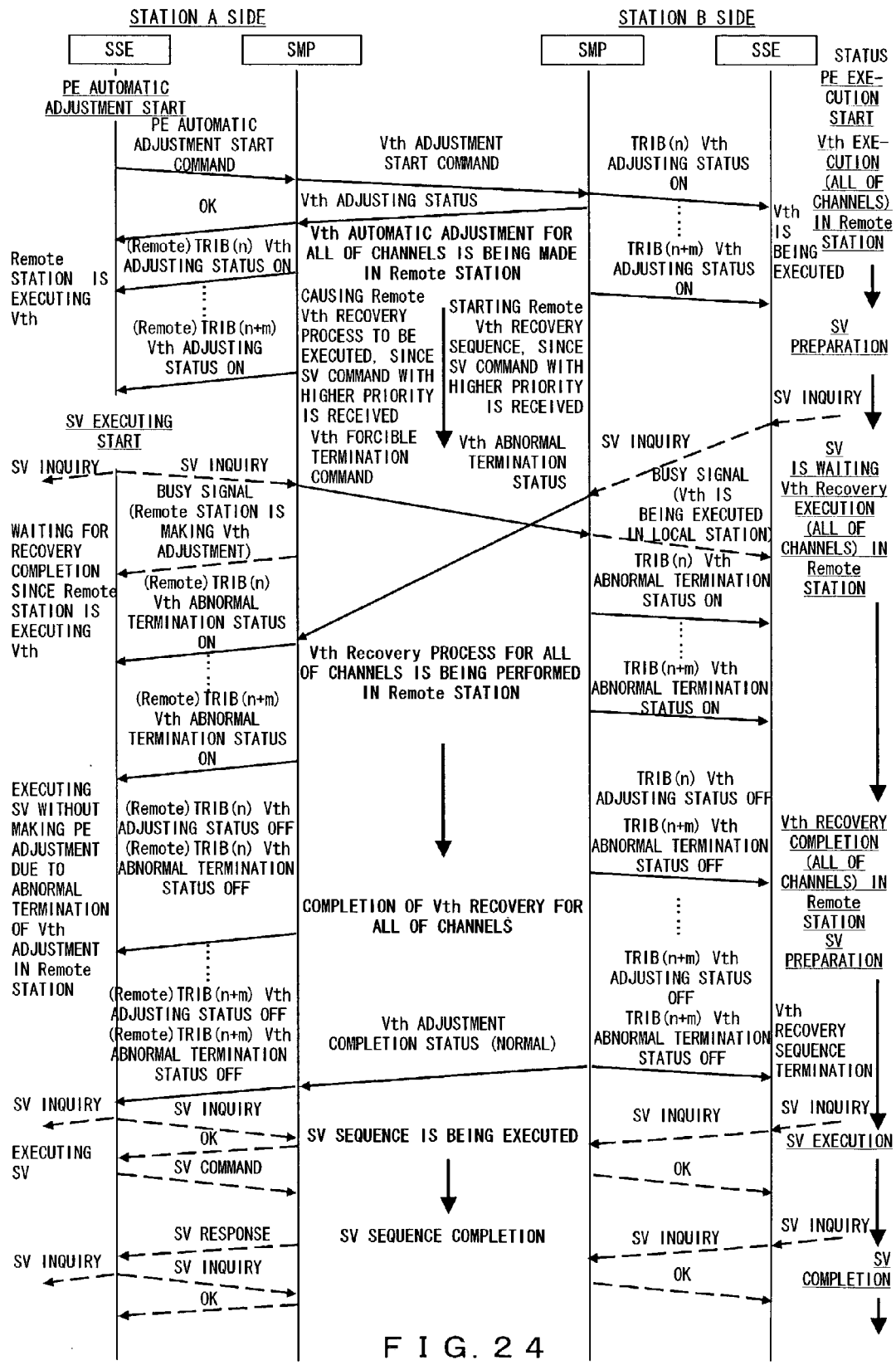
FIG. 24 exemplifies each operational sequence when an interrupt is made during a pre-emphasis automatic adjustment (No. 1)
Figure 26:
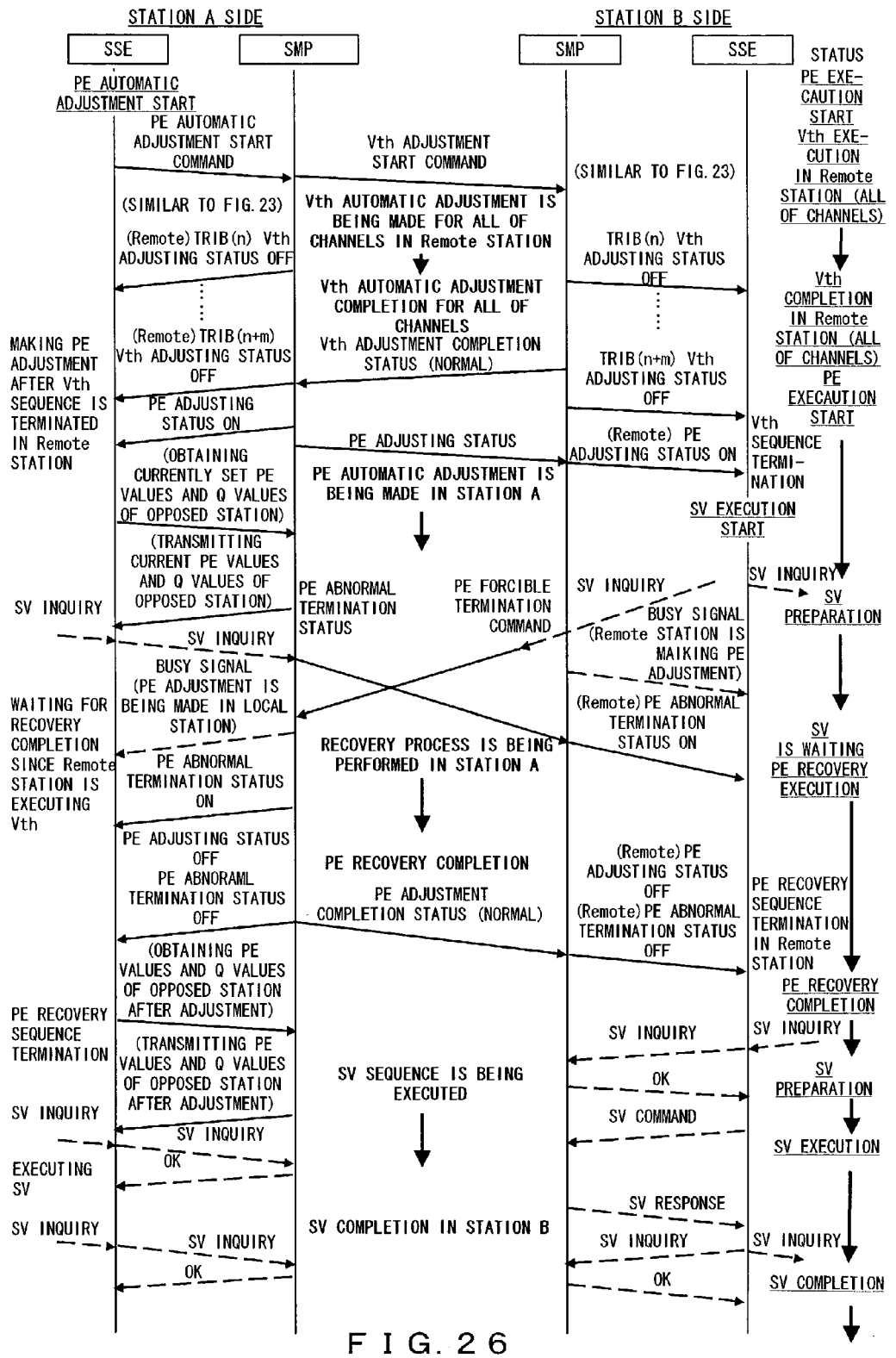
FIG. 26 exemplifies each operational sequence when an interrupt is made during the pre-emphasis automatic adjustment (No. 3)

By assigning priorities according to this preferred embodiment, the pre-emphasis is defined as the second priority item. Accordingly, if an interrupt is made by a repeater supervisory control command (SV inquiry request) during the automatic adjustment as shown in FIGS. 24 and 26, a busy signal is once returned to the SSE, the pre-emphasis automatic adjustment sequence is suspended during that time, and set values of the TPAs of all of TRIB units are recovered to values before being adjusted. If any of the other control (threshold value adjustment or dispersion value adjustment) commands is issued, it is rejected, and the pre-emphasis adjustment sequence is continued.

Note that, however, some of the controls can be simultaneously executed depending on the direction of a signal. Black circles shown in Table 2 represent the controls that can be simultaneously executed. Since the pre-emphasis is a control for varying a signal level on the transmitting side, there is no problem if a signal on the receiving side is controlled simultaneously. Accordingly, the receiver threshold value adjustment and the receiving side dispersion value adjustment of a local station, and the pre-emphasis adjustment and the transmitting side dispersion value setting of an opposed station can be executed simultaneously.

FIG. 24 shows the case where an SV execution start command is issued from the SSE of the station A while a PE automatic adjustment start command issued from the SSE of the station A to the SMP of the station A and the PE automatic adjustment sequence is being executed based on the sequence described above. The SMP of the station A, which receives an SV inquiry from the SSE of the station A, transmits a busy signal to the SSE of the station A. Since an SV inquiry from the SSE of the station A is transmitted also to the SMP of the station B, a busy signal is transmitted also to the SSE of the station B. In this case, the Vth adjustment sequence, which is the first half process of the PE automatic adjustment control, is being executed. Therefore, the SMPs of the stations A and B pass a Vth abnormal termination status to the SMPs of the stations A and B respectively, and terminates the Vth adjustment sequence. Furthermore, since the Vth adjustment sequence is abnormally terminated, a recovery process for recovering threshold values to values before the Vth adjustment sequence is started is performed so as not to set the threshold values of the RXF of the station A or B to halfway values. Upon termination of the recovery process, an SV inquiry, which is the start of the SV sequence, is made from the SSE of the station A, and the SV process is performed according to a sequence similar to the above described SV sequence.

Figure 25:
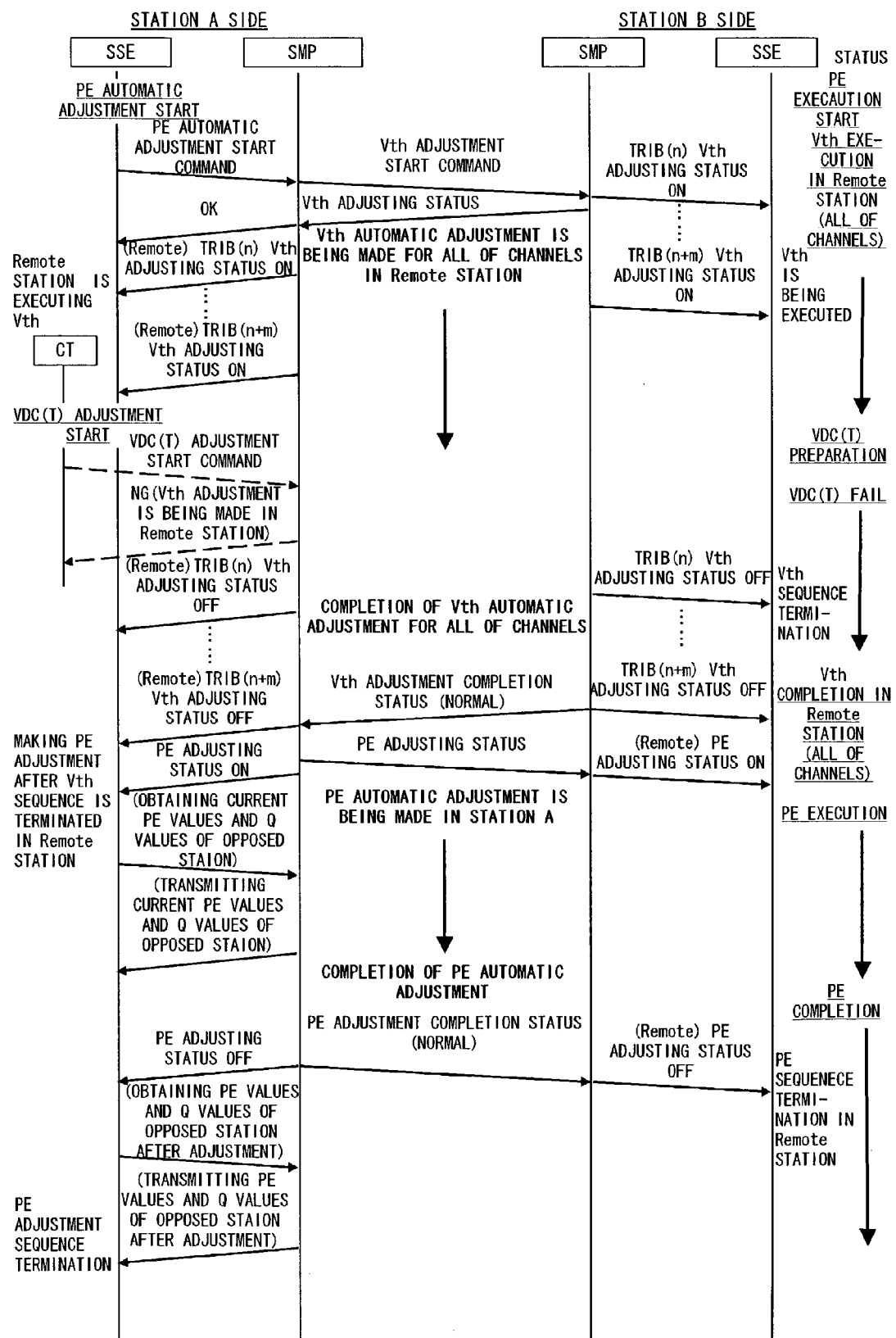
FIG. 25 exemplifies each operational sequence when an interrupt is made during the pre-emphasis automatic adjustment (No. 2)

FIG. 25 shows the case where a VDC(T) adjustment start command is issued from the CT of the station A to the SMP of the station A while the PE automatic adjustment sequence originated from the SSE of the station A is being executed. Since the priority of the PE automatic adjustment sequences is higher than that of the VDC(T) adjustment sequence in this case, the SMP of the station A notifies the CT of the station A that the VDC(T) adjustment sequence cannot be executed, and the PE automatic adjustment sequence is continued.

FIG. 26 shows the case where an SV sequence start command is issued from the SSE of the station B while the PE automatic adjustment sequence originated from the SSE of the station A is being executed. Because the priority of the SV sequence is higher than that of the PE automatic adjustment sequence in this case, the SMP returns a busy signal to the SSE when an SV inquiry is made from the SSE to the SMP. The PE automatic adjustment sequence originated from the SSE of the station A is stopped, and threshold values and pre-emphasis amounts are recovered to the statuses before the PE automatic adjustment sequence is started (recovery process). Upon termination of the recovery process, the SV sequence is started.

Figure 27:
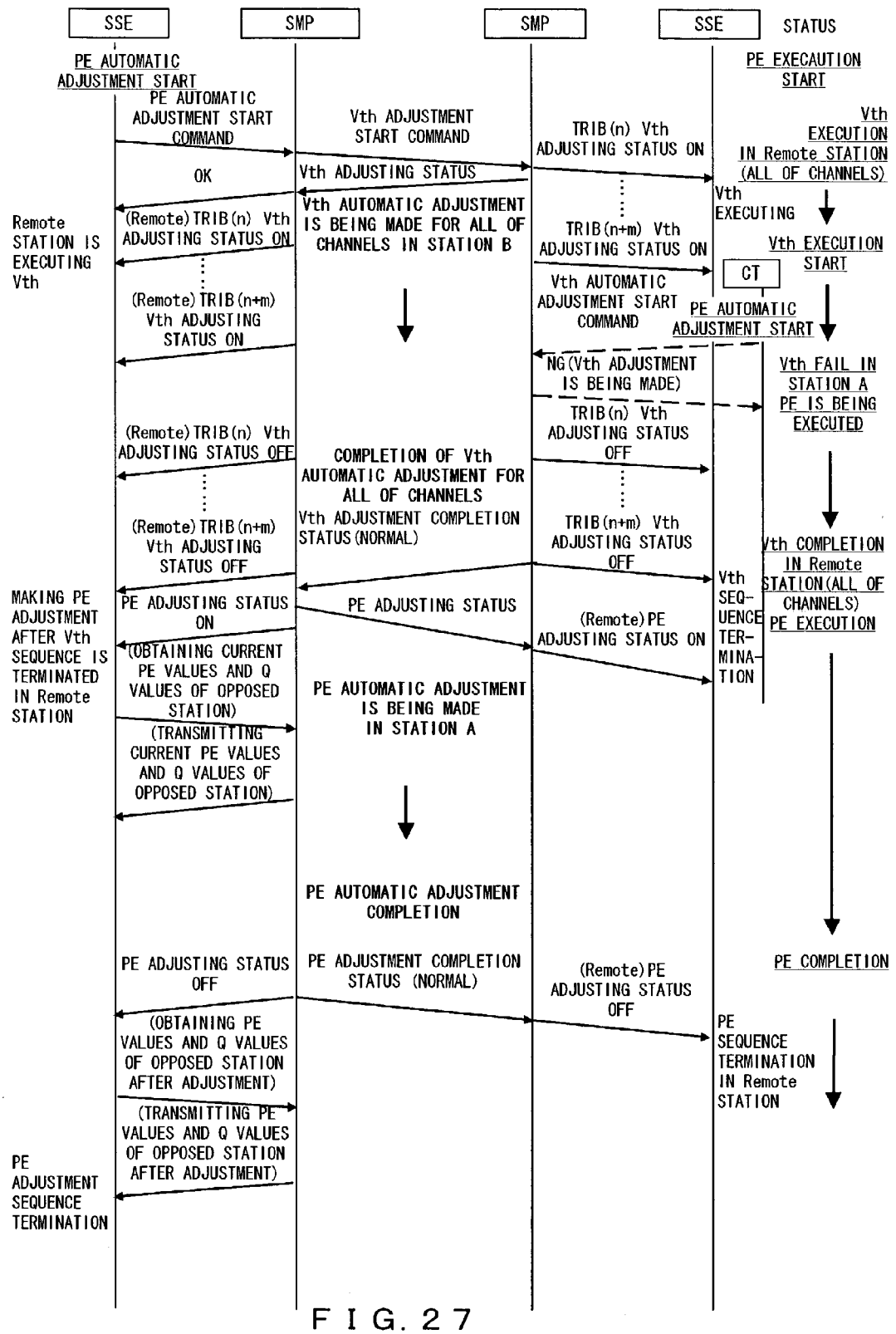
FIG. 27 exemplifies each operational sequence when an interrupt is made during the pre-emphasis automatic adjustment (No. 4)

FIG. 27 shows the case where a Vth automatic adjustment start command is issued from the CT of the station B while the PE automatic adjustment sequence originated from the SSE of the station A is being executed. Since the priority of the PE automatic adjustment sequence is higher than that of the Vth automatic adjustment sequence in this case, the Vth automatic adjustment start command issued from the CT of the station B is rejected by the SMP of the station B. The SMP of the station B notifies the CT of the station B that the Vth automatic adjustment sequence cannot be executed, and the PE automatic adjustment sequence is continued.

FIG. 28 shows the case where a VDC(R) adjustment start command is issued from the CT of the station B to the SMP of the station B while the PE automatic adjustment sequence originated from the SSE of the station A is being executed. Because the priority of the PE automatic adjustment sequence is higher than that of the VDC (R) adjustment sequence, the VDC(R) adjustment sequence start command issued from the CT of the station B is rejected, and the PE automatic adjustment sequence is continued.

FIGS. 29 to 33 exemplify each operational sequence when an interrupt is made during the receiver threshold value automatic adjustment.

Figure 29:
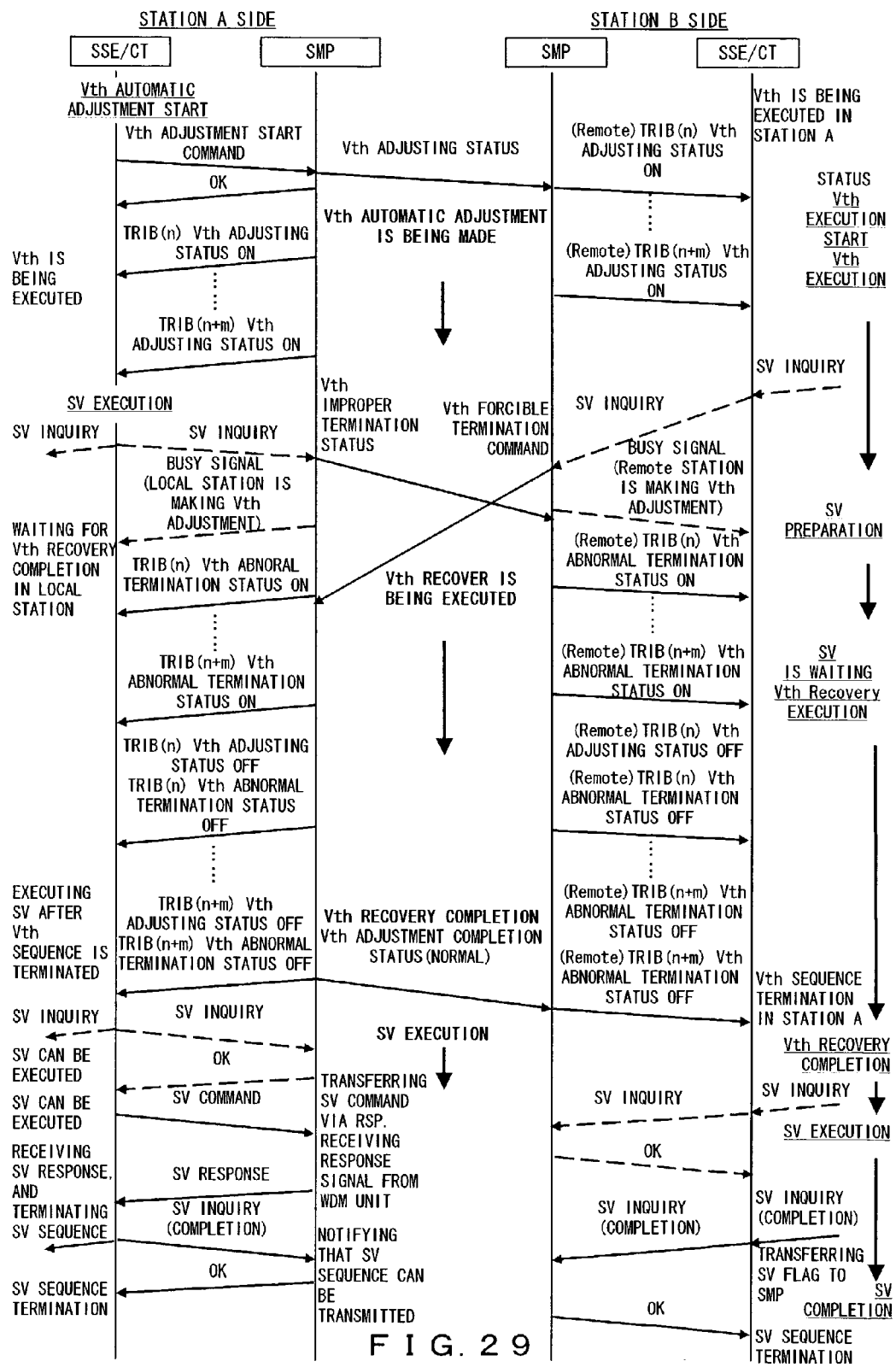
FIG. 29 exemplifies each operational sequence when an interrupt is made during a receiver threshold value automatic adjustment (No. 1)
Figure 31:
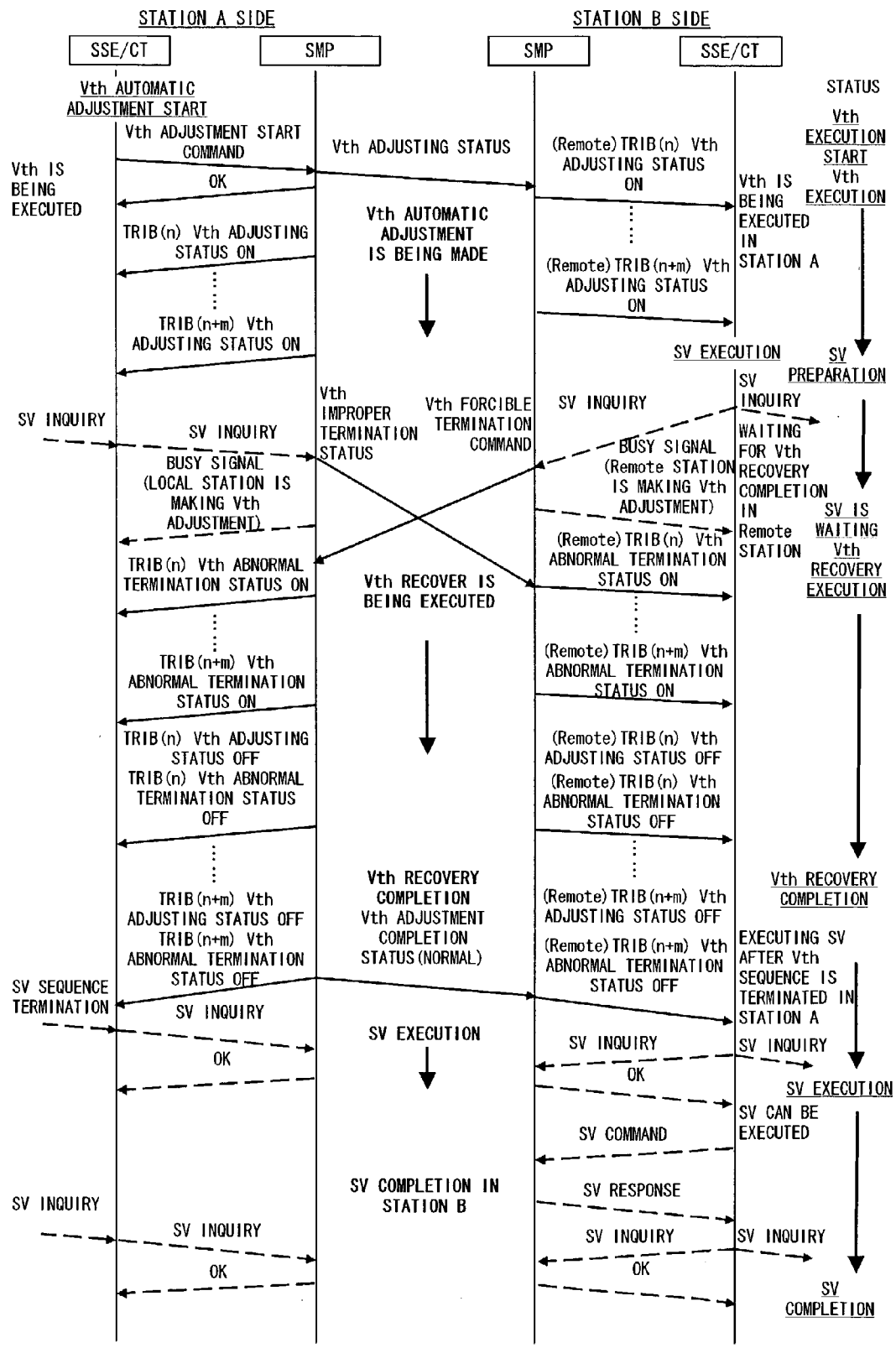
FIG. 31 exemplifies each operational sequence when an interrupt is made during the receiver threshold value automatic adjustment (No. 3)

By assigning priorities, the threshold value automatic adjustment is defined as the third priority item. Accordingly, an interrupt is made by the repeater supervisory control command (SV inquiry request) or the pre-emphasis control of an opposed station as shown in FIGS. 29, 31, and 32, a busy signal is once returned to the SSE, the threshold value automatic adjustment sequence is suspended during that time, and threshold values are recovered to the values before the adjustment starts, for the RXF of all of the TRIB units. Then, a control command is again issued from the SSE, so that the interrupting control sequence starts.

If any other control (receiving side dispersion value adjustment of the local station and the transmitting side dispersion value setting of the opposed station, which cannot be executed simultaneously) commands are issued, they are rejected, and the threshold value automatic adjustment sequence is continued.

FIG. 29 shows the case where an SV execution command is issued from the SSE or the CT of the station A while the Vth automatic adjustment sequence originated from the SSE or the CT of the station A is being executed. In this case, upon receipt of an SV inquiry request, the SMPs of the stations A and B respectively transmit a busy signal to the SSEs or the CTs of the local stations, suspend the Vth automatic adjustment sequence, and recover threshold values, etc. to values before the Vth automatic adjustment sequence starts. Upon completion of the recovery, the SV sequence is started.

Figure 30:
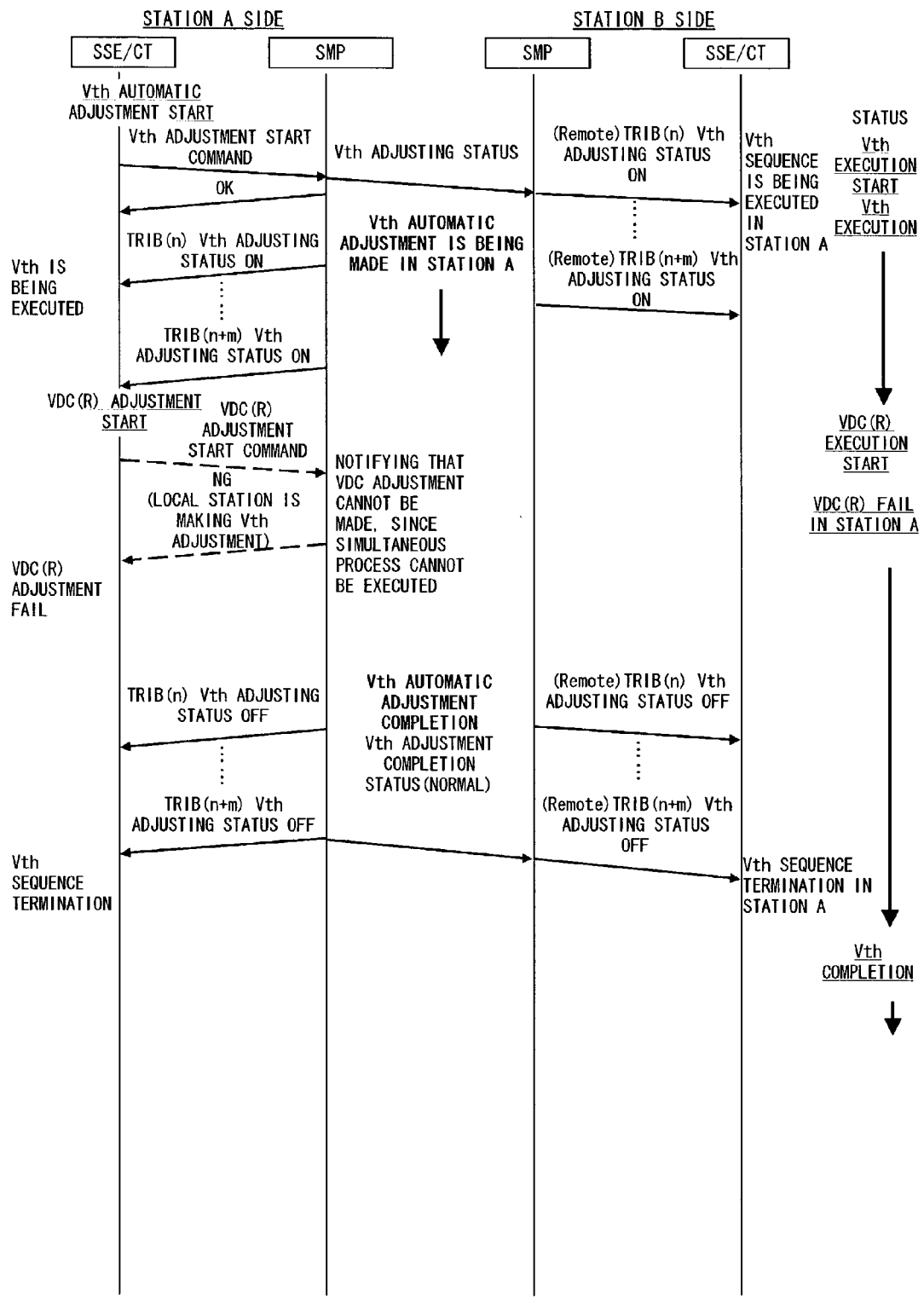
FIG. 30 exemplifies each operational sequence when an interrupt is made during the receiver threshold value automatic adjustment (No. 2)

FIG. 30 shows the case where a VDC(R) automatic adjustment start command is issued from the SSE or the CT of the station A while the Vth automatic adjustment sequence originated from the SSE or the CT of the station A is being executed. Because the priority of the Vth automatic adjustment sequence is higher than that of the VDC(R) automatic adjustment sequence in this case, the VDC(R) automatic adjustment start command issued from the SSE or the CT of the station A is rejected by recognizing that the command cannot be executed, and the Vth automatic adjustment sequence is continued.

FIG. 31 shows the case where an SV sequence start command is issued from the SSE or the CT of the station B while the Vth automatic adjustment sequence originated from the SSE or the CT of the station A is being executed. Since the priority of the SV sequence is higher in this case, the SMPs of both of the stations respectively transmit a busy signal to the SSE or the CT of the local stations. The Vth automatic adjustment sequence is stopped during that time, and a recovery process is performed. Upon termination of the recovery process, the SV sequence is started.

FIG. 32 shows the case where a PE automatic adjustment start command is issued from the SSE or the CT of the station B while the Vth automatic adjustment sequence originated from the SSE or the CT of the station A is being executed. Since the priority of the PE automatic adjustment sequence is higher than that of the Vth automatic adjustment sequence in this case, the SMP of the station B transmits a busy signal to the SSE or the CT of the station B. At the same time, the Vth automatic adjustment sequence is terminated, and a recovery process is performed to recover to the status before the Vth automatic adjustment sequence starts. Upon termination of the recovery process, the PE automatic adjustment sequence originated from the station B is started. FIG. 11 shows the PE automatic adjustment sequence originated from the station A. However, a sequence is fundamentally similar from whichever station the sequence is originated. Therefore, its explanation is omitted.

Figure 33:
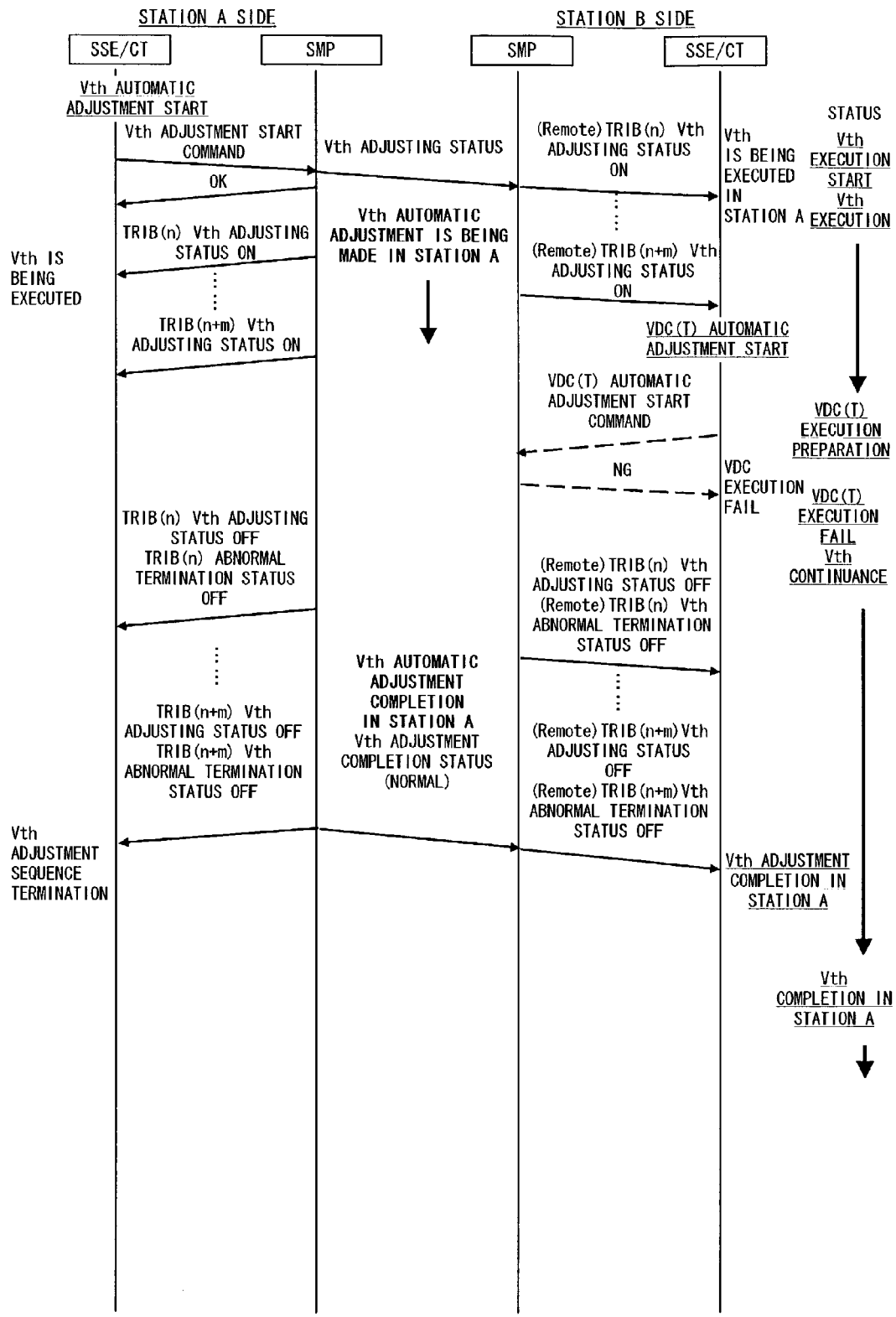
FIG. 33 exemplifies each operational sequence when an interrupt is made during the receiver threshold value automatic adjustment (No. 5)

FIG. 33 shows the case where a VDC(T) adjustment start command is issued from the SSE or the CT of the station B while the Vth automatic adjustment sequence originated from the SSE or the CT of the station A is being executed. Because the priority of the Vth automatic adjustment sequence is higher than that of the VDC(T) adjustment sequence in this case, the VDC(T) automatic adjustment start command is rejected by the SMP of the station B, and the Vth automatic adjustment sequence is continued in the system.

FIGS. 34 to 38 exemplify each operational sequence when an interrupt is made during the transmitting side dispersion value setting.

By assigning priorities, the local station dispersion value adjustment is defined as the fourth priority item. With this control, a dispersion value is set to an arbitrary value with a single command unlike the automatic adjustment. Therefore, the adjustment is completed in a short time (approximately two seconds). Accordingly, performing the recovery process does not always bring an advantage, even if an interrupt is made during the control. Therefore, the recovery process is not performed, and a control command with high priority, which makes the interrupt, is accepted at that time in the operations of this preferred embodiment (FIGS. 34 to 37). However, only the receiving side dispersion value control with low priority is rejected if it makes an interrupt.

Figure 34:
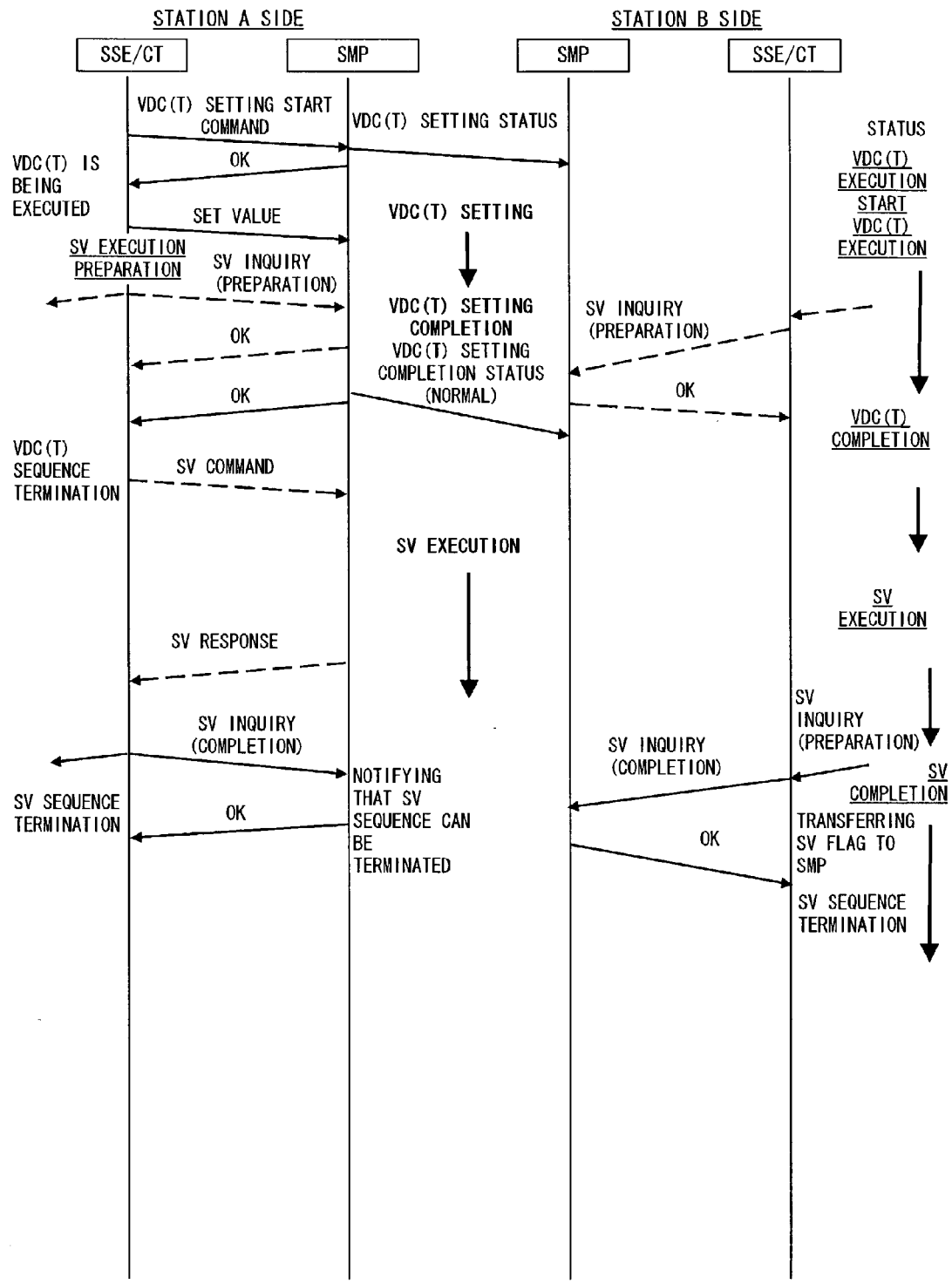
FIG. 34 exemplifies each operational sequence when an interrupt is made during a transmitting side dispersion value setting (No. 1)

FIG. 34 shows the case where an SV sequence start command is issued from the SSE or the CT of the station A while the VDC(T) automatic adjustment sequence originated from the SSE or the CT of the station A is being executed. In this case, the VDC(T) automatic adjustment sequence is executed until its completion, and the SV sequence is executed thereafter.

Figure 35:
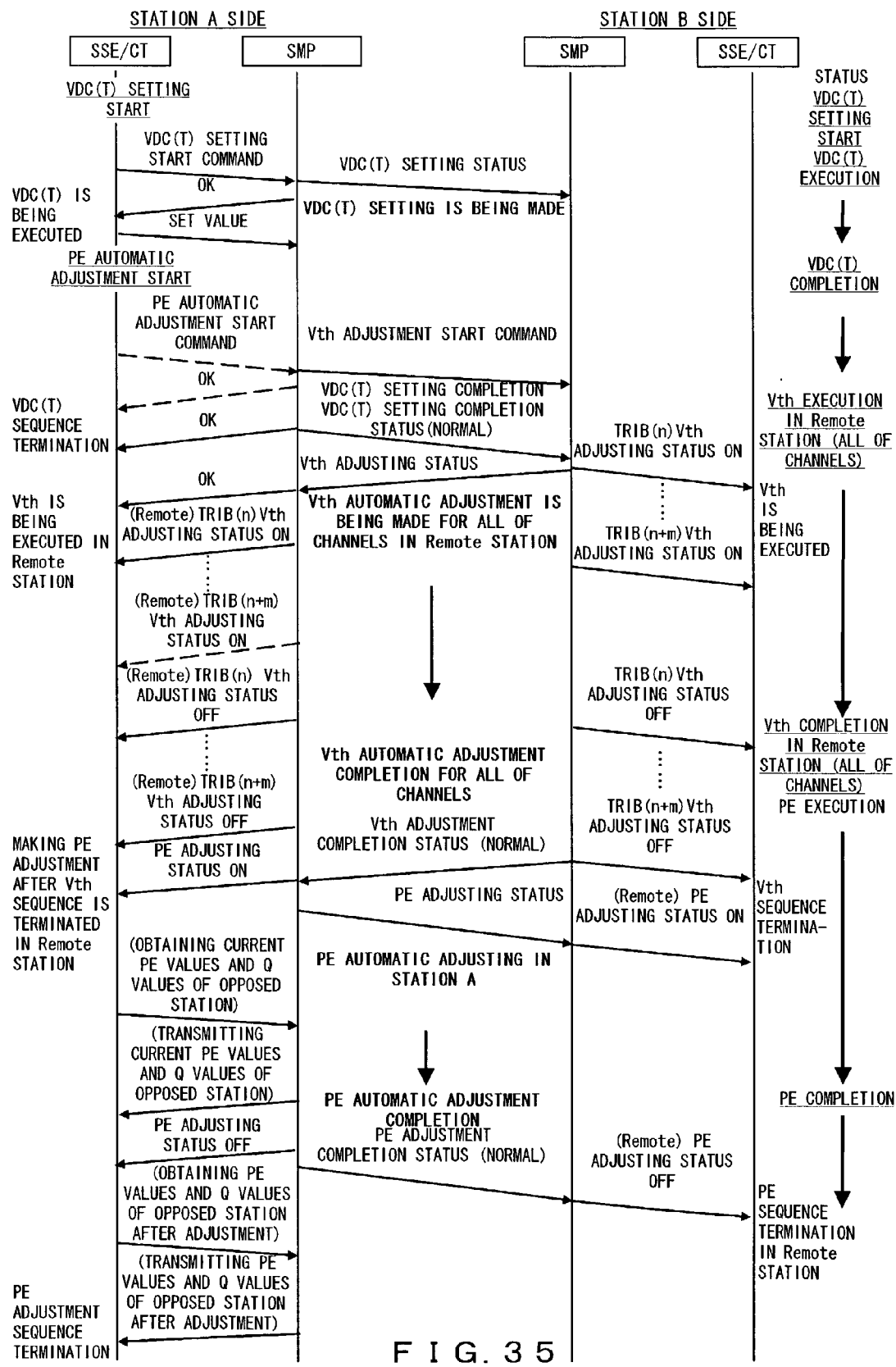
FIG. 35 exemplifies each operational sequence when an interrupt is made during the transmitting side dispersion value setting (No. 2)

FIG. 35 shows the case where a PE automatic adjustment start command is issued from the SSE or the CT of the station A while the VDC(T) automatic adjustment sequence originated from the SSE or the CT of the station A is being executed. Also in this case, the PE automatic adjustment start command is accepted at that time. On one hand, the VDC(T) automatic adjustment is made to the end. Because a subsequent sequence is the same as the above described PE automatic adjustment sequence, its explanation is omitted.

Figure 36:
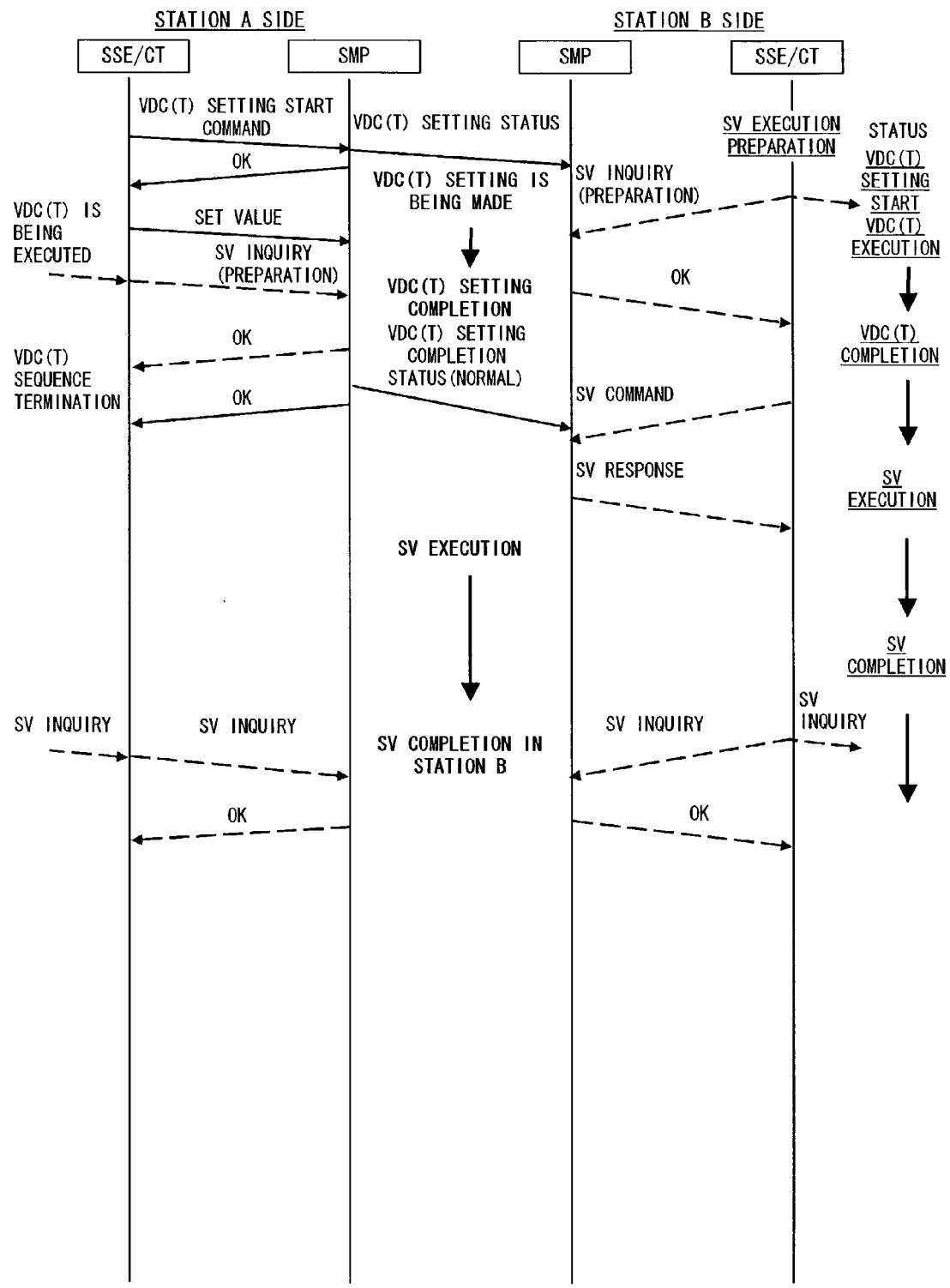
FIG. 36 exemplifies each operational sequence when an interrupt is made during the transmitting side dispersion value setting (No. 3)

FIG. 36 shows the case where an SV sequence is started with an interrupt from the SSE or the CT of the station B while the VDC(T) automatic setting sequence originated from the SSE or the CT of the station A is being executed. Also in this case, the SV start command is accepted at that time, and at the same time, the VDC(T) automatic setting sequence is executed. Upon termination of the VDC(T) automatic setting sequence, the SV sequence is started.

Figure 37:
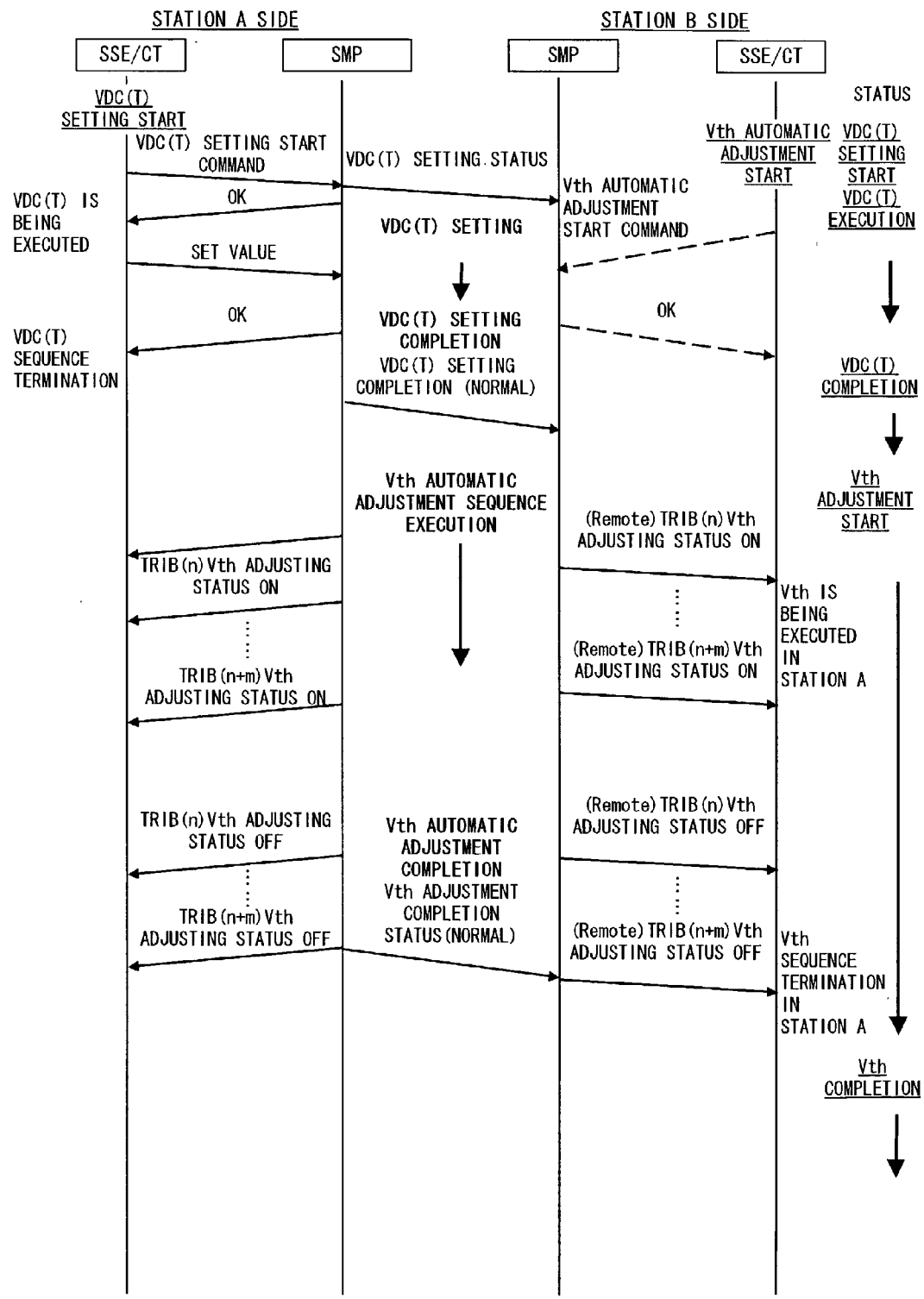
FIG. 37 exemplifies each operational sequence when an interrupt is made during the transmitting side dispersion value setting (No. 4)

FIG. 37 shows the case where a Vth automatic adjustment start command is issued from the SSE or the CT of the station B while the VDC(T) automatic setting sequence originated from the SSE or the CT of the station A is being executed. Also in this case, the Vth automatic adjustment start command is accepted at that time. On one hand, the VDC(T) automatic setting sequence is continued. Upon termination of the VDC(T) automatic setting, the Vth automatic adjustment sequence starts to be executed.

Figure 38:
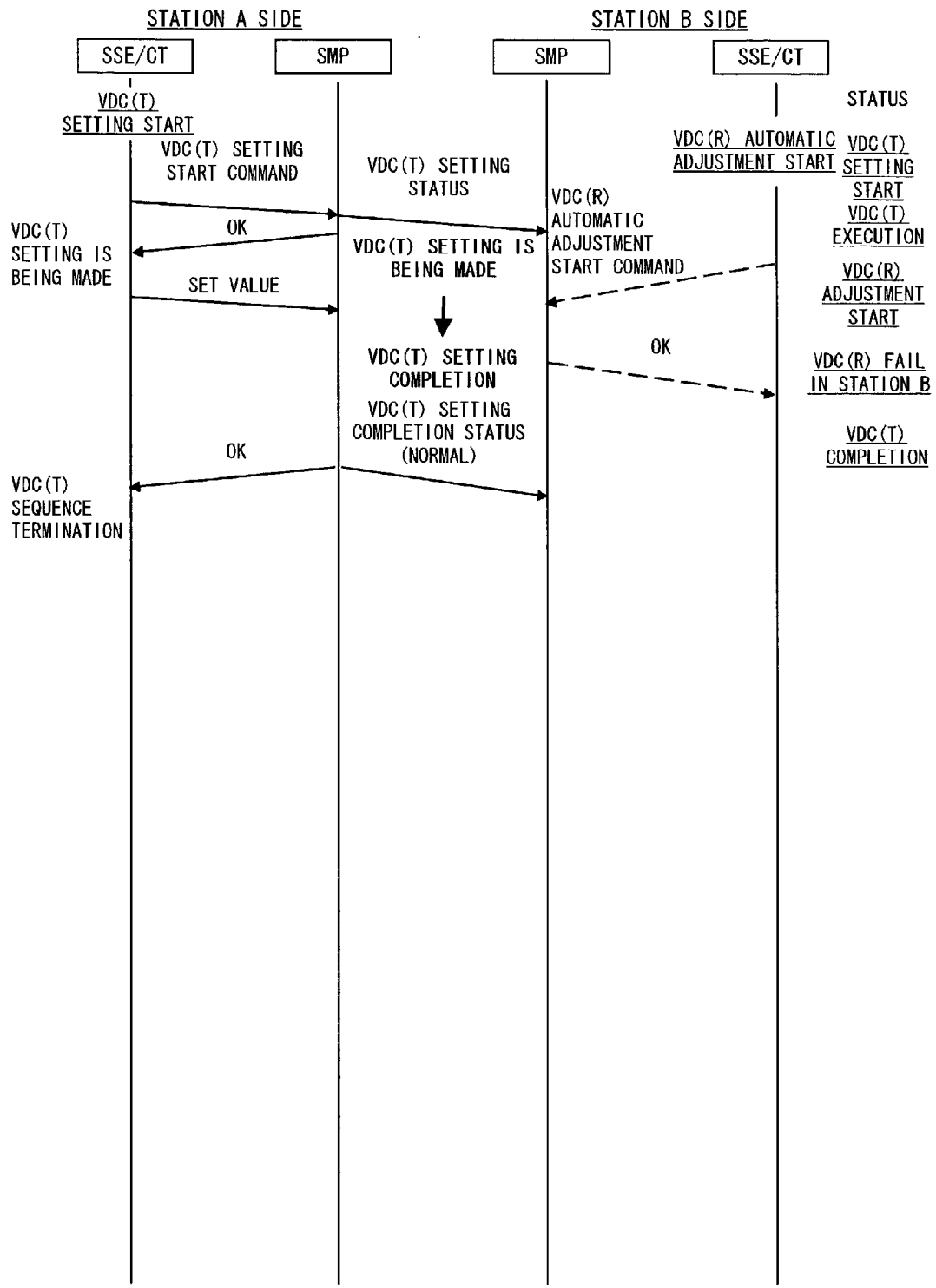
FIG. 38 exemplifies each operational sequence when an interrupt is made during the transmitting side dispersion value setting (No. 5)

FIG. 38 shows the case where a VDC(R) automatic setting start command is issued from the SSE or the CT of the station B while the VDC(T) automatic setting sequence originated from the SSE or the CT of the station A is being executed. Since the priority of the VDC(T) automatic setting sequence is higher than that of the VDC(R) automatic setting sequence in this case, the VDC(R) automatic setting start command is rejected. That is, only the VDC(T) automatic setting sequence is executed and terminated.

FIGS. 39 to 43 exemplify each operational sequence when an interrupt is made during the receiving side dispersion value automatic adjustment.

By assigning priorities, the receiving side dispersion value adjustment is defined as the fifth priority item. Accordingly, as shown in Table 2 of FIG. 9, all of the control commands other than 4 controls such as the local station pre-emphasis, the local station transmitting side dispersion value setting, the opposed station threshold value adjustment, and the opposed station receiving side dispersion value adjustment, which can be simultaneously executed, are accepted. The receiving side dispersion value adjustment sequence being executed is stopped, and the recovery process for recovering to values before the adjustment is made is performed. Thereafter, an interrupting control is executed.

Figure 39:
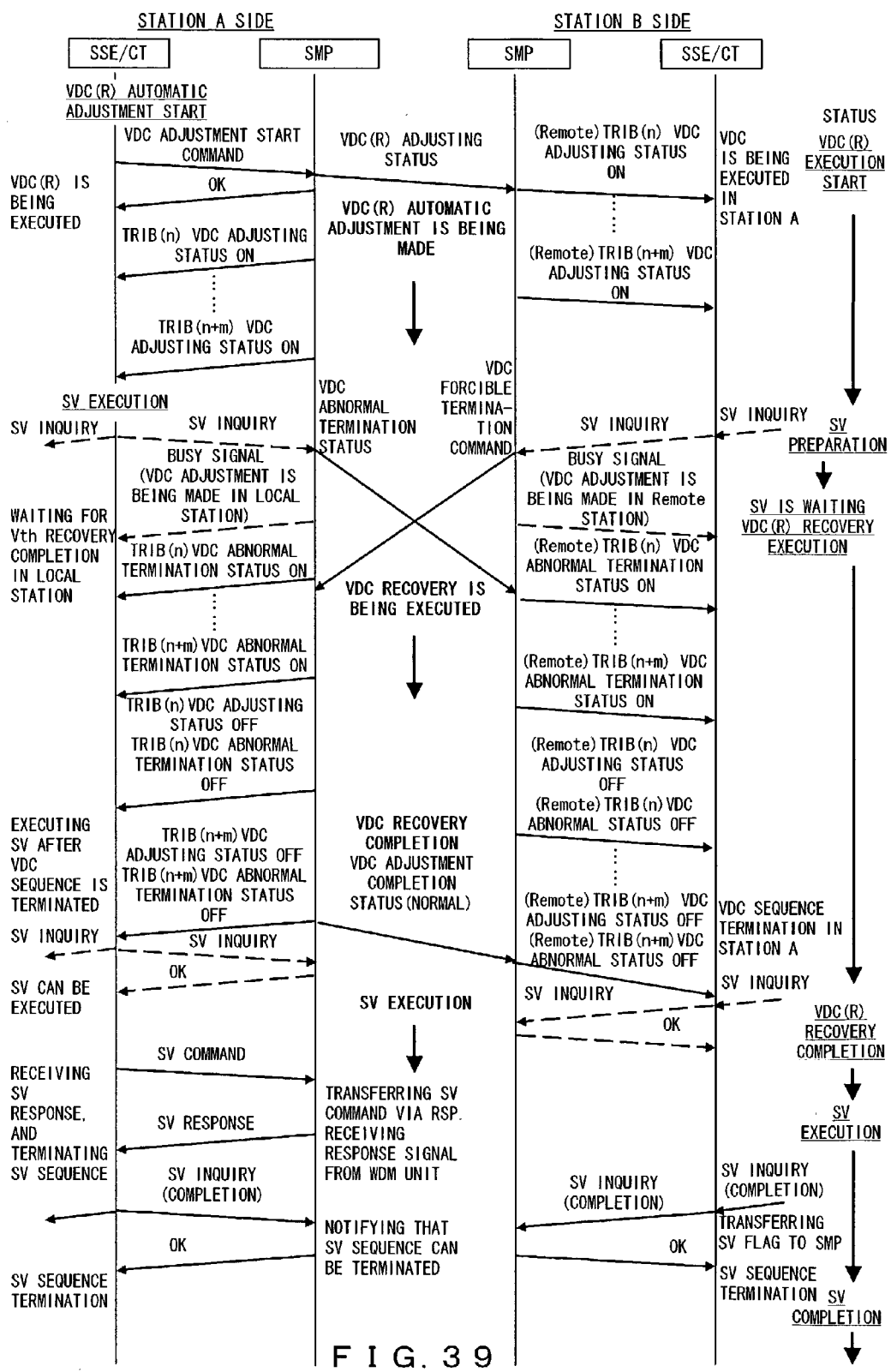
FIG. 39 exemplifies each operational sequence when an interrupt is made during a receiving side dispersion value automatic adjustment (No. 1)

FIG. 39 shows the case where an SV start command is issued from the SSE or the CT of the station A while the VDC(R) setting sequence is being executed based on a VDC(R) setting start command issued from the SSE or the CT of the station A. In this case, the SMPs of both of the stations respectively transmit a busy signal to the SSE or the CT of the local stations, and perform a recover process for the VDC(R) setting process. Upon termination of the recovery process, the SV sequence is started.

FIG. 40 shows the case where a Vth automatic adjustment start command is issued from the SSE or the CT of the station A while the VDC(R) setting sequence originated from the SSE or the CT of the station A is being executed. The SMP of the station A transmits a busy signal to the SSE or the CT of the station A in response to the Vth automatic adjustment start command, stops the VDC(R) setting sequence, and performs the recovery process. Upon termination of the recovery process, the Vth automatic adjustment sequence is started.

FIG. 41 shows the case where an SV start command is issued from the SSE or the CT of the station B while the VDC(R) setting sequence originated from the SSE or the CT of the station A is being executed. The SMPs of both of the stations respectively transmit a busy signal to the SSE or the CT of the local stations, and perform a recovery process for the VDC(R) setting process. Upon termination of the recovery process, the SV sequence starts to be executed.

Figure 42:
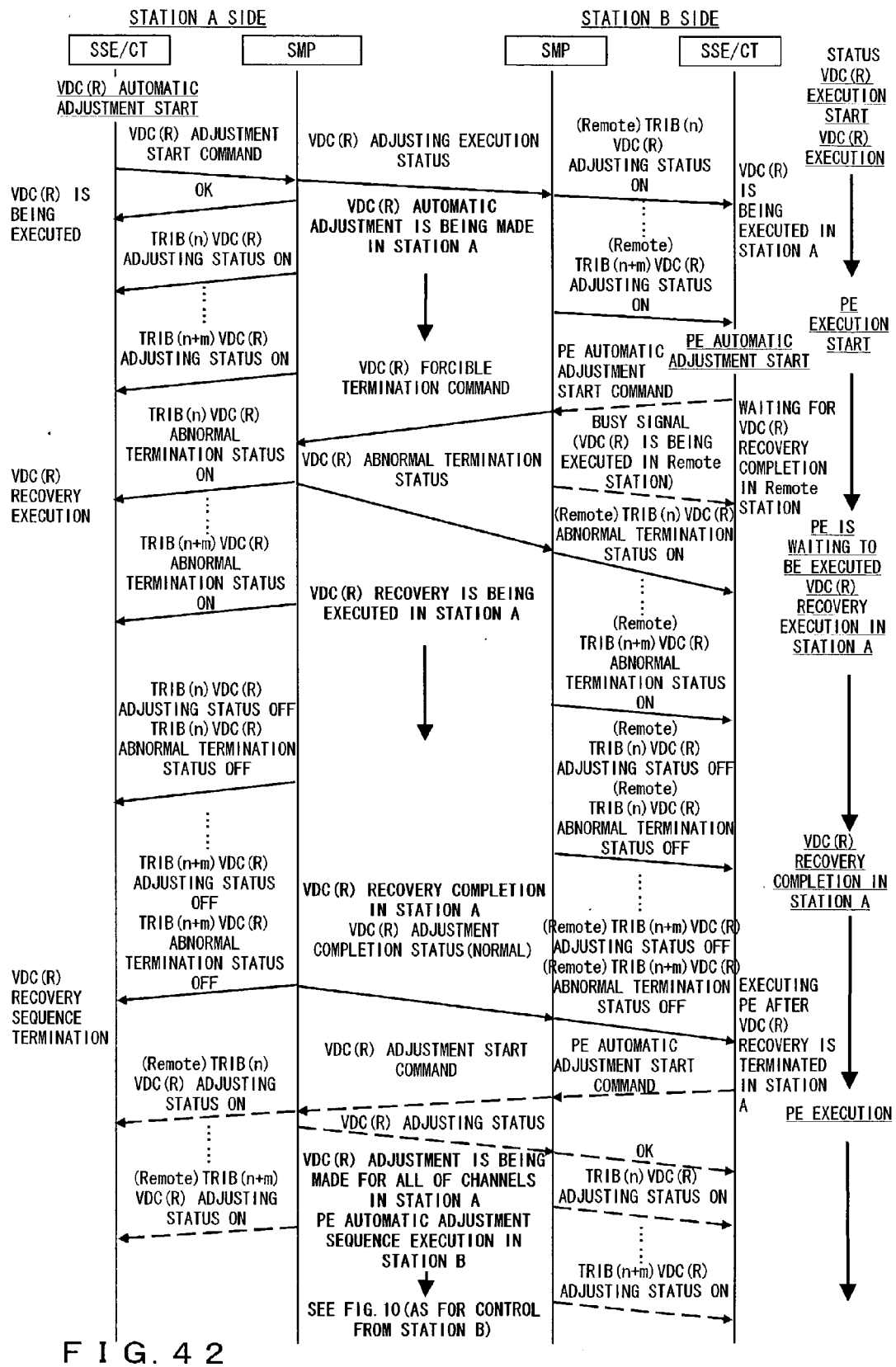
FIG. 42 exemplifies each operational sequence when an interrupt is made during the receiving side dispersion value automatic adjustment (No. 4)

FIG. 42 shows the case where a PE automatic adjustment start command is issued from the SSE or the CT of the station B while the VDC(R) setting sequence originated from the SSE or the CT of the station A is being executed. In this case, the SMP of the station B, which receives the PE automatic adjustment start command, returns a busy signal to the SSE or the CT of the station B, stops the VDC(R) setting sequence originated from the station A, and performs a recovery process. Upon termination of the recovery process, the PE automatic adjustment sequence is started.

Figure 43:
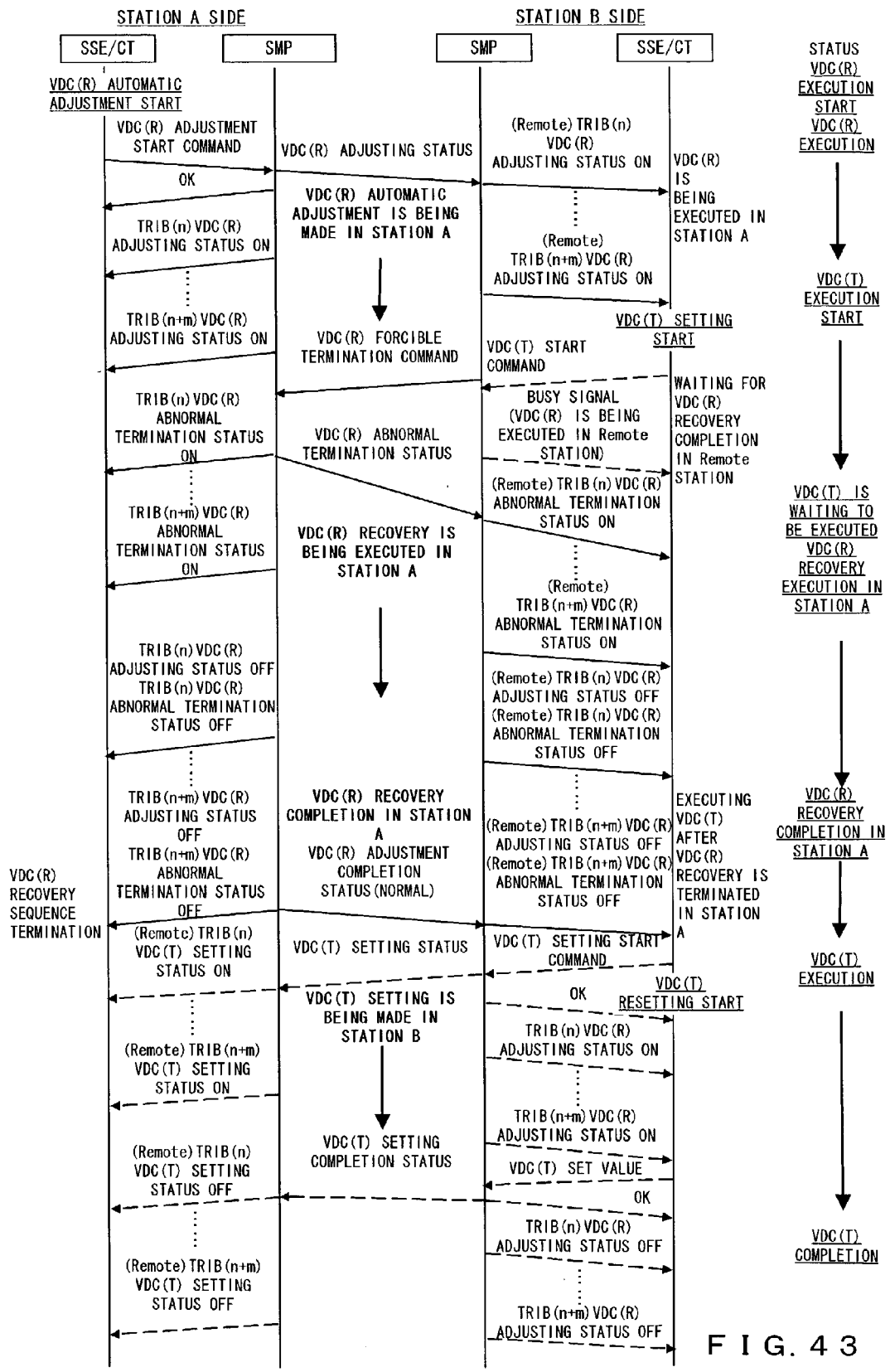
FIG. 43 exemplifies each operational sequence when an interrupt is made during the receiving side dispersion value automatic adjustment (No. 5)

FIG. 43 shows the case where a VDC(T) setting start command is issued from the SSE or the CT of the station B while the VDC(R) automatic setting sequence originated from the SSE or the CT of the station A is being executed. In this case, the SMP of the station B transmits a busy signal to the SSE or the CT of the station B, terminates the VDC(R) automatic setting sequence originated from the station A, and performs a recovery process. Upon termination of the recovery process, the VDC(T) setting sequence is started.

FIGS. 44 to 49 exemplify each operational sequence when a fault occurs during each control execution.

There are many fault occurrence patterns. This preferred embodiment refers to 6 patterns considered to be typical.

FIG. 44 shows the case where a fault occurs on a transmission line of a transmitting side during the pre-emphasis adjustment. In this case, a communication with the opposed station is partly disabled, and the number of error corrections of the opposed station cannot be received. Therefore, the pre-emphasis adjustment sequence cannot be executed any further. Accordingly, the process is stopped, and a recovery process is performed. In this case, a warning occurs on the receiving side of the opposed station (station B), and the SMP of the station B that detects the warning transmits a pre-emphasis forcible termination command to the station A. The SMP of the station A stops the pre-emphasis adjustment by receiving this command, and performs a recovery process.

Figure 45:
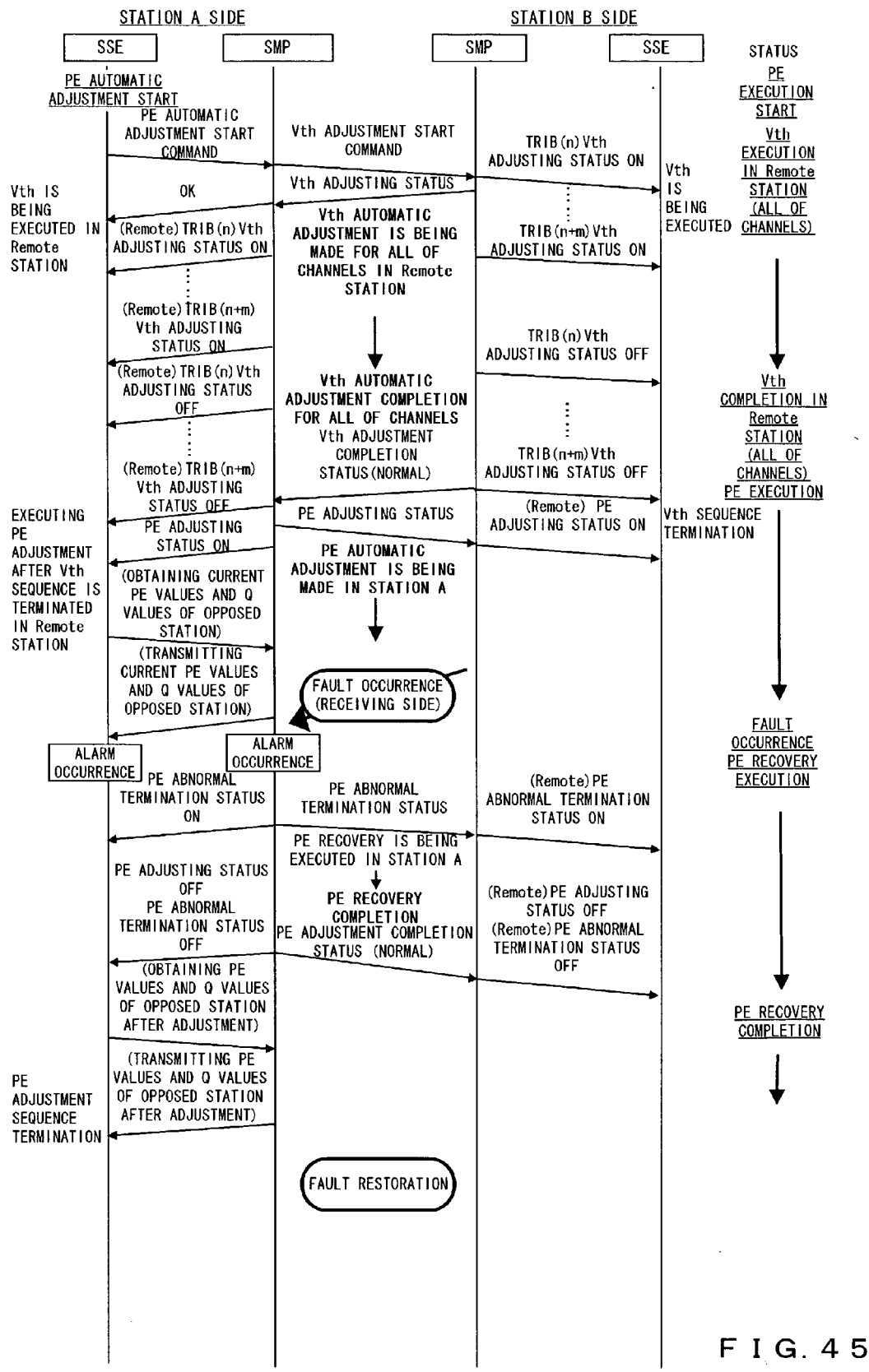
FIG. 45 exemplifies each operational sequence when a fault occurs during each control execution (No. 2)

FIG. 45 shows the case where a fault occurs on a transmission line on the receiving side during the pre-emphasis adjustment. Since a warning occurs in the local station in this case, the SMP of the local station can detect the warning. Therefore, the SMP immediately stops the pre-emphasis adjustment, and starts a recovery process. Then, the SMP transmits a PE abnormal termination status to the opposed station, and notifies that the recovery process is being performed.

FIG. 46 shows the case where a receiving side unit is unplugged during the pre-emphasis adjustment. Also in this case, operations are fundamentally similar to those shown in FIG. 45. Namely, the automatic adjustment sequence is stopped, and a recovery process is performed according to a judgment made by the SMP of the local station.

Figure 47:
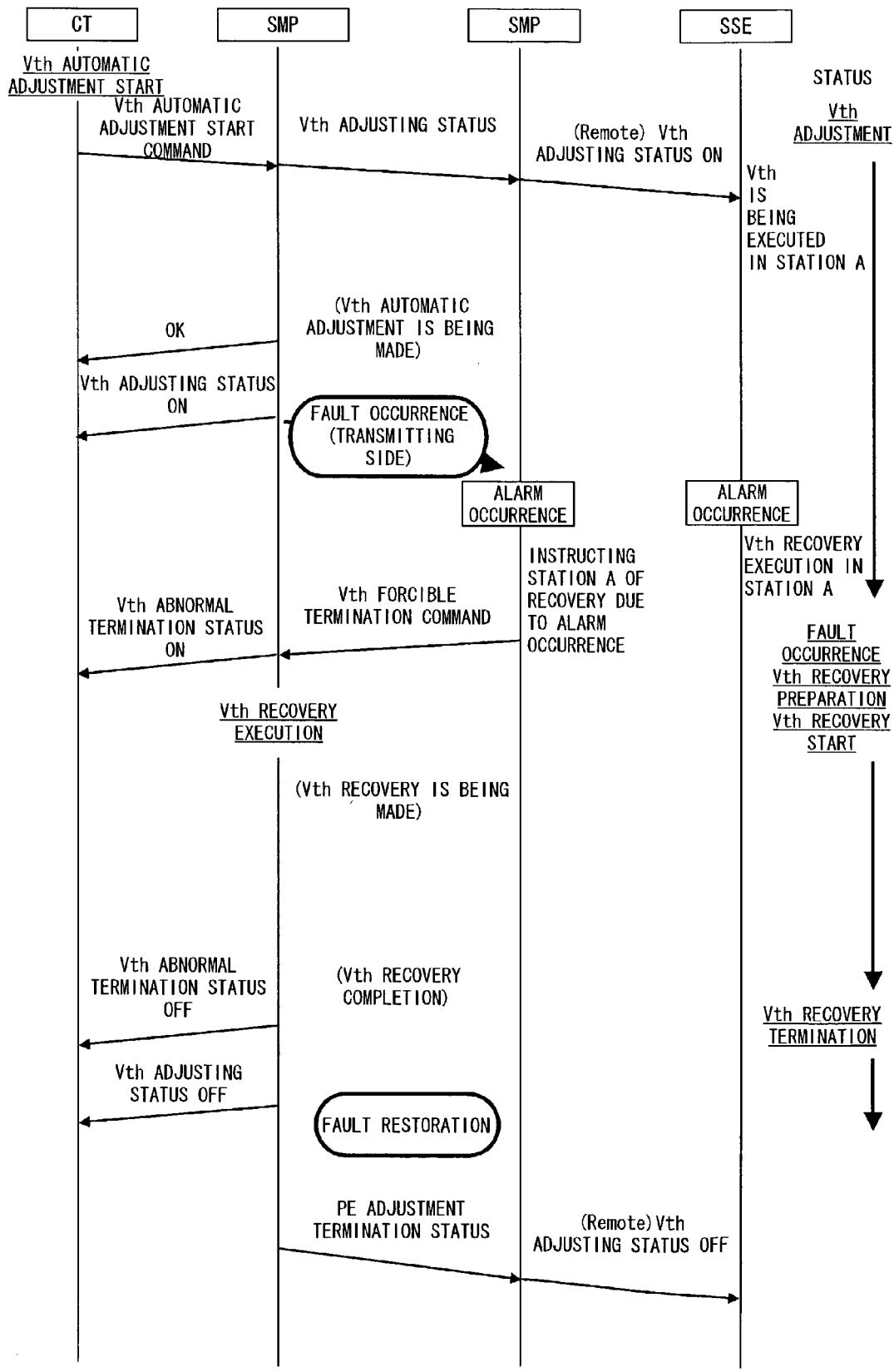
FIG. 47 exemplifies each operational sequence when a fault occurs during each control execution (No. 4)
Figure 48:
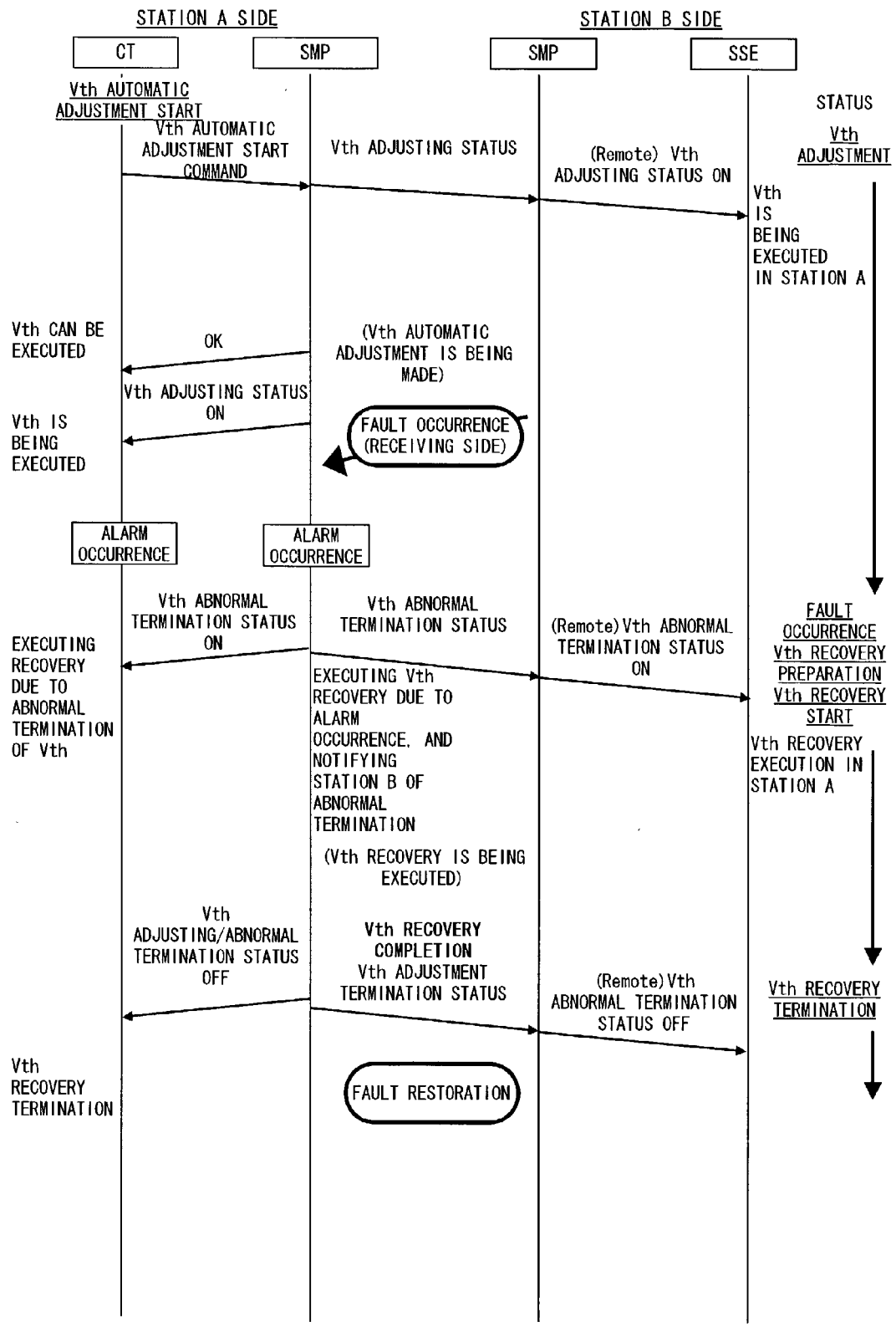
FIG. 48 exemplifies each operational sequence when a fault occurs during each control execution (No. 5)
Figure 49:
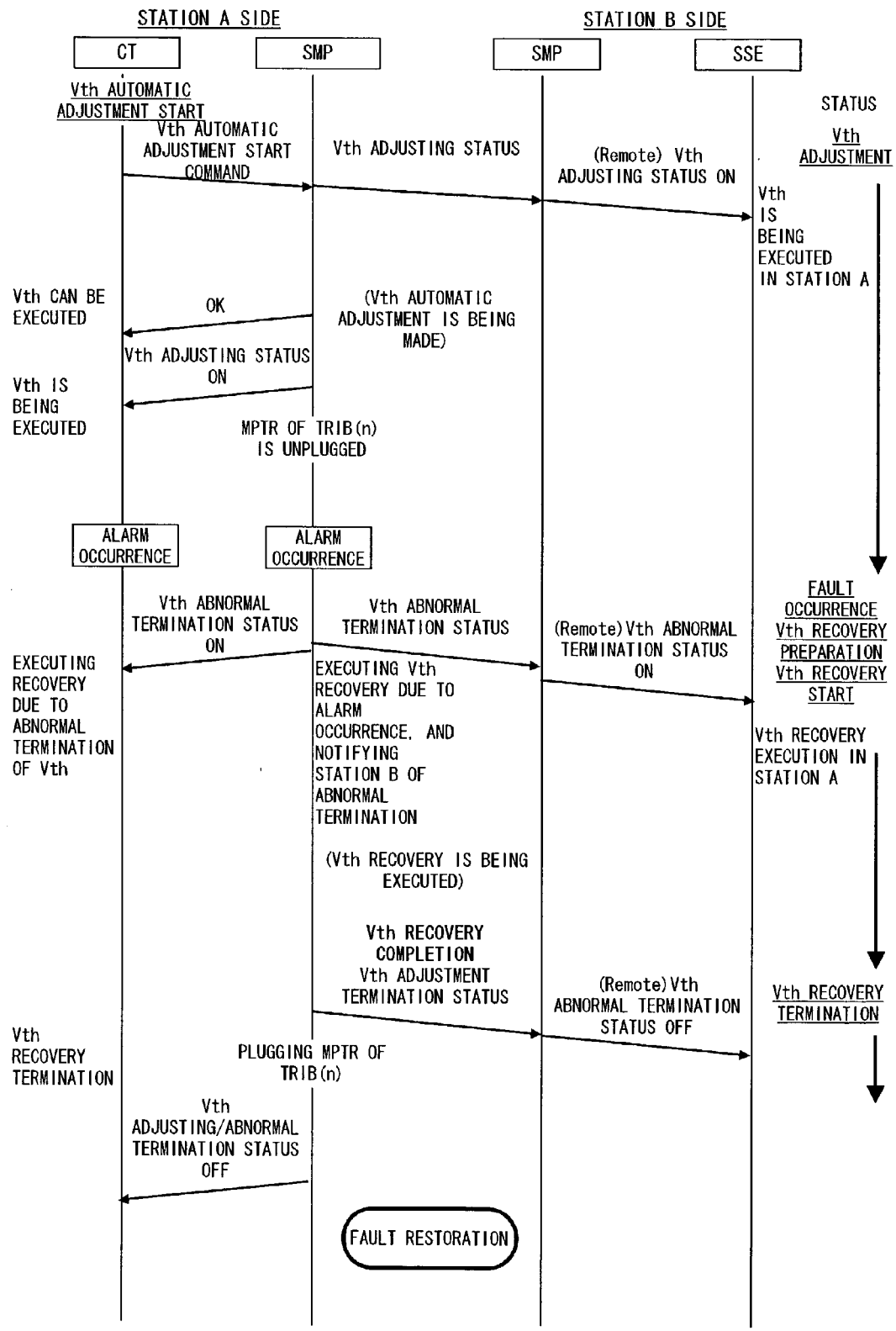
FIG. 49 exemplifies each operational sequence when a fault occurs during each control execution (No. 6).

FIGS. 47 to 49 show the operations performed when a fault occurs during the receiver threshold value adjustment. Also these operations are fundamentally similar to those of the pre-emphasis adjustment. If a fault occurs on the transmitting side, the adjustment sequence is stopped with a forcible termination command from the opposed station. Or, if a fault occurs on the receiving side, the adjustment sequence is stopped and a recovery process is performed according to a judgment made by the SMP of the local station.

FIG. 47 shows the case where a fault is detected by the SMP of the station B during the Vth automatic adjustment sequence originated from the CT of the station A. The SMP of the station B transmits a forcible termination command for the Vth automatic adjustment sequence to the SMP of the station A. The SMP of the station A passes a Vth abnormal termination status ON signal to the CT of the station A, stops the Vth automatic adjustment sequence, and starts a recovery process. Upon termination of the recovery process, the SMP of the station A transmits a Vth abnormal termination status OFF and a Vth adjusting status OFF to the CT of the station A. When the fault is restored, a Vth adjustment termination status is passed from the SMP of the station A to the SMP of the station B. The SMP of the station B transmits a remote Vth adjusting status OFF to the SSE of the station B.

FIG. 48 shows the case where the SMP of the station A detects a fault during the Vth automatic adjustment sequence originated from the CT of the station A. In this case, the SMP of the station A transmits a Vth abnormal termination status ON to the CT of the station A, and transmits a Vth abnormal termination status to the SMP of the station B. The SMP of the station B transmits a remote Vth abnormal termination status ON to the SSE of the station B. Then, a recovery process is performed. Upon termination of the recovery process, the SMP of the station A transmits a Vth adjusting/abnormal termination status OFF to the CT of the station A, and transmits a Vth adjustment termination status to the SMP of the station B. Furthermore, the SMP of the station B transmits a remote Vth abnormal termination status OFF to the SSE of the station B.

FIG. 49 shows the case where a fault such as unplugging of the MPTR of the station A, or the like occurs during the Vth automatic adjustment sequence originated from the CT of the station A. In this case, a Vth abnormal termination status ON is transmitted to the CT of the station A the moment when a warning occurs. Additionally, a Vth abnormal termination status is transmitted to the SMP of the station B. The SMP of the station B transmits a remote Vth abnormal termination status ON to the SSE of the station B. Then, a recovery process is performed in the station A. Upon termination of the recovery process, the SMP of the station A transmits a Vth adjustment termination status to the SMP of the station B, which then transmits a remote Vth abnormal termination status OFF to the SSE of the station B. When the fault is restored, the SMP of the station A transmits a Vth adjusting/abnormal termination status OFF to the CT of the station A.

Since the concept of the receiving side dispersion value adjustment is similar to that of the threshold value adjustment (Vth adjustment), this is not shown in a drawing. That is, the adjustment sequence is immediately stopped when a fault occurs, and a recovery process is performed.

It should be noted that, however, the repeater supervisory control is exceptional. This control must be executed with the highest priority regardless of line status. Therefore, its sequence is continued even if a fault occurs.

As described above, set values are recovered to values before an adjustment is made when a fault occurs, thereby preventing the fault from becoming more complex.

According to the present invention, main signal control functions such as a submarine repeater/gain equalizer supervisory control function, a pre-emphasis control function, a receiver threshold value control function, and a dispersion value control function, which are required for a WDM submarine terminal apparatus, can be operated more safely and securely while preventing a main signal from being influenced, and an apparatus that can be maintained in a carefree manner without making an operator consider the order of controls can be provided.

What is claimed is:

1. A main signal controlling apparatus in a termination station of a WDM optical communications system, comprising:
    a repeater supervisory control unit executing a supervisory control for a repeater arranged on a transmission line of the WDM optical communications system;
    a pre-emphasis control unit making a pre-emphasis that adjusts a level difference among wavelengths of a WDM optical signal transmitted from the terminal station;
    a threshold value setting control unit setting and controlling a threshold value that an optical signal receiving device uses to detect a signal;
    a wavelength dispersion compensation control unit adjusting a wavelength dispersion compensation amount at a transmitting end or a receiving end; and
    a priority control unit preferentially executing a repeater supervisory control, a pre-emphasis control, a threshold value setting control, and a wavelength dispersion compensation control in this order, so that the controls are executed without exerting a bad influence on a quality of a main signal transmitted/received by the WDM optical communications system, when at least two of the controls occur simultaneously, including if a repeater supervisory control from an opposed terminal station and a repeater supervisory control from a local terminal station occur simultaneously, information is exchanged via a dedicated line which connects priority control units of both of the terminal stations, and an earlier started control is executed with a higher priority.

2. A main signal controlling apparatus in a termination station of a WDM optical communications system, comprising:
    a repeater supervisory control unit executing a supervisory control for a repeater arranged on a transmission line of the WDM optical communications system;
    a pre-emphasis control unit making a pre-emphasis that adjusts a level difference among wavelengths of a WDM optical signal transmitted from the terminal station;
    a threshold value setting control unit setting and controlling a threshold value that an optical signal receiving device uses to detect a signal;
    a wavelength dispersion compensation control unit adjusting a wavelength dispersion compensation amount at a transmitting end or a receiving end; and
    a priority control unit preferentially executing a repeater supervisory control, a pre-emphasis control, a threshold value setting control, and a wavelength dispersion compensation control in this order, so that the controls are executed without exerting a bad influence on a quality of a main signal transmitted/received by the WDM optical communications system, when controls associated with different transmission lines, which connect an opposed terminal station and a local terminal station, in the WDM optical communications system, among respective controls are executed simultaneously.

3. A main signal controlling apparatus in a termination station of a WDM optical communications system, comprising:
    a repeater supervisory control unit executing a supervisory control for a repeater arranged on a transmission line of the WDM optical communications system;
    a pre-emphasis control unit making a pre-emphasis that adjusts a level difference among wavelengths of a WDM optical signal transmitted from the terminal station;
    a threshold value setting control unit setting and controlling a threshold value that an optical signal receiving device uses to detect a signal;
    a wavelength dispersion compensation control unit adjusting a wavelength dispersion compensation amount at a transmitting end or a receiving end; and
    a priority control unit preferentially executing a repeater supervisory control, a pre-emphasis control, a threshold value setting control, and a wavelength dispersion compensation control in this order, so that the controls are executed without exerting a bad influence on a quality of a main signal transmitted/received by the WDM optical communications system, when at least two of the controls occur simultaneously, with the threshold value control, a threshold value in an amplitude direction and a threshold value in a phase direction of a received signal are controlled.

4. A main signal controlling apparatus in a termination station of a WDM optical communications system, comprising:
    a repeater supervisory control unit executing a supervisory control for a repeater arranged on a transmission line of the WDM optical communications system;
    a pre-emphasis control unit making a pre-emphasis that adjusts a level difference among wavelengths of a WDM optical signal transmitted from the terminal station;
    a threshold value setting control unit setting and controlling a threshold value that an optical signal receiving device uses to detect a signal;
    a wavelength dispersion compensation control unit adjusting a wavelength dispersion compensation amount at a transmitting end or a receiving end; and
    a priority control unit preferentially executing a repeater supervisory control, a pre-emphasis control, a threshold value setting control, and a wavelength dispersion compensation control in this order, so that the controls are executed without exerting a bad influence on a quality of a main signal transmitted/received by the WDM optical communications system, when at least two of the controls occur simultaneously and if a control with a lower priority is interrupted by a control with a higher priority, the control with the lower priority is stopped, and at the same time, a recovery process for recovering status of the WDM optical communications system to status before the control with the lower priority starts is performed.

5. The main signal controlling apparatus according to claim 4, wherein if the control with the lower priority is a wavelength dispersion compensation control of a local terminal station, the recovery process is not performed.

6. A main signal controlling apparatus in a termination station of a WDM optical communications system, comprising:
   a repeater supervisory control unit executing a supervisory control for a repeater arranaed on a transmission line of the WDM optical communications system;
   a pre-emphasis control unit making a pre-emphasis that adjusts a level difference among wavelengths of a WDM optical signal transmitted from the terminal station;
   a threshold value setting control unit setting and controlling a threshold value that an optical signal receiving device uses to detect a signal;
   a wavelength dispersion compensation control unit adjusting a wavelength dispersion compensation amount at a transmitting end or a receiving end; and
   a priority control unit preferentially executing a repeater supervisory control, a pre-emphasis control, a threshold value setting control, and a wavelength dispersion compensation control in this order, so that the controls are executed without exerting a bad influence on a quality of a main signal transmitted/received by the WDM optical communications system, when at least two of the controls occur simultaneously and if a fault occurs while any of the controls is being executed, the control is stopped, and a recovery process for recovering status of the WDM optical communications system to status before the control is executed is performed.

7. A main signal controlling method for use in a terminal station of a WDM optical communications system, comprising:
   executing a supervisory control for a repeater arranged on a transmission line of the WDM optical communications system;
   making a pre-emphasis that adjusts a level difference among wavelengths of a WDM optical signal transmitted from the terminal station;
   setting and controlling a threshold value that an optical signal receiving device uses to detect a signal;
   adjusting a wavelength dispersion compensation amount at a transmitting end or a receiving end; and
   preferentially executing a repeater supervisory control, a pre-emphasis control, a threshold value setting control, and a wavelength dispersion compensation control in this order, so that the controls are executed without exerting a bad influence on a quality of a main signal transmitted/received by the WDM optical communications system, when at least two of the controls occur simultaneously and if a repeater supervisory control from an opposed terminal station, and a repeater supervisory control from a local terminal station occur simultaneously, information is exchanged via a dedicated line of both of the terminal stations, which is used in said preferentially control executing, and an earlier started control is executed with a higher priority.

8. A main signal controlling method for use in a terminal station of a WDM optical communications system, comprising:
   executing a supervisory control for a repeater arranged on a transmission line of the WDM optical communications system;
   making a pre-emphasis that adjusts a level difference among wavelengths of a WDM optical signal transmitted from the terminal station;
   setting and controlling a threshold value that an optical signal receiving device uses to detect a signal;
   adjusting a wavelength dispersion compensation amount at a transmitting end or a receiving end; and
   preferentially executing a repeater supervisory control, a pre-emphasis control, a threshold value setting control, and a wavelength dispersion compensation control in this order, so that the controls are executed without exerting a bad influence on a quality of a main signal transmitted/received by the WDM optical communications system, when controls associated with different transmission lines, which connect an opposed terminal station and a local terminal station, in the WDM optical communications system, among respective controls are executed simultaneously.

9. A main signal controlling method for use in a terminal station of a WDM optical communications system, comprising:
   executing a supervisory control for a repeater arranged on a transmission line of the WDM optical communications system;
   making a pre-emphasis that adjusts a level difference among wavelengths of a WDM optical signal transmitted from the terminal station;
   setting and controlling a threshold value that an optical signal receiving device uses to detect a signal;
   adjusting a wavelength dispersion compensation amount at a transmitting end or a receiving end; and
   preferentially executing a repeater supervisory control, a pre-emphasis control, a threshold value setting control, and a wavelength dispersion compensation control in this order, so that the controls are executed without exerting a bad influence on a quality of a main signal transmitted/received by the WDM optical communications system, when at least two of the controls occur simultaneously, with the threshold value control, a threshold value in an amplitude direction and a threshold value in a phase direction of a received signal are controlled.

10. A main signal controlling method for use in a terminal station of a WDM optical communications system, comprising:
    executing a supervisory control for a repeater arranged on a transmission line of the WDM optical communications system;
    making a pre-emphasis that adjusts a level difference among wavelengths of a WDM optical signal transmitted from the terminal station;
    setting and controlling a threshold value that an optical signal receiving device uses to detect a signal;

adjusting a wavelength dispersion compensation amount at a transmitting end or a receiving end; and preferentially executing a repeater supervisory control, a pre-emphasis control, a threshold value setting control, and a wavelength dispersion compensation control in this order, so that the controls are executed without exerting a bad influence on a quality of a main signal transmitted/received by the WDM optical communications system, when at least two of the controls occur simultaneously and if a control with a lower priority is interrupted by a control with a higher priority, the control with the lower priority is stopped, and at the same time, a recovery process for recovering status of the WDM optical communications system to status before the control with the lower priority starts is performed.

11. The main signal controlling method according to claim 10, wherein if the control with the lower priority is a wavelength dispersion compensation control of a local terminal station, the recovery process is not performed.

12. A main signal controlling method for use in a terminal station of a WDM optical communications system, comprising:

executing a supervisory control for a repeater arranged on a transmission line of the WDM optical communications system;

making a pre-emphasis that adjusts a level difference among wavelengths of a WDM optical signal transmitted from the terminal station;

setting and controlling a threshold value that an optical signal receiving device uses to detect a signal;

adjusting a wavelength dispersion compensation amount at a transmitting end or a receiving end; and preferentially executing a repeater supervisory control, a pre-emphasis control, a threshold value setting control, and a wavelength dispersion compensation control in this order, so that the controls are executed without exerting a bad influence on a quality of a main signal transmitted/received by the WDM optical communications system, when at least two of the controls occur simultaneously and if a fault occurs while any of the controls is being executed, the control is stopped, and a recovery process for recovering status of the WDM optical communications system to status before the control is executed is performed.

* * * * *

UNITED STATES PATENT AND TRADEMARK OFFICE
CERTIFICATE OF CORRECTION

| | | |
|---|---|---|
| PATENT NO. | : 7,133,611 B2 | Page 1 of 1 |
| APPLICATION NO. | : 10/269982 | |
| DATED | : November 7, 2006 | |
| INVENTOR(S) | : Shinichi Kaneko | |

It is certified that error appears in the above-identified patent and that said Letters Patent is hereby corrected as shown below:

Column 29, Line 21, change "arranaed" to --arranged--.

Signed and Sealed this

Twenty-seventh Day of February, 2007

JON W. DUDAS
*Director of the United States Patent and Trademark Office*